United States Patent
Kato et al.

(10) Patent No.: US 8,620,140 B2
(45) Date of Patent: Dec. 31, 2013

(54) REPRODUCING APPARATUS, REPRODUCING METHOD, REPRODUCING PROGRAM, AND RECORDING MEDIUM

(75) Inventors: Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1079 days.

(21) Appl. No.: 11/045,431

(22) Filed: Jan. 28, 2005

(65) Prior Publication Data

US 2005/0196143 A1    Sep. 8, 2005

(30) Foreign Application Priority Data

Jan. 29, 2004    (JP) .................................. 2004-021886

(51) Int. Cl.
  *H04N 9/80*    (2006.01)
  *H04N 5/93*    (2006.01)
(52) U.S. Cl.
  USPC ............................. 386/248; 386/239; 386/280
(58) Field of Classification Search
  None
  See application file for complete search history.

(56) References Cited

U.S. PATENT DOCUMENTS

| | | | | |
|---|---|---|---|---|
| 7,222,309 B2 * | 5/2007 | Chupin et al. | ................ | 715/848 |
| 7,289,723 B2 * | 10/2007 | Kikuchi et al. | ................ | 386/105 |
| 7,307,667 B1 * | 12/2007 | Yeh et al. | ...................... | 348/555 |
| 2004/0088739 A1 * | 5/2004 | Shimoji et al. | ................ | 725/135 |
| 2004/0175095 A1 * | 9/2004 | Freeman | .......................... | 386/46 |
| 2006/0039258 A1 * | 2/2006 | Seo et al. | ...................... | 369/53.2 |
| 2006/0188223 A1 * | 8/2006 | Ikeda et al. | ..................... | 386/95 |

FOREIGN PATENT DOCUMENTS

| | | |
|---|---|---|
| JP | 7-274140 | 10/1995 |
| JP | 08-339663 | 12/1996 |
| JP | 10-145722 | 5/1998 |
| JP | 11-69284 | 3/1999 |
| JP | 2001-275089 | 10/2001 |

OTHER PUBLICATIONS

U.S. Appl. No. 13/350,510, filed Jan. 13, 2012, Hamada, et al.
U.S. Appl. No. 13/350,449, filed Jan. 13, 2012, Hamada, et al.
Office Action issued Jul. 24, 2012 in Japanese Application No. 2010278510, filed May 12, 2011 (No English Translation).
Office Action issued Jun. 4, 2013 in Japanese Patent Application No. 2010-278510.

* cited by examiner

*Primary Examiner* — Heather Jones
(74) *Attorney, Agent, or Firm* — Oblon, Spivak, McClelland, Maier & Neustadt, L.L.P.

(57) ABSTRACT

A reproducing apparatus for reproducing contents data recorded on a disc-shaped recording medium is disclosed, the apparatus comprising inputting means for inputting a non-real time stream and a real time stream reproduced from the recording medium, storing means for storing the program code that has been input by the inputting means; image data storing means for storing the image data that has been input by the inputting means; first combining means for combining decoded moving picture data and decoded subtitle data; and second combining means for combining the decoded image data and the combined data of the decoded moving picture and the decoded subtitle data in accordance with the program code stored in the code storing means.

23 Claims, 94 Drawing Sheets

Fig. 5

| | |
|---|---|
| SUB PICTURE | DATA OF ONE PICTURE REPRESENTED BY INFORMATION OF TWO BITS PRE PIXEL. |
| | COLOR (A0, B0, C0, D0) |
| | DISPLAY START COORDINATES (X, Y) |
| HIGHLIGHT | COLOR IN SELECTION STATE (A1, B1, C1, D1) |
| | COLOR IN EXECUTION STATE (A2, B2, C2, D2) |
| | SETS OF COORDINATES OF REGIONS WHOSE COLORS ARE CHANGED (= NUMBER OF BUTTONS : 3) |
| | (X1, Y1, X1', Y1') |
| | (X2, Y2, X2', Y2') |
| | (X3, Y3, X3', Y3') |

Fig. 10

| SYNTAX | DATA LENGTH (BITS) | MNEMONIC |
|---|---|---|
| info.bdav{ | | |
|     type_indicator | 8*4 | bslbf |
|     version_number | 8*4 | bslbf |
|     TableOfPlayLists_start_address | 32 | unimsbf |
|     MakersPrivateData_start_address | 32 | unimsbf |
|     reserved_for_future_use | 192 | bslbf |
|     UIAppInfoBDAV() | | |
|     for(i=0;i<N1;+i++){ | | |
|         padding_word | 16 | bslbf |
|     } | | |
|     TableOfPlayLists() | | |
|     for(i=0;i<N2;+i++){ | | |
|         padding_word | 16 | bslbf |
|     } | | |
|     MakersPrivateData() | | |
|     for(i=0;i<N3;+i++){ | | |
|         padding_word | 16 | bslbf |
|     } | | |
| } | | |

Fig. 11

| SYNTAX | DATA LENGTH (BITS) | MNEMONIC |
|---|---|---|
| UIAppInfoBDAV(){ | | |
| length | 32 | unimsbf |
| reserved_for_future_use | 16 | bslbf |
| BDAV_character_set | 8 | bslbf |
| reserved_for_word_align | 6 | bslbf |
| BDAV_protect_flag | 1 | bslbf |
| resume_valid_flag | 1 | bslbf |
| PIN | 8*4 | bslbf |
| resume_PlayList_file_name | 8*10 | bslbf |
| ref_to_menu_thumbnail_index | 16 | unimsbf |
| BDAV_name_length | 8 | unimsbf |
| BDAV_name | 8*255 | bslbf |
| } | | |

Fig. 12

| SYNTAX | DATA LENGTH (BITS) | MNEMONIC |
|---|---|---|
| TableOfPlayLists(){ | | |
| length | 32 | unimsbf |
| number_of_PlayLists | 16 | unimsbf |
| for(i=0;i<number_of_PlayLists;i++){ | | |
| PlayList_file_name | 8*10 | bslbf |
| } | | |
| } | | |

Fig. 13

| SYNTAX | DATA LENGTH (BITS) | MNEMONIC |
|---|---|---|
| xxxxx.rpls/yyyyy.vpls{ | | |
|     type_indicator | 8*4 | bslbf |
|     version_number | 8*4 | bslbf |
|     PlayList_start_address | 32 | unimsbf |
|     PlayListMark_start_address | 32 | unimsbf |
|     MakersPrivateData_start_address | 32 | unimsbf |
|     reserved_for_future_use | 160 | bslbf |
|     UIAppInfoPlayList() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
|     MakersPrivateData() | | |
|     for(i=0;i<N4;i++){ | | |
|         padding_word | 16 | bslbf |
|     } | | |
| } | | |

Fig. 14

| SYNTAX | DATA LENGTH (BITS) | MNEMONIC |
|---|---|---|
| UIAppInfoPlayList(){ | | |
| length | 32 | unimsbf |
| reserved_for_future_use | 16 | bslbf |
| PlayList_character_set | 8 | unimsbf |
| reserved_for_word_align | 4 | bslbf |
| playback_protect_flag | 1 | bslbf |
| write_protect_flag | 1 | bslbf |
| is_played_flag | 1 | bslbf |
| is_edited_flag | 1 | bslbf |
| time_zone | 8 | bslbf |
| reserved_for_word_align | 8 | bslbf |
| record_time_and_date | 4*14 | bslbf |
| PlayList_duration | 4*6 | bslbf |
| maker_ID | 16 | unimsbf |
| maker_model_code | 16 | unimsbf |
| channel_number | 16 | unimsbf |
| reserved_for_word_align | 8 | bslbf |
| channel_name_length | 8 | unimsbf |
| channel_name | 8*20 | bslbf |
| PlayList_name_length | 8 | unimsbf |
| PlayList_name | 8*255 | bslbf |
| PlayList_detail_length | 16 | unimsbf |
| PlayList_detail | 8*1200 | bslbf |
| } | | |

Fig. 15

| SYNTAX | DATA LENGTH (BITS) | MNEMONIC |
|---|---|---|
| PlayList(){ | | |
|   length | 32 | unimsbf |
|   reserved_for_word_align | 12 | bslbf |
|   PL_CPI_type | 4 | bslbf |
|   number_of_PlayItems | 16 | unimsbf |
|   if(<Virtual-PlayList>&&PL_CPI_type==1){ | | |
|     number_of_SubPlayItems | 16 | unimsbf |
|   }else{ | | |
|     reserved_for_word_align | 16 | bslbf |
|   } | | |
|   for(PlayItem_id=0;PlayItem_id<number_of_PlayItems;PlayItem_id++){ | | |
|     PlayItem() | | |
|   } | | |
|   if(<Virtual-PlayList>&&CPI_type==1){ | | |
|     for(i=0;i<number_of_SubPlayItems;i++){ | | |
|       SubPlayItem() | | |
|     } | | |
|   } | | |
| } | | |

Fig. 16

| SYNTAX | DATA LENGTH (BITS) | MNEMONIC |
|---|---|---|
| PlayItem(){ | | |
|   length | 16 | unimsbf |
|   Clip_Infomation_file_name | 8*5 | bslbf |
|   Clip_codec_identifier | 8*4 | bslbf |
|   reserved_for_future_use | 6 | bslbf |
|   connection_condition | 2 | bslbf |
|   if(CPI_type==1){ | | |
|     ref_to_STC_id | 8 | unimsbf |
|   }else{ | | |
|     reserved_for_word_align | 8 | bslbf |
|   } | | |
|   IN_time | 32 | unimsbf |
|   OUT_time | 32 | unimsbf |
|   if((Vietual-PlayList)&&connection_condition==3){ | | |
|     BridgeSequenceInfo() | | |
|   } | | |
| } | | |

Fig. 18

| SYNTAX | DATA LENGTH (BITS) | MNEMONIC |
|---|---|---|
| PlayListMark(){ | | |
|   length | 32 | unimsbf |
|   number_of_PlayList_marks | 16 | unimsbf |
|   for(i=0;i<number_of_PlayList_marks;i++){ | | |
|     mark_invalid_flag | 1 | unimsbf |
|     mark_type | 7 | unimsbf |
|     mark_name_length | 8 | unimsbf |
|     maker_ID | 16 | unimsbf |
|     ref_to_PlayItem_id | 16 | unimsbf |
|     mark_time_stamp | 32 | unimsbf |
|     entry_ES_PID | 16 | unimsbf |
|     if(mark_type==0x01||mark_type==0x02){ | | |
|       ref_to_menu_thumbnail_index | 16 | unimsbf |
|     }else{ | | |
|       ref_to_menu_thumbnail_index | 16 | unimsbf |
|     } | | |
|     duration | 32 | unimsbf |
|     makers_infomation | 32 | bslbf |
|     mark_name | 8*24 | bslbf |
|   } | | |
| } | | |

Fig. 19

| SYNTAX | DATA LENGTH (BITS) | MNEMONIC |
|---|---|---|
| zzzzz.clpi{ | | |
|     type_indicator | 8*4 | bslbf |
|     version_number | 8*4 | bslbf |
|     SequenceInfo_start_address | 32 | unimsbf |
|     ProgramInfo_start_address | 32 | unimsbf |
|     CPI_start_address | 32 | unimsbf |
|     ClipMark_start_address | 32 | unimsbf |
|     MakersPrivateData_start_address | 32 | unimsbf |
|     reserved_for_future_use | 96 | bslbf |
|     ClipInfo() | | |
|     for(i=0;<N1;i++){ | | |
|         padding_word | 16 | bslbf |
|     } | | |
|     SequenceInfo() | | |
|     for(i=0;<N2;i++){ | | |
|         padding_word | 16 | bslbf |
|     } | | |
|     ProgramInfo() | | |
|     for(i=0;<N3;i++){ | | |
|         padding_word | 16 | bslbf |
|     } | | |
|     CPI() | | |
|     for(i=0;<N4;i++){ | | |
|         padding_word | 16 | bslbf |
|     } | | |
|     ClipMark() | | |
|     for(i=0;<N5;i++){ | | |
|         padding_word | 16 | bslbf |
|     } | | |
|     MakersPrivateData() | | |
|     for(i=0;<N6;i++){ | | |
|         padding_word | 16 | bslbf |
|     } | | |
| } | | |

Fig. 20

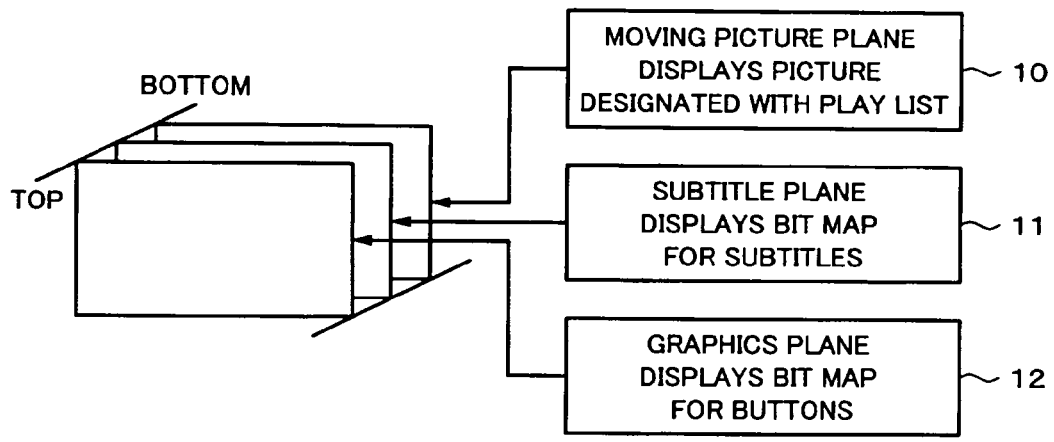

BOTTOM
TOP

MOVING PICTURE PLANE
DISPLAYS PICTURE
DESIGNATED WITH PLAY LIST — 10

SUBTITLE PLANE
DISPLAYS BIT MAP
FOR SUBTITLES — 11

GRAPHICS PLANE
DISPLAYS BIT MAP
FOR BUTTONS — 12

Fig. 21

| ITEM | DESCRIPTION |
|---|---|
| MOVING PICTURE PLANE | 1920 X 1080 X 16 BITS, YCbCr (4:2:2) |
| SUBTITLE PLANE | 1920 X 1080 X 8 BITS,<br>8-BIT COLOR MAP ADDRESSES (PALETTE)<br>+ ALPHA-BLENDING IN 256 LEVELS |
| GRAPHICS PLANE | 1920 X 1080 X 24 BITS,<br>YCbCr(4:4:4), OR RGB(4:4:4) EIGHT BITS EACH<br>+ ALPHA-BLENDING IN 256 LEVELS |

Fig. 23

| INPUT | INPUT ADDRESS    8 BITS |
|---|---|
| OUTPUT | OUTPUT DATA    8 BITS X 4, (R, G, B, $\alpha$) OUTPUT |

Fig. 24

| COLOR INDEX VALUE | VALUES OF THREE PRIMARY COLORS | | | TRANSPARENCY |
| --- | --- | --- | --- | --- |
| | R | G | B | $\alpha$ |
| 0x00 | 0 | 0 | 0 | 0 |
| 0x01 | 10 | 100 | 30 | 0.5 |
| ⋮ | ⋮ | ⋮ | ⋮ | ⋮ |
| ⋮ | ⋮ | ⋮ | ⋮ | ⋮ |
| 0xFF | 200 | 255 | 100 | 0.8 |

Fig. 28

| EVENT NAME | DESCRIPTION |
| --- | --- |
| TimeFired | COUNT DOWN TIMER BECAME "0"<br>COUNT UP TIMER BECAME PREDETERMINED VALUE |
| PlayStopped | REPRODUCTION STOPPED |
| PlayStilled | REPRODUCTION TEMPORARILY STOPPED |
| StillReleased | PAUSE STATE OF REPRODUCTION WAS RELEASED |
| PlayPaused | REPRODUCTION WAS PLACED IN PAUSE STATE BY USER |
| PauseReleased | PAUSE STATE WAS RELEASED |
| PlayStarted | REPRODUCTION STARTED |
| PlayRepeated | BEGINNING OF REGION TO BE REPEATEDLY REPRODUCED WAS DETECTED |
| SPDisplayStatusChanged | DISPLAY/NON-DISPLAY STATE OF SP STREAM WAS CHANGED |
| SelectedAudioChanged | AUDIO STREAM REPRODUCED WAS CHANGED |
| VideoStopped | VIDEO STREAM REPRODUCED WAS CHANGED |
| ScenarioStarted | BEGINNING OF SCENARIO WAS DETECTED |
| ScenarioEnded | END OF SCENARIO WAS DETECTED |
| PlayListStarted | BEGINNING OF PLAY LIST WAS DETECTED |
| PlayListEnded | END OF PLAY LIST WAS DETECTED |
| PlayItemStarted | BEGINNING OF PLAY ITEM WAS DETECTED |
| PlayItemEnded | END OF PLAY ITEM WAS DETECTED |
| MarkEncountered | MARK WAS DETECTED DURING REPRODUCTION<br>USED WHEN GRAPHICS SCREEN IS DISPLAYED<br>TYPE AND NUMBER ARE DESCRIBED IN COMMON PARAMETER |
| ButtonPressed | BUTTON ON SCREEN WAS PRESSED<br>ID OF PRESSED BUTTON IS DESCRIBED IN COMMON PARAMETER |
| ValidPeriodStarted | VALID PERIOD STARTED<br>USED TO DESIGNATE VALID PERIOD FOR WHICH LINK<br>CAN BE SELECTED |
| ValidPeriodEnded | VALID PERIOD ENDED<br>USED TO FORCEDLY EXECUTE LINK |
| KeyPressed | KEY OF REMOTE CONTROLLER WAS PRESSED<br>KEY TYPE IS IDENTIFIED WITH SWITCH OF EVENT HANDLER<br>OR THE LIKE |

| OBJECT | METHOD | REMARKS |
|---|---|---|
| bdp | | |
| COMMANDS FOR PLAYER OPERATIONS | | |
| | playScenario(scenarioNumber,[scenarioTime]) | CAUSES SCENARIO DESIGNATED BY scenarioNumber TO BE REPRODUCED. scenarioNumber IS URI FOR FILE OR LIKE THAT DESCRIBES SCENARIO STRUCTURE. scenarioTime IS OPTIONAL AND DESIGNATES ELAPSED TIME IN SCENARIO. |
| | playPlayList(playListNumber) | CAUSES PlayList DESIGNATED BY playListNumber TO BE REPRODUCED. |
| | playChapterMark(playListNumber,chapterNumber) | CAUSES PlayList DESIGNATED BY PlayListNumber FROM CHAPTER DESIGNATED BY chapterNumber TO BE REPRODUCED. |

Fig. 29B

| | | |
|---|---|---|
| | playPlayItem(playListNumber,playItemNumber) | CAUSES PlayList DESIGNATED BY PlayListNumber TO BE REPRODUCED FROM PlayItem DESIGNATED BY PlayItemNumber. playItemNumber IS PlayItem_id STARTING FROM 0. WHEN PlayList IS REPRODUCED FROM BEGINNING, playItemNumber IS 0. |
| | play(position)(object) position = ("prev"|"next"|"top"|"goUp"|"tail") object = (PlayList|PlayItem|Chapter) | CAUSES CURRENT POSITION TO BE MOVED IN SCENARIO. CAUSES CURRENT REPRODUCTION POSITION TO BE MOVED TO ADJACENT PlayList, PlayItem, OR THE LIKE. |
| | stop() | CAUSES REPRODUCTION OF SCENARIO TO BE STOPPED. VALUE OF STANDARD REGISTER IS NOT HELD. |
| | resume() | CAUSES REPRODUCTION TO BE RESUMED FROM LAST STOP POSITION. |
| | playSoundEffect() | CAUSES SELECTED EFFECT SOUND TO BE REPRODUCED. |

Fig. 30A

| Fig. 30 |
|---------|
| Fig. 30A |
| Fig. 30B |
| Fig. 30C |
| Fig. 30D |

| COMMANDS FOR PLAYER STATES | | |
|---|---|---|
| | getMenuDescriptionLanguage() | CAUSES LANGUAGE OF MENU THAT IS DISPLAYED TO BE OBTAINED. |
| | getScenarioNumber() | CAUSES SCENARIO NUMBER THAT IS BEING REPRODUCED TO BE OBTAINED. |
| | getPlayListNumber() | CAUSES PLAY LIST NUMBER THAT IS BEING REPRODUCED TO BE OBTAINED. |
| | getChapterNumber() | CAUSES CHAPTER NUMBER THAT IS BEING REPRODUCED TO BE OBTAINED. |
| | getPlayerSupport() | CAUSES VERSION AND FUNCTION OF PLAYER TO BE OBTAINED. |

Fig. 30B

| COMMANDS FOR VIDEO STREAMS | |
|---|---|
| setVideoStreamNumber() | DESCRIBES VIDEO STREAM TO BE DECODED. |
| getVideoStreamNumber() | CAUSES VIDEO STREAM NUMBER THAT IS BEING SELECTED TO BE OBTAINED. |
| getVideoStreamStatus() | CAUSES STATE OF VIDEO STREAM TO BE OBTAINED. |
| getVideoStreamAttr() | CAUSES ATTRIBUTE OF VIDEO STREAM (ENCODING SYSTEM, RESOLUTION, ASPECT RATIO, DISPLAY MODE IN THE CASE THAT ASPECT RATIO IS 4 : 3, CLOSED CAPTION) TO BE OBTAINED. |
| setAngleNumber() | DESCRIBES ANGLE NUMBER. |
| getAngleNumber() | CAUSES ANGLE NUMBER THAT HAS BEEN SELECTED TO BE OBTAINED. |
| getMaxVideoStreams() | CAUSES MAXIMUM NUMBER OF VIDEO STREAMS TO BE OBTAINED. |

Fig. 30C

| COMMANDS FOR AUDIO STREAMS | |
|---|---|
| getAudioStreamAvailability() | CAUSES INFORMATION THAT DESCRIBES WHETHER OR NOT DESIGNATED AUDIO STREAM IS CONTAINED TO BE OBTAINED. |
| getAudioStreamLanguage() | CAUSES INFORMATION ABOUT LANGUAGE OF DESIGNATED AUDIO STREAM TO BE OBTAINED. |
| getAudioStreamStatus() | DESCRIBES STATE OF AUDIO STREAM (OF WHETHER OR NOT IT IS DISPLAYED). |
| setAudioStreamStatus() | DESCRIBES STATE OF AUDIO STREAM (OF WHETHER OR NOT IT IS REPRODUCED). |
| getAudioStreamAttribute() | CAUSES ATTRIBUTE OF AUDIO STREAM (ENCODING SYSTEM, NUMBER OF CHANNELS, Q, FS) TO BE OBTAINED. |

Fig. 30D

| COMMANDS FOR SUB PICTURE STREAMS | |
|---|---|
| getSPStreamAvailability() | CAUSES INFORMATION THAT DESCRIBES WHETHER OR NOT DESIGNATED SP STREAM IS CONTAINED TO BE OBTAINED. |
| getSPStreamLanguage() | CAUSES LANGUAGE OF DESIGNATED SP STREAM TO BE OBTAINED. |
| getSPDisplayStatus() | CAUSES DISPLAY STATE OF SP TO BE OBTAINED. |
| setSPDisplayStatus() | DESCRIBES DISPLAY STATE OF SP WHETHER OR NOT DISPLAY OF SP IS TURN ON/OFF. |
| getSpStreamAttribute() | CAUSES ATTRIBUTE OF SP (ASPECT RATIO OF 4 : 3 OR WIDE SCREEN) TO BE OBTAINED. |

*Fig. 31A*

| Fig. 31 |
|---|
| Fig. 31A |
| Fig. 31B |
| Fig. 31C |
| Fig. 31D |

| COMMANDS FOR REGISTER READ/WRITE | |
|---|---|
| clearReg() | OPERATION FOR MEMORY REGION (REGISTERS) BUILT IN PLAYER. CAUSES ALL REGISTERS TO BE INITIALIZED. |
| setReg() | CAUSES VALUE TO BE SET TO REGISTER. |
| getReg() | CAUSES VALUE TO BE READ FROM REGISTER. |

Fig. 31B

| COMMANDS FOR TIMERS | | |
|---|---|---|
| | sleep() | CAUSES PROCESS TO BE STOPPED FOR DESIGNATED MILLISECONDS. |
| | setTimeout() | CAUSES FUNCTION AND PROCESS TO BE EXECUTED AFTER DESIGNATED MILLISECONDS HAVE ELAPSED. |
| | setInterval() | CAUSES PROCESS TO BE EXECUTED AT INTERVALS OF DESIGNATED MILLISECONDS. |
| | clearTimer() | CAUSES PROCESS OF TIMER THAT HAS DESIGNATED REGISTRATION TIMER ID TO BE STOPPED. |
| | pauseTimer() | CAUSES TIMER THAT HAS DESIGNATED REGISTRATION TIMER ID TO BE TEMPORARILY STOPPED. |
| | resumeTimer() | CAUSES TIMER THAT HAS DESIGNATED REGISTRATION TIMER ID TO BE RESUMED FROM PAUSE STATE. |

Fig. 31C

| COMMAND FOR KEY INPUT | | |
|---|---|---|
| | getPressedKey() | CAUSES TYPE OF KEY THAT HAS BEEN INPUT TO BE OBTAINED. |
| COMMANDS FOR GRAPHICS | | |
| | loadGraphics(htmlfile,ID) | CAUSES FILE DESIGNATED BY htmlfile TO BE READ AND IT TO BE EXPANDED TO GRAPHICS PLANE. FILE IS NOT DISPLAYED. IMAGE IS REFERENCED WITH ID. |
| | showGraphics(ID) | CAUSES GRAPHICS IMAGE DESIGNATED BY ID TO BE DISPLAYED. GRAPHIC IMAGE SHOULD HAVE BEEN EXPANDED ON PLANE BY LoadGraphics(). |
| | hideGraphics(ID) | CAUSES GRAPHICS IMAGE DESIGNATED BY ID TO BE HIDDEN. |

Fig. 31D

| OTHER COMMANDS | | |
|---|---|---|
| | random(input Number num) | CAUSES RANDOM NUMBER FROM 1 TO num TO BE GENERATED. RANDOM NUMBERS ARE UNIQUELY DEFINED WITHOUT USE OF MATH OBJECT OF ECMA SCRIPT. |
| | catchEvent(eventname,eventhandler) | CAUSES FUNCTION DESIGNATED BY eventhandler TO BE EXECUTED WHEN EVENT DESIGNATED BY eventname TAKES PLACE. |

Fig. 33

| FILE NAME | DESCRIPTION |
|---|---|
| startup.js | SCRIPT FILE THAT IS INITIALLY EXECUTED WHEN DISC IS LOADED |
| scenario000.js | SCRIPT FILE THAT DESCRIBES STRUCTURAL INFORMATION OF SCENARIO LIST SCREEN (SCENARIO000) |
| 000.html | HTML FILE THAT DESCRIBES LAYOUT OF SCENARIO LIST SCREEN |
| 00000.rpls | PLAY LIST FILE REPRODUCED AS BACKGROUND WHILE SCENARIO LIST SCREEN IS BEING DISPLAYED |
| scenario001.js | SCRIPT FILE THAT DESCRIBES STRUCTURAL INFORMATION OF SCENARIO001 |
| 00001.rpls | PLAY LIST FILE THAT DESCRIBES INFORMATION OF PLAY LIST REPRODUCED IN ACCORDANCE WITH SCENARIO001 |

*Fig. 35*

```
===================
startup.js
===================
function makeArray(n){
        this.length=n;
        for(i=0;i<n;i++){
                this[i]=null;
        }
}
//DEFINES NUMBER OF SCENARIOS AND THEIR NAMES.
var scenario=new makeArray(2);
scenario[0]="scenario000";
scenario[1]="scenario001";

//EXECUTES FIRST SCENARIO.
bdp.playScenario("scenario000");
```

*Fig. 36*

```
========================
scenario000.js
========================
function UOPControl(){
var keyID=getPressedKey();
    switch(keyID){
        case menu:
            bdp.playScenario("scenario000.js");  //RETURNS TO BEGINNING.
            break;
        default:
            break;
    }
}
function playListEnded(){
    bdp.playScenario("scenario000.js");  //AFTER SCENARIO HAS BEEN REPRODUCED,
    return();                            REPEATS REPRODUCTION FROM BEGINNING.
}
function MarkEncountered(){  //MARK THAT DESCRIBES TIMING AT
                                WHICH GRAPHICS ARE READ.
    bdp.loadGraphics("000.html","id_1");
    return();
}
function ValidPeriodStarted(f){  //MARK THAT DESCRIBES TIMING AT
                                WHICH GRAPHICS ARE DISPLAYED.
    if(f =="id_1"){
        bdp.showGraphics("id_1");
    }
    return();
}
function ValidPeriodEnded(f){  //MARK THAT DESCRIBES TIMING AT
                                WHICH GRAPHICS ARE CLEARED.
    if(f =="id_1"){
        bdp.hideGraphics("id_1");
    }
    return();
}
bdp.catchEvent("onKeyPressed","UOPControl()");
bdp.catchEvent("onPlayListEnded","PlayListEnded()");
bdp.catchEvent("onMarkEncountered","MarkEncountered()");
bdp.catchEvent("onValidPeriodStarted","ValidPeriodStarted()");
bdp.catchEvent("onValidPeriodEnded","ValidPeriodEnded()");

bdp.playPlayList("00000.rpls");
```

*Fig. 37*

```
========================
000.html
========================
<html>
<head>
<style type="text/css">
<![CDATA[
img#menu{position:absolute;top:200px;left:800px;width:200px;height:50px}
img#scenario001{position:absolute;top:700px;left:700px;width:400px;height:100px}
]]>
</style>
<script type="text/javascript">
function onMoverhandler(f){
        switch(f){
                case scenario001:
                        f.src="201.png";
                        break;
                default;
                        break;
        }
}
function onMouthandler(f){
        switch(f){
                case scenario001:
                        f.src="200.png";
                        break;
                default;
                        break;
        }
}
function onMclickhandler(f){
        switch(f){
                case scenario001:
                        f.src="202.png";
                        bdp.playScenario("scenario001.js");
                        break;
                default;
                        break;
        }
}
</script>
</head>
<body>
        <img src="100.png"  id="menu"/>
        <img src="200.png"  id="scenario001"
                onMouseover="onMoverhandler(this)"
                onMouseout="onMouthandler(this)"
                onclick="onMclickhandler(this)"/>
</body>
</html>
```

Fig. 38

```
====================
scenario001.js
====================
function UOPControl(){
        var keyID=getPressedKey();
        switch(keyID){
                case menu:   //MENU KEY IS PRESSED
                                WHILE SCENARIO001 IS BEING REPRODUCED
                        bdp.playScenario("scenario000.js");
                        break;
                default;
        }              break;
}
function playListEnded(){ //SINCE SCENARIO001 HAS BEEN REPRODUCED,
                                RETURNS TO SCENARIO000 (MENU SCREEN).
        bdp.playScenario("scenario000.js");
        return;
}
bdp.catchEvent("onPlayListEnded","PlayListEnded()");
bdp.catchEvent("onKeyPressed","UOPControl()");

bdp.playPlayList("00001.rpls");
====================
```

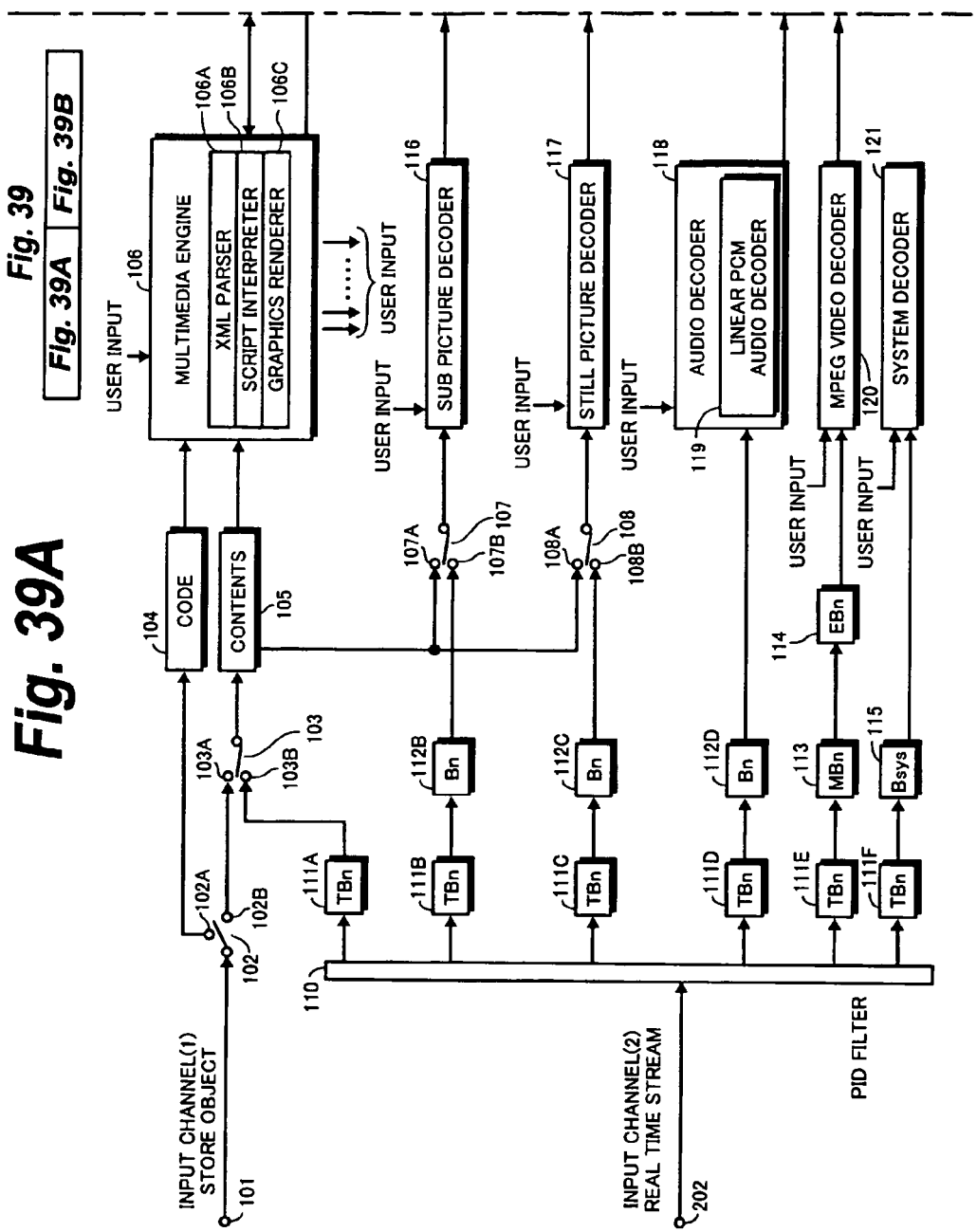

| TYPE OF OBJECT | RELATION OF PICTURE DISPLAYED ON MOVING PICTURE PLANE | DATA STRUCTURE | PLANE ON WHICH OBJECT IS DISPLAYED |
|---|---|---|---|
| SUBTITLES | SYNCHRONOUS TYPE | GRAPHICS OBJECT (GOBJ) | SUBTITLE PLANE |
| SYNCHRONOUS GRAPHICS | | | GRAPHICS PLANE |
| ASYNCHRONOUS GRAPHICS | ASYNCHRONOUS TYPE | ANY FORMAT | |

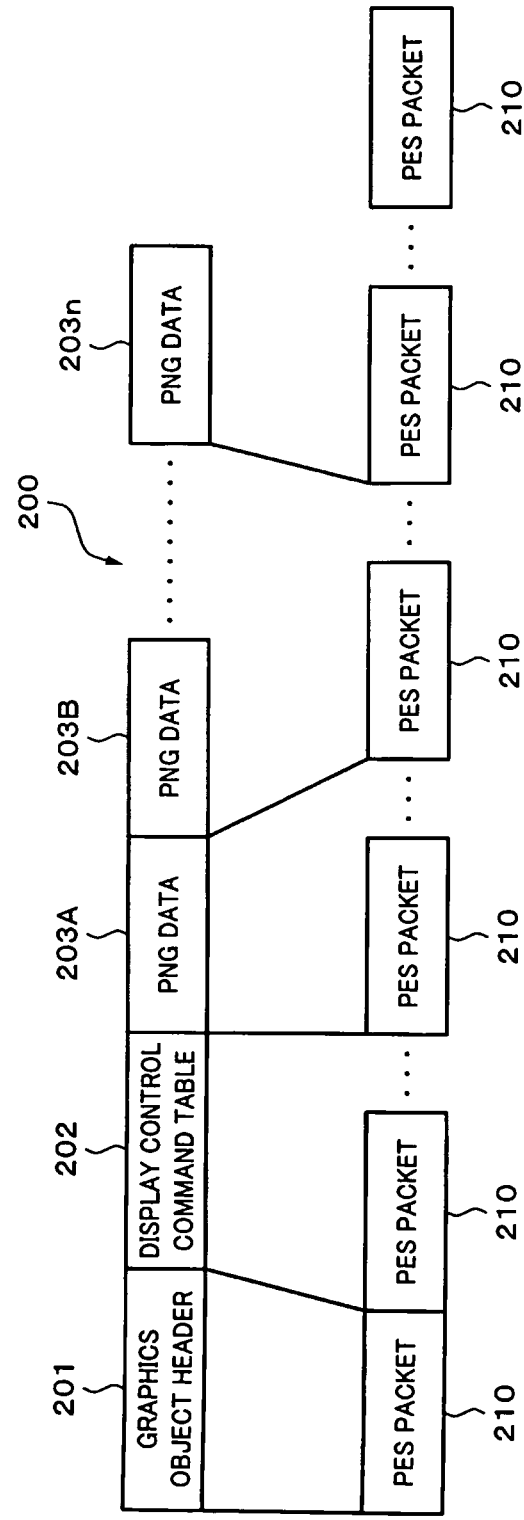

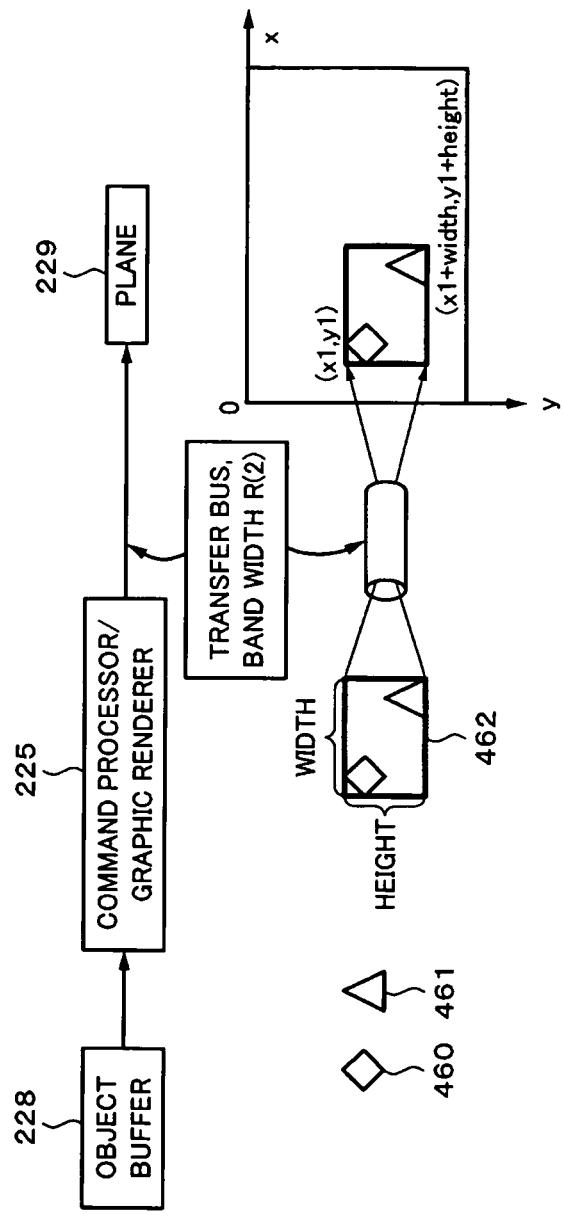

Fig. 47

| SYNTAX | DATA LENGTH (BITS) | MNEMONIC |
|---|---|---|
| GraphicsObject(){ | | |
|   GraphicsObjectHeader(){ | | |
|     length | 8 | unimsbf |
|     reserved | 7 | |
|     presentation_end_time_stamp | 33 | unimsbf |
|     number_of_PNG_images | 8 | unimsbf |
|     number_of_DispCmds | 8 | unimsbf |
|     GlobalPaletteTable() | | |
|     for(i=0;i<Number_of_PNGs;i++){ | | |
|       start_address_of_PNG_image(i) | 32 | unimsbf |
|       PNG_file_name(i) | 8*32 | bslbf |
|     } | | |
|     for(=0;i<Number_of_DispCmds;++){ | | |
|       start_address_of_PNG_Cmds(i) | 32 | unimsbf |
|     } | | |
|   } | | |
|   for(i=0;i<N1;i++){ | | |
|     padding_word | 32 | bslbf |
|   } | | |
|   GOBJCommandTable(){ | | |
|     for(i=0;i<Number_of_DispCmds;i++){ | | |
|       DispCmds(i) | | |
|     } | | |
|   } | | |
|   for(i=0;i<N2;i++){ | | |
|     padding_word | 32 | bslbf |
|   } | | |
|   PNGImageRegion (){ | | |
|     for(i=0;i<Number_of_PNGs;i++){ | | |
|       PNG_image(i) | | |
|     } | | |
|   } | | |
| } | | |

Fig. 48

| SYNTAX | DATA LENGTH (BITS) | MNEMONIC |
|---|---|---|
| GlobalPaletteTable(){ | | |
| reserved_for_future_use | 8 | bslbf |
| number_of_palette_entries | 8 | unimsbf |
| for(i=0;i<Number_of_palette_entries;i++){ | | |
| palette_index_number | 8 | unimsbf |
| red_value | 8 | unimsbf |
| green_value | 8 | unimsbf |
| bule_value | 8 | unimsbf |
| alpha | 8 | unimsbf |
| } | | |
| } | | |

Fig. 49A

| DISPLAY CONTROL COMMAND | DESCRIPTION |
|---|---|
| (1) execution_time(start_time) | COMMAND THAT CAUSES THE FOLLOWING COMMANDS UNTIL NEXT execution_time(start_time) TO BE EXECUTED AT TIME DESIGNATED BY start_time. START POINT OF start_time IS pts (presentation time stamp) OF GRAPHICS OBJECT. UNIT OF start_time IS SAME AS UNIT OF pts. |
| (2) fade_in(fade_in_time) | COMMAND THAT CAUSES GRAPHICS OBJECT TO BE DISPLAYED. COMMAND CAUSES VALUE OF INTRANSPARENCY OF CURRENT PALETTE TABLE TO BE GRADUALLY DECREASED AND TO BE SET TO 0 (TRANSPARENT) AFTER fade_in_time. WHEN VALUE OF fade_in_time IS 0, GRAPHICS OBJECT IS IMMEDIATELY DISPLAYED IN COLORS AND TRANSPARENCY OF PALETTE TABLE. |
| (3) fade_out(fade_out_time) | COMMAND THAT CAUSES GRAPHICS OBJECT TO BE CLEARED. COMMAND CAUSES INITIAL VALUE OF INTRANSPARENCY TO BE GRADUALLY INCREASED FROM 0 AND SET TO VALUE OF PALETTE TABLE AFTER fade_out_time. WHEN fade_out_time IS 0, GRAPHICS OBJECT IS IMMEDIATELY CLEARED. |

| DISPLAY CONTROL COMMAND | DESCRIPTION |
|---|---|
| (4)change_palette(index, newR, newG,newB, newAlpha) | COMMAND THAT CAUSES COLORS OF PALETTE NUMBER index AND INTRANSPARENCY TO BE CHANGED TO (newR, newG, newB) AND newAlpha, RESPECTIVELY. |
| (5)set_display_box(x1,y1,x2,y2) | COMMAND THAT CAUSES GRAPHICS OBJECT TO BE PLACED IN SQUARE REGION DEFINED BY (x1, y1, x2, y2) ON PLANE. |
| (6)set_clipping_box(a1,b1,a2,b2) | COMMAND THAT CAUSES SQUARE REGION DEFINED BY (a1, b1, a2, b2) OF GRAPHICS OBJECT TO BE DISPLAYED ON PLANE. |
| (7)play_sound(sound_id) | COMMAND THAT CAUSES SOUND DATA DESIGNATED BY sound_id TO BE REPRODUCED |
| (8)set_sound(PNG_image_id,sound_id) | COMMAND THAT CAUSES SOUND DATA TO BE ASSIGNED TO PNG DATA. COMMAND CAUSES SOUND DATA DESIGNATED BY sound_id TO BE REPRODUCED WHEN PNG DATA DESIGNATED BY PNG_image_id IS DISPLAYED. PNG_image_id IS SAME AS i (LOOP COUNTER) OF PNG_image(i) OF SYNTAX. |

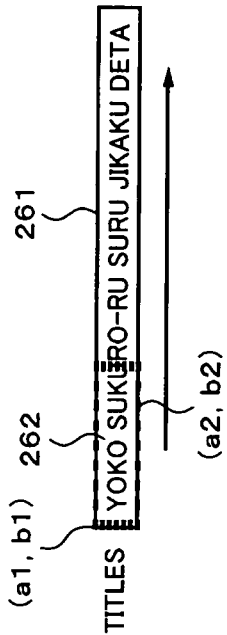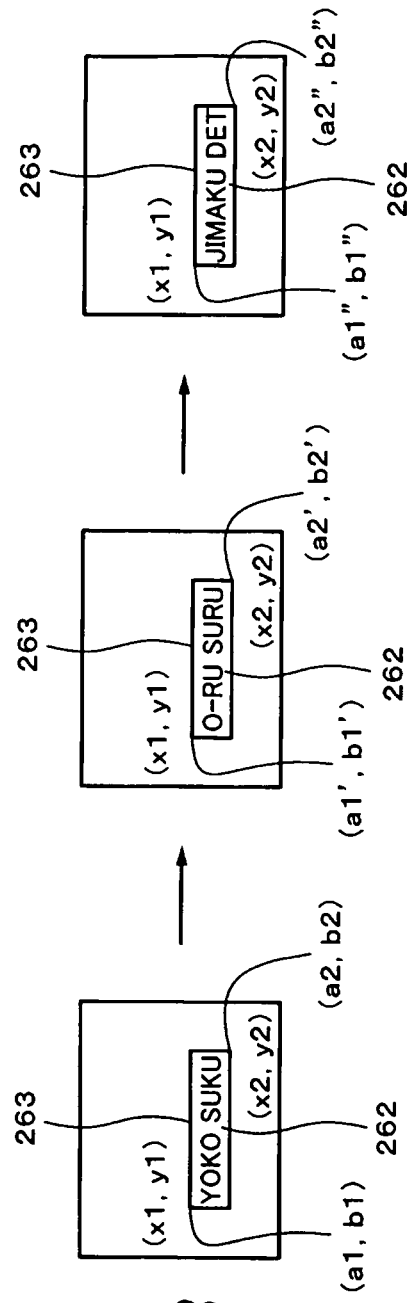
Fig. 55A
Fig. 55B

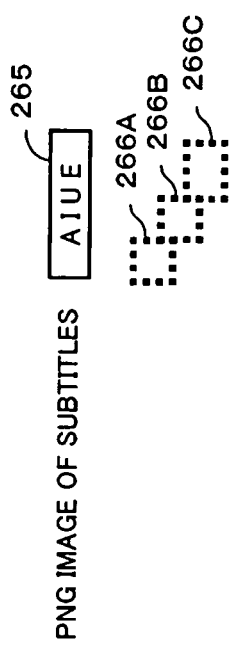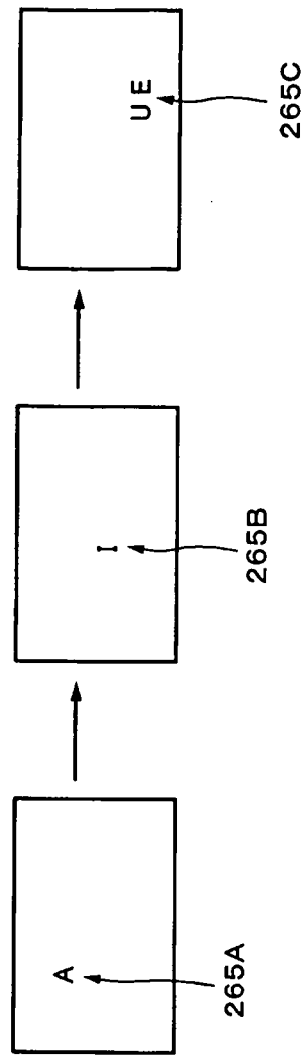
Fig. 56A
Fig. 56B

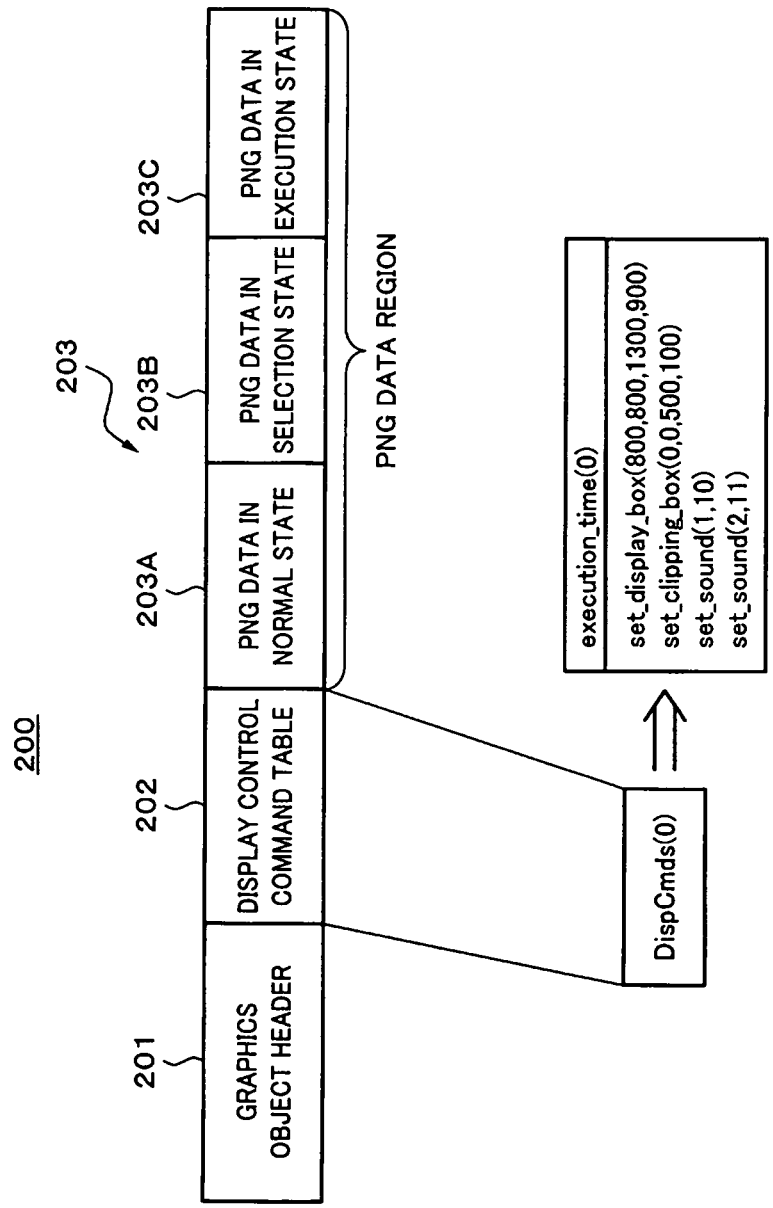

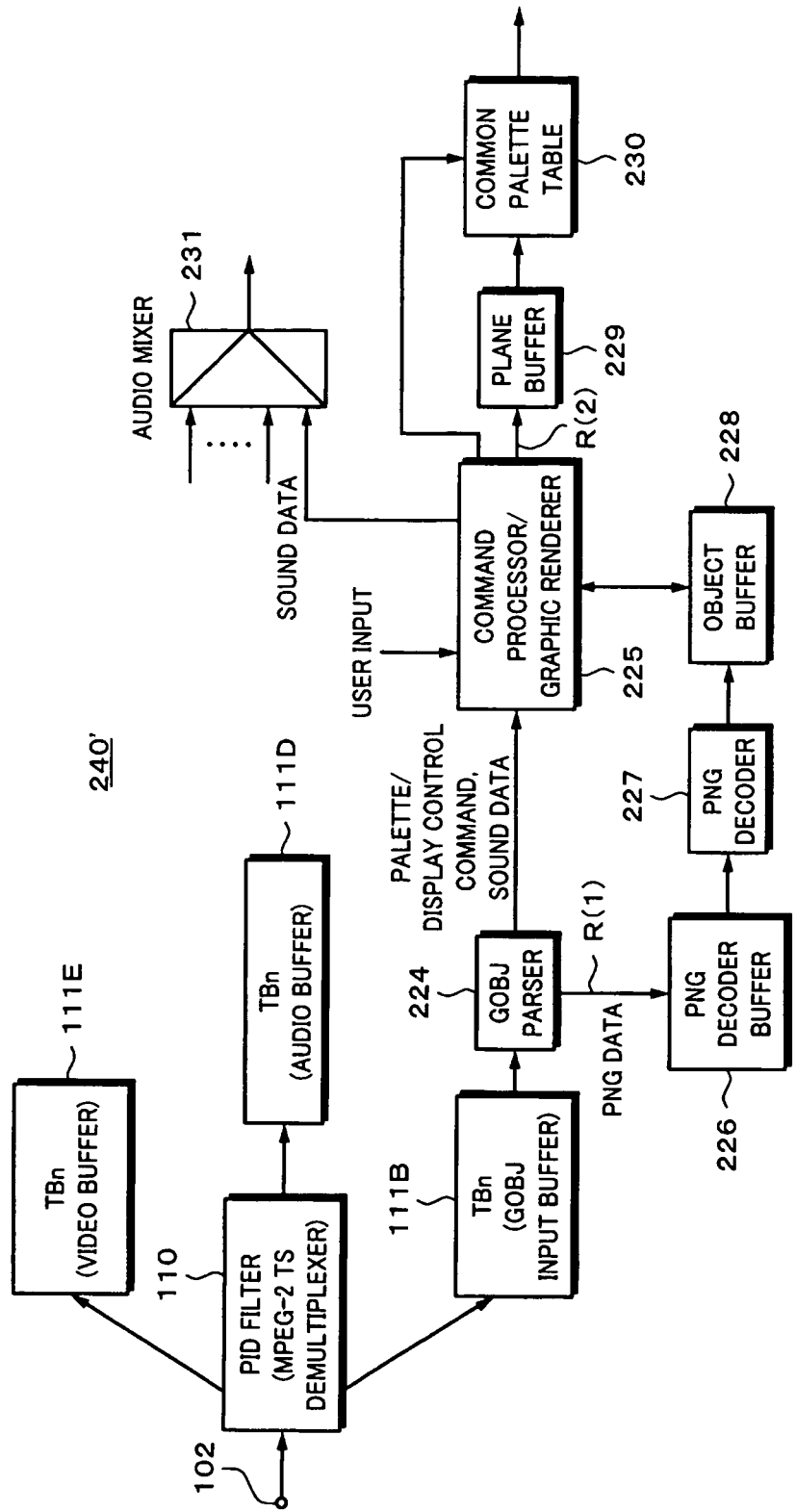

Fig. 61

| SYNTAX | DATA LENGTH (BITS) | MNEMONICS |
|---|---|---|
| GraphicsObject(){ | | |
|   GraphicsObjectHeader(){ | | |
|     length | 8 | unimsbf |
|     reserved | 7 | |
|     presentation_end_time_stamp | 33 | unimsbf |
|     number_of_DispCmds | 8 | unimsbf |
|     number_of_PNG_images | 8 | unimsbf |
|     number_of_sound_data | 8 | unimsbf |
|     GlobalPaletteTable() | | |
|     for(i=0;i<Number_of_DispCmds;i++){ | | |
|       start_address_of_DispCmds_image(i) | 32 | unimsbf |
|     } | | |
|     for(i=0;i<Number_of_PNG_images;i++){ | | |
|       start_address_of_PNG_image(i) | 32 | unimsbf |
|       PNG_file_name(i) | 8*32 | bslbf |
|     } | | |
|     for(i=0;i<Number_of_sound_data;i++){ | | |
|       start_address_of_sound_data(i) | 32 | unimsbf |
|     } | | |
|   } | | |
|   for(i=0;i<N1;i++){ | | |
|     padding_word | 32 | bslbf |
|   } | | |
|   GOBJCommandTable(){ | | |
|     for(i=0;i<Number_of_DispCmds;i++){ | | |
|       DispCmds(i) | | |
|     } | | |
|   } | | |
|   for(i=0;i<N2;i++){ | | |
|     padding_word | 32 | bslbf |
|   } | | |
|   PNGImageRegion (){ | | |
|     for(i=0;i<Number_of_PNGs;i++){ | | |
|       PNG_image(i) | | |
|     } | | |
|   } | | |
|   for(i=0;i<N3;i++){ | | |
|     padding_word | 32 | bslbf |
|   } | | |
|   SoundDataRegion(){ | | |
|     for(i=0;i<Number_of_sound_data;i++){ | | |
|       sound_data(i) | | |
|     } | | |
|   } | | |
| } | | |

Fig. 65

| Syntax | No. of bits | Mnemonic |
|---|---|---|
| HdmvSound.bdmv | | |
|     length | 32 | uimsbf |
|     if(length !=0){ | | |
|         data_block_start_address | 32 | uimsbf |
|         reserved_for_word_align | 24 | bslbf |
|         number_of_sound_entries | 8 | uimsbf |
|         for (sound_id =0; | | |
|         sound_id <number_of_sound_entries; | | |
|         sound_id++){ | | |
|             attributes() { | | |
|                 channel_assignment | | |
|                 sampling_frequency | | |
|                 bits_per_sample | | |
|             } | | |
|             sound_data_start_address | 32 | uimsbf |
|             sound_data_length | 32 | uimsbf |
|         } | | |
|         for (i=0; i<L1; i++) { | | |
|             padding_word | 16 | bslbf |
|             padding_word | 16 | bslbf |
|         } | | |
|         data_block | 32 + 8*(length - data_block_start _address) | |
|     } | | |
| } | | |

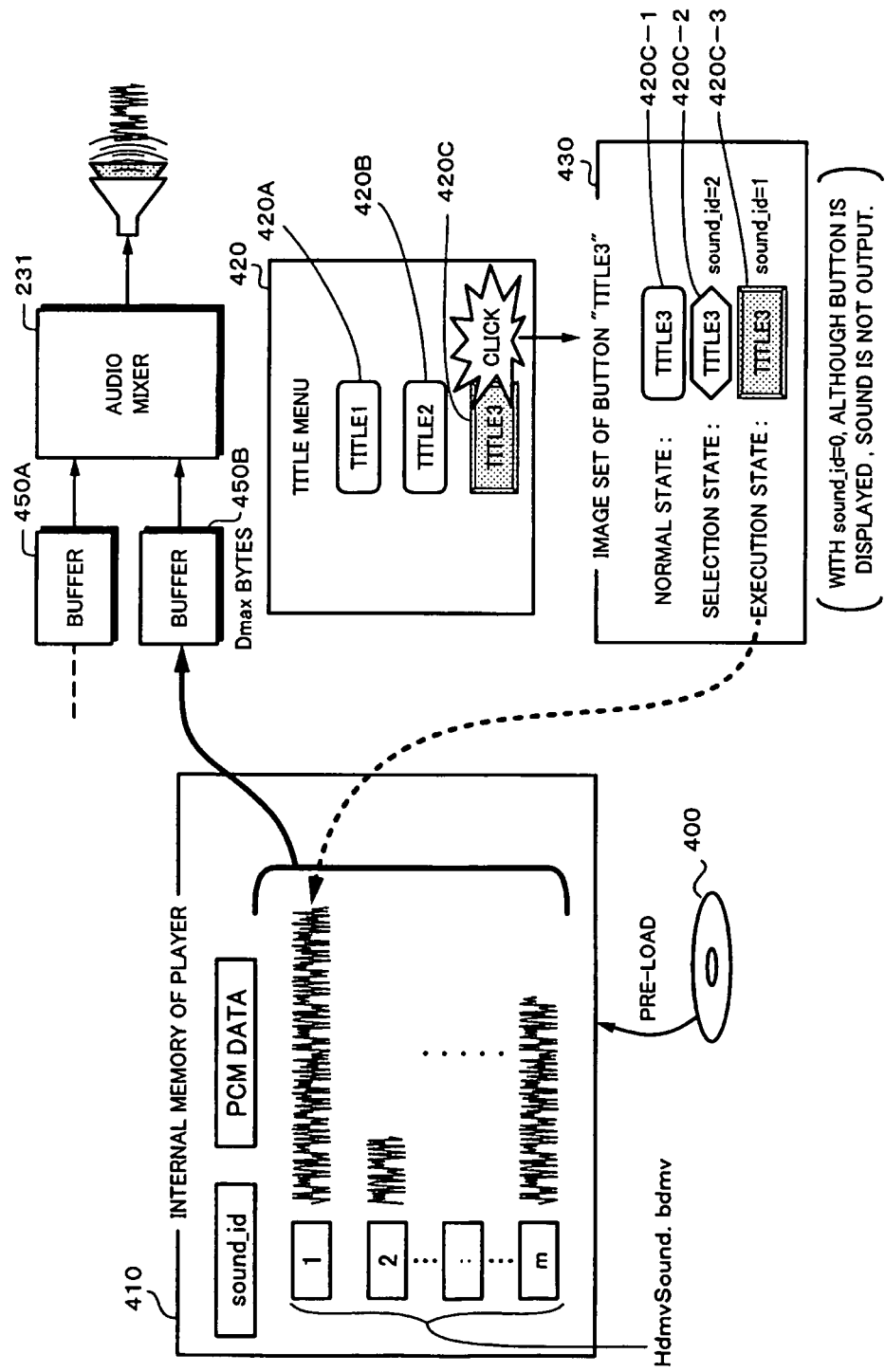

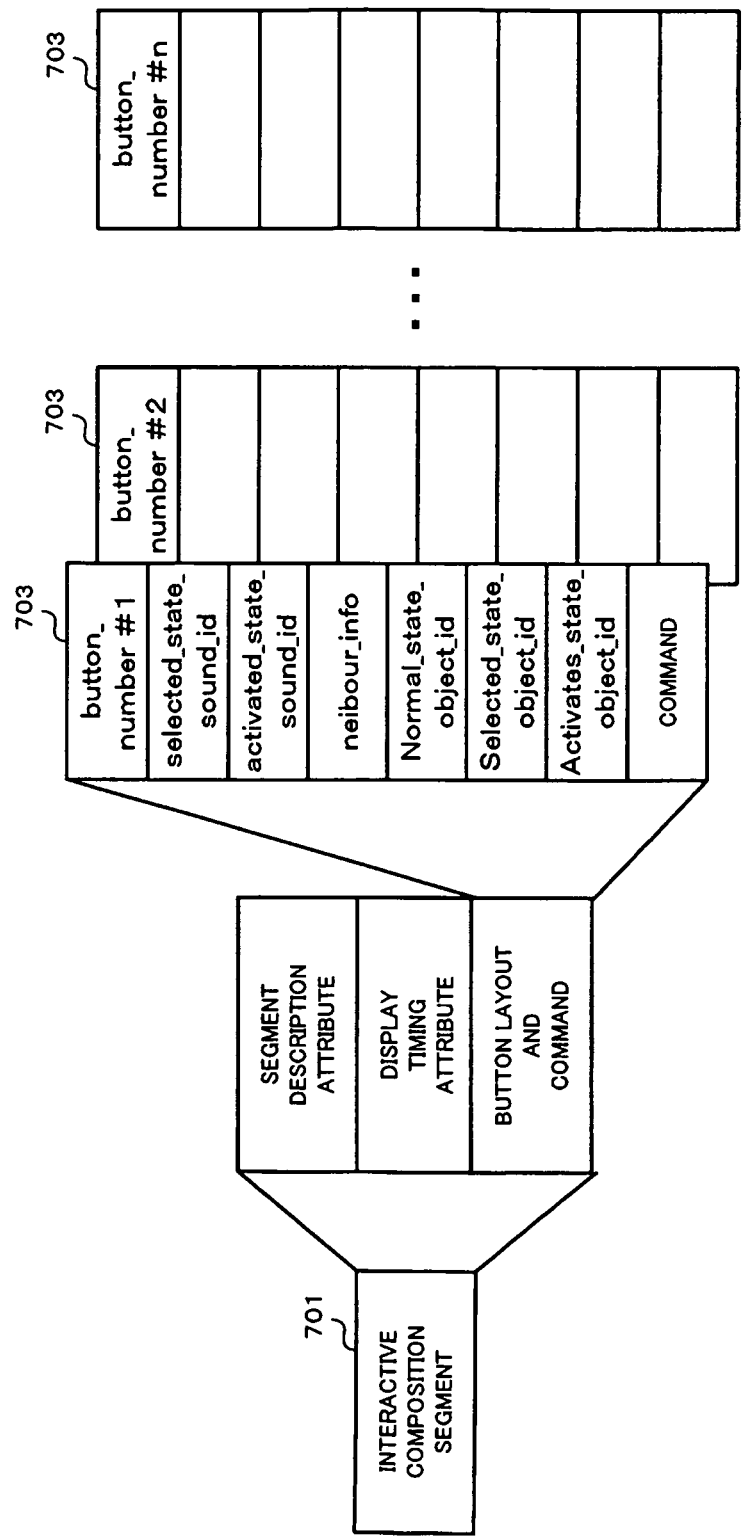

| ITEM | DESCRIPTION |
|---|---|
| MOVING PICTURE PLANE | 1920 X 1080 X 16 BITS, YCbCr (4 : 2 : 2) EIGHT BITS EACH |
| SUBTITLE PLANE | 1920 X 1080 X 8 BITS, 8-BIT COLOR MAP ADDRESSES (PALETTE) + ALPHA-BLENDING IN 256 LEVELS |
| GRAPHICS PLANE | 1920 X 1080 X 8 BITS, 8-BIT COLOR MAP ADDRESSES (PALETTE) + ALPHA BLENDING IN 256 LEVELS |

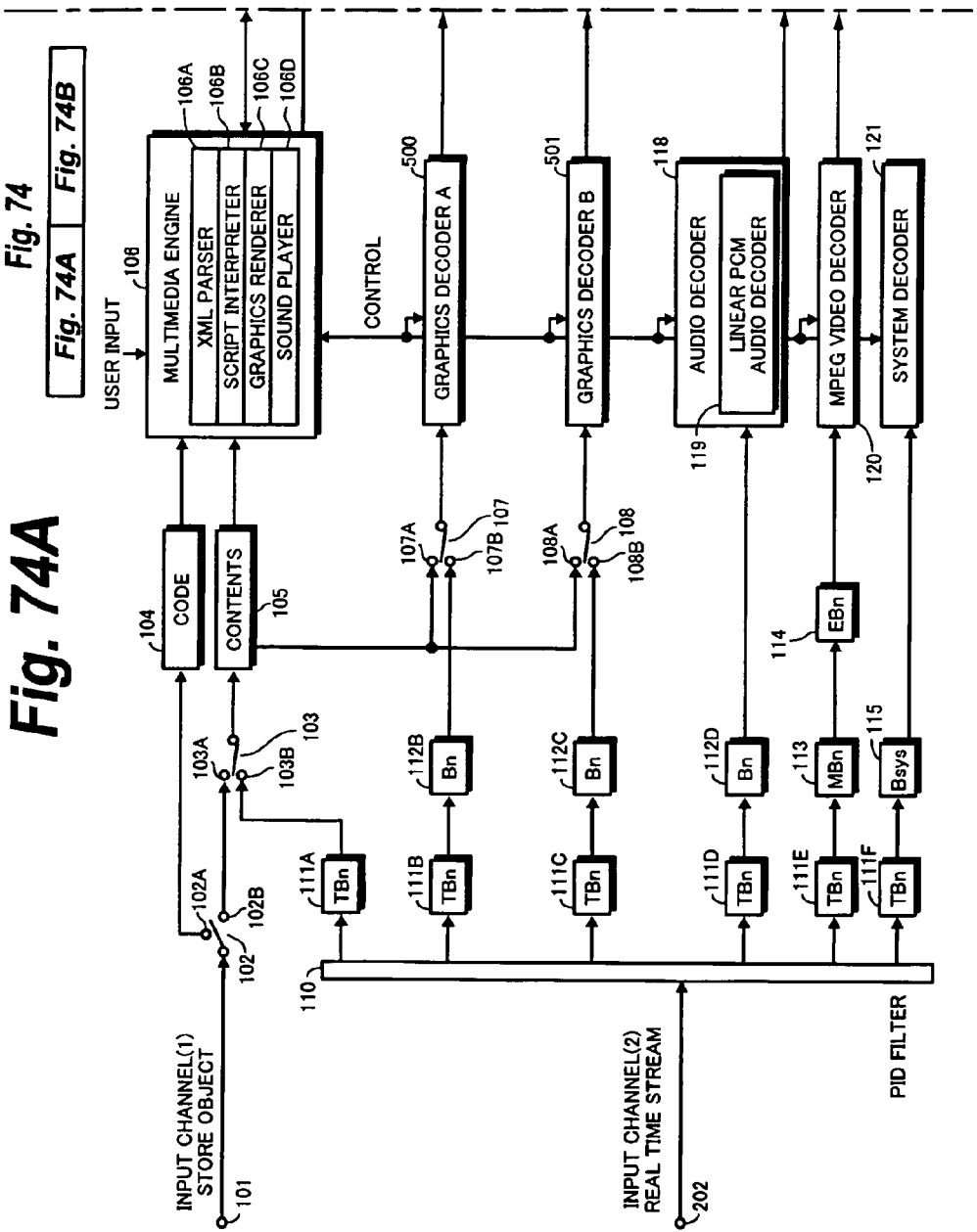

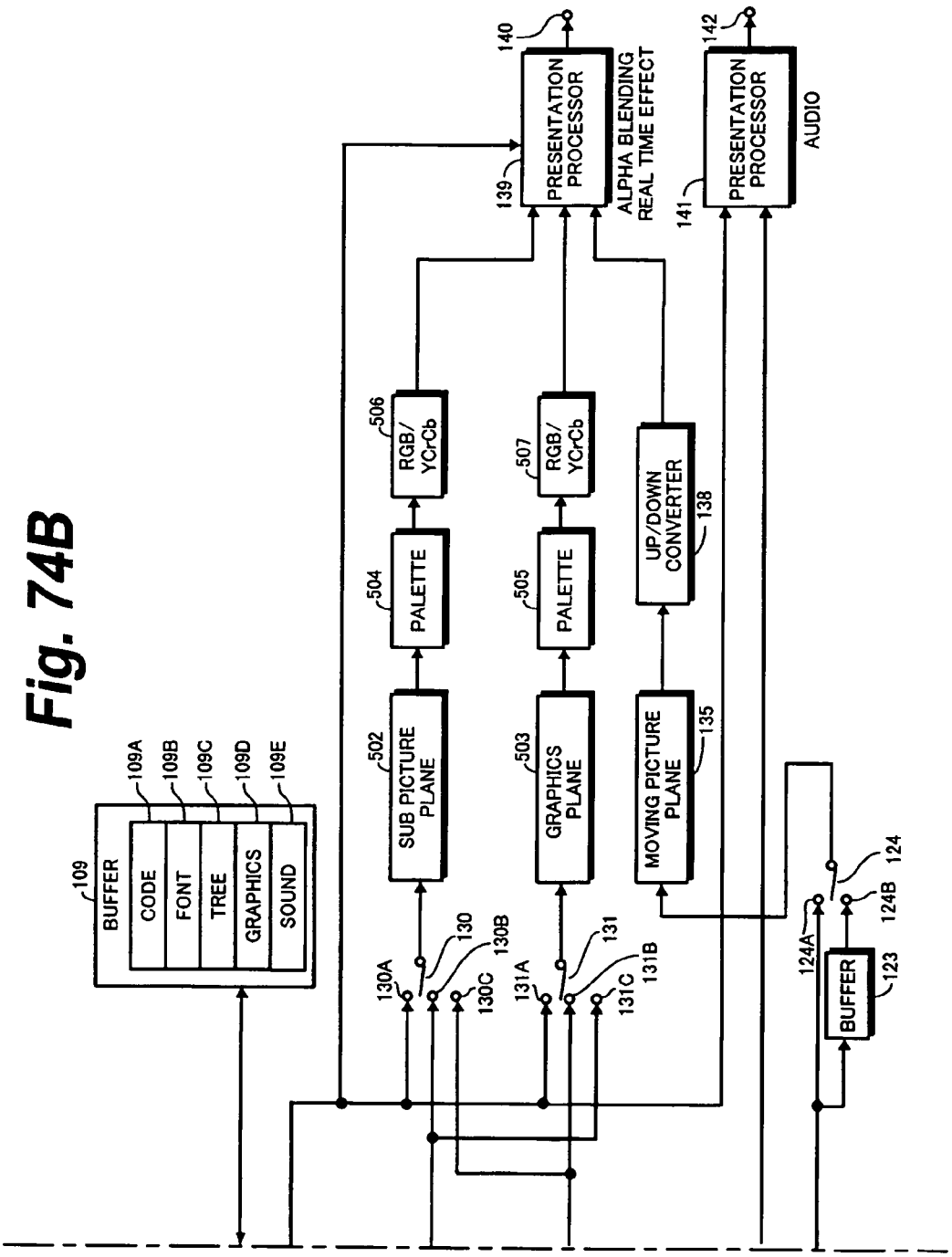

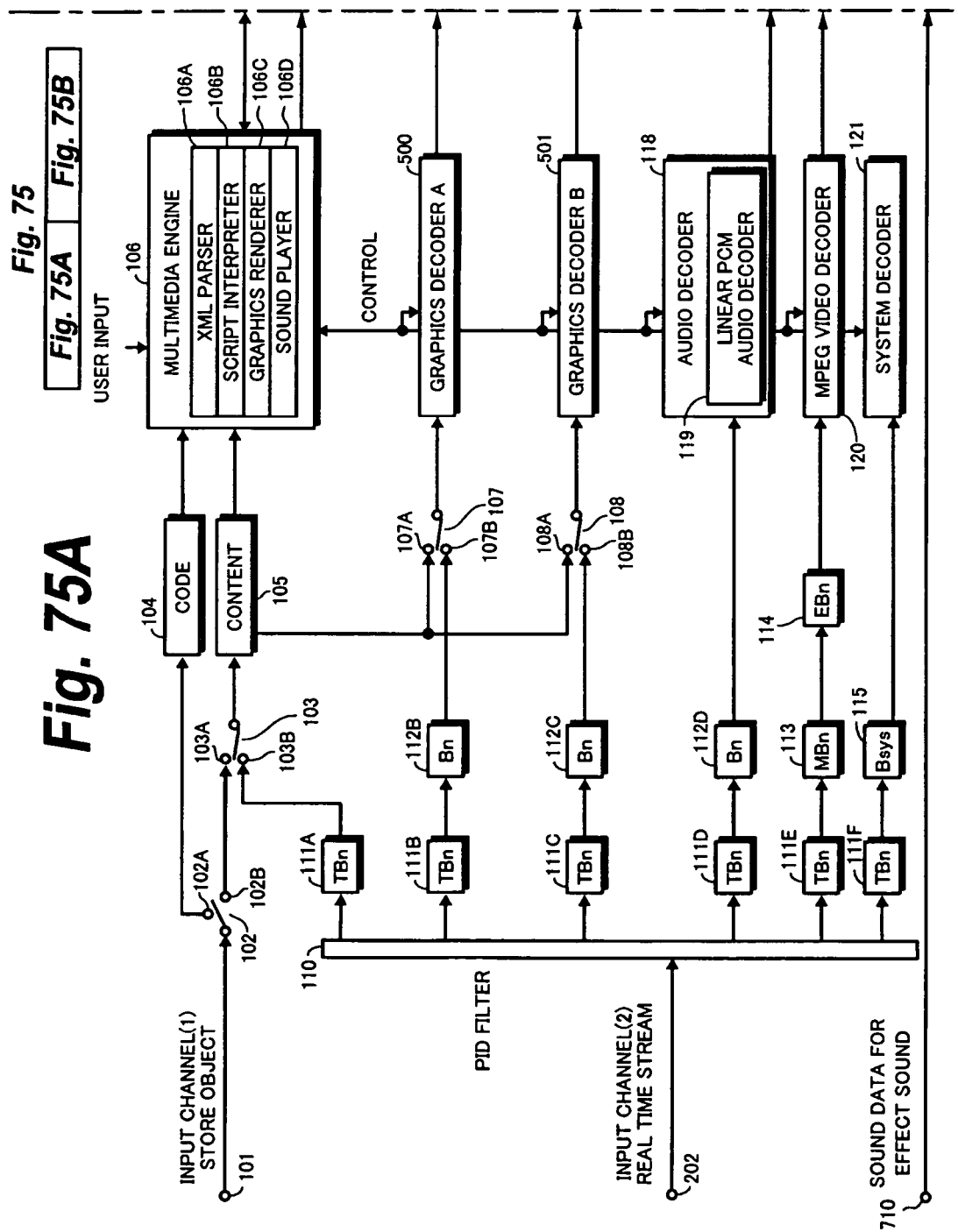

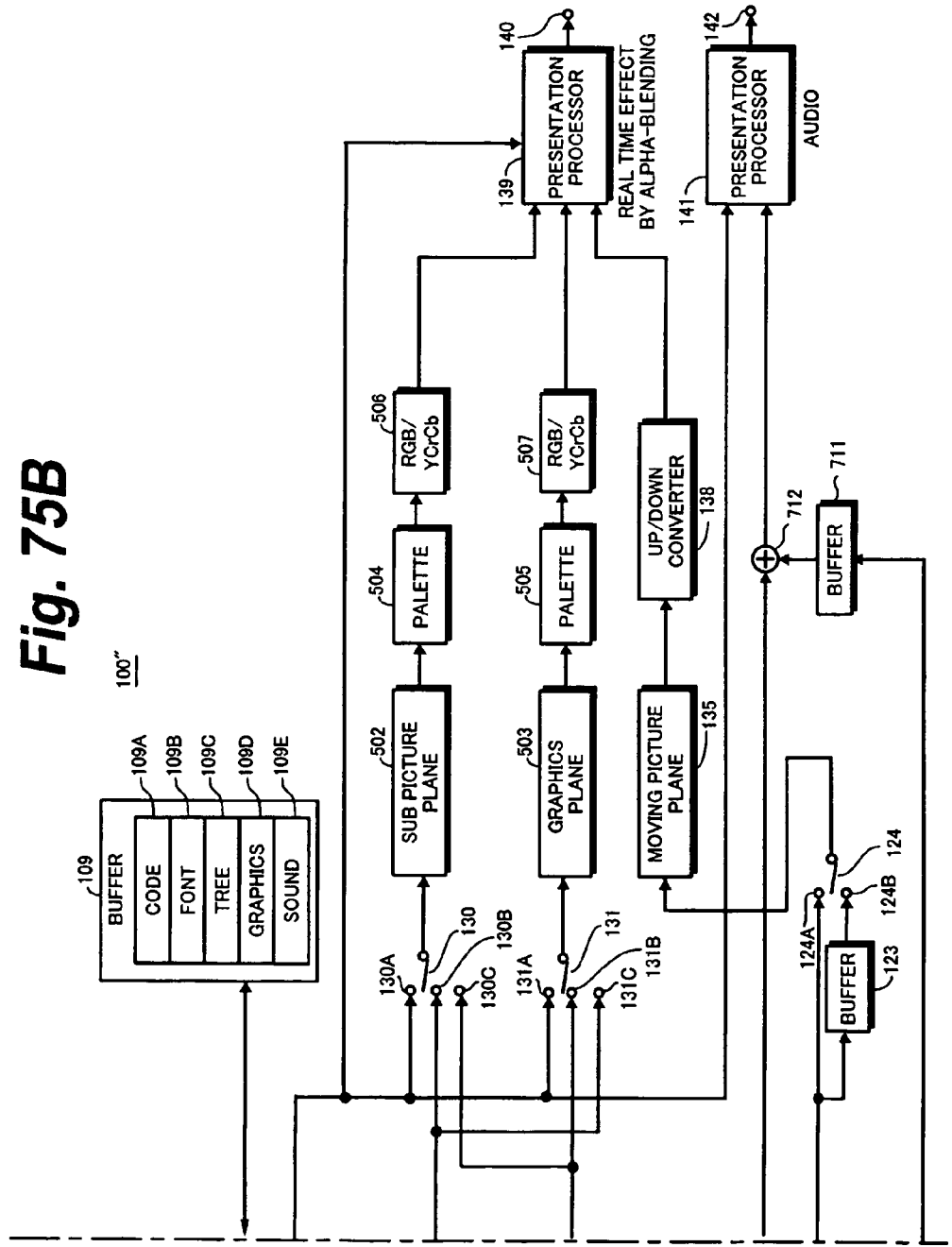

*Fig. 86*

| Syntax | No. of bits | Mnemonic |
|---|---|---|
| scenario.pbc{ | | |
|   type_indicator | 8*4 | bslbf |
|   version_number | 8*4 | bslbf |
|   TitleEntry_start_address | 32 | uimsbf |
|   Scenario_start_address | 32 | uimsbf |
|   reserved_for_future_use | 192 | bslbf |
|   GlobalCommand() | | |
|   for(i=0; i<N1; i++){ | | |
|     padding_word | 16 | bslbf |
|   } | | |
|   TitleEntry() | | |
|   for(i=0; i<N2; i++){ | | |
|     padding_word | 16 | bslbf |
|   } | | |
|   Scenario() | | |
|   for(i=0; i<N3; i++){ | | |
|     padding_word | 16 | bslbf |
|   } | | |
| } | | |

Fig. 87

| Syntax | No. of bits | Mnemonic |
|---|---|---|
| GlobalCommand(){ | | |
|   length | 32 | uimsbf |
|   reserved_for_word_align | 16 | bslbf |
|   number_of_commands | 16 | uimsbf |
|   for(command_number=0;command_number<number_of_commands;command_number++){ | | |
|     command | 32 | bslbf |
|   } | | |
| } | | |

Fig. 88

| Syntax | Number of bits | Mnemonic |
|---|---|---|
| TitleEntry(){ | | |
|   length | 32 | uimsbf |
|   // Title Entries | | |
|   number_of_Titles | 16 | uimsbf |
|   for(uint title_number=0;title_number<Number_of_Titles;title_number++){ | | |
|     Entry_PlayList_file_name | 8*10 | bslbf |
|     Title_name_character_set | 8 | bslbf |
|     Title_name | 8*255 | bslbf |
|   } | | |
|   // Chapter Entries | | |
|   number_of_Chapters | | |
|   for(uint chapter_number=0;chapter_number<Number_of_Chapters;chapter_number++){ | | |
|     Title_number | 16 | uimsbf |
|     chapter_entry_PlayList_file_name | 8*10 | bslbf |
|     chapter_ref_to_PlayItemId | 16 | uimsbf |
|     chapter_time_stamp | 32 | uimsbf |
|   } | | |
|   // Entry PL for the Title Menu | | |
|   Title_Menu_Call_PL(){ | | |
|     flags | 32 | |
|     TitleMenu_entry_PlayList_file_name | 8*10 | bslbf |
|     TitleMenu_ref_to_PlayItemId | 16 | uimsbf |
|     TitleMenu_chapter_time_stamp | 32 | uimsbf |
|   } | | |
|   UOP_mask_table() // For Volume | | |
| } | | |

Fig. 89

| Syntax | Number of bits | Mnemonic |
|---|---|---|
| Scenario() { | | |
|   length | 32 | |
|   reserved_for_word_align | 16 | |
|   number_of_PlayLists | 16 | |
|   for(i=0;i<Number_of_PlayLists;i++){ | | |
|     flags | 32 | |
|     PL_UOP_mask_table() // For PlayList | 32 | |
|     Parental_level | 32 | |
|     number_of_Pre_Commands | 32 | |
|     number_of_Post_Commands | 32 | |
|     Pre_Commands_start_id | 32 | |
|     Post_Commands_start_id | 32 | |
|     number_of_PlayItems | | |
|     for(PlayItem_id=0;PlayItem_id<number_of_PlayItems;PlayItem_id++){ | | |
|       PL_UOP_mask_table() // For PlayItem | 32 | |
|       PI_Commands_start_id | 32 | |
|     } | | |
|   } | | |
|   number_of_PL_Commands | 16 | |
|   // Command tabel for each PlayList | | |
|   for(i=0;i<number_of_PL_Commands;i++){ | | |
|     PL_Command() | 32 | |
|   } | | |
| } | | |

Fig. 90

| METHOD | REMARKS |
|---|---|
| COMMANDS FOR DESIGNATING REPRODUCTION START POSITION | |
| LinkPlayList(playListNumber) | CAUSES REPRODUCTION OF PlayList DESIGNATED BY PlayListNumber BE STARTED |
| LinkPlayItem (playListNumber,playItemNumber) | CAUSES REPRODUCTION OF DESIGNATED PlayItem OF DESIGNATED playList TO BE STARTED. playItemNumber IS PlayItem_id STARTING FROM 0. WHEN PlayList IS REPRODUCED FROM BEGINNING, PlayItemNumber IS 0. |
| Link(position)(object) position=("prev"\|"next"\|"top"\| "Parent"\|"tail") object=(PlayList \| PlayItem \| Chapter) | CAUSES CURRENT POSITION TO BE MOVED IN SCENARIO. CAUSES CURRENT REPRODUCTION POSITION TO BE MOVED TO ADJACENT PlayList, PlayItem, OR Chapter. |
| Exit | CAUSES REPRODUCTION OF SCENARIO TO BE STOPPED. VALUE OF STANDARD REGISTER IS NOT HELD. |
| RSM | CAUSES REPRODUCTION TO BE RESUMED FROM LAST REPRODUCTION STOP POSITION. RESUME INFORMATION TO BE CALLED, IT TO BE SET TO REGISTER, AND REPRODUCTION OF SCENARIO TO BE STARTED. |
| COMMANDS FOR OBTAINING STATE OF PLAYER | |
| getMenuDescriptionLanguage() | CAUSES LANGUAGE OF MENU THAT IS DISPLAYED TO BE OBTAINED. |
| getScenarioNumber() | CAUSES SCENARIO NUMBER THAT IS BEING REPRODUCED TO BE OBTAINED. |
| getPlayListNumber() | CAUSES PLAY LIST NUMBER THAT IS BEING REPRODUCED TO BE OBTAINED. |
| getChapterNumber() | CAUSES CHAPTER NUMBER THAT IS BEING REPRODUCED TO BE OBTAINED. |
| getPlayerSupport() | CAUSES VERSION AND FUNCTION OF PLAYER TO BE OBTAINED. |
| COMMANDS FOR VIDEO STREAMS | |
| getVideoStreamAvailability() | CAUSES INFORMATION THAT DESCRIBES WHETHER OR NOT DESIGNATED VIDEO STREAM IS CONTAINED TO BE OBTAINED. |
| setVideoStreamNumber() | DESCRIBES VIDEO STREAM TO BE DECODED. |
| getVideoStreamNumber() | CAUSES VIDEO STREAM NUMBER THAT IS BEING SELECTED TO BE OBTAINED. |
| getVideoStreamAttribute() | CAUSES ATTRIBUTE OF VIDEO STREAM (ENCODING SYSTEM, RESOLUTION, ASPECT RATIO, DISPLAY MODE IN THE CASE OF ASPECT RATIO OF 4 : 3, CLOSED CAPTION) TO BE OBTAINED. |
| setAngleNumber() | DESCRIBES ANGLE NUMBER. |
| getAngleNumber() | CAUSES ANGLE NUMBER THAT IS BEING SELECTED TO BE OBTAINED. |
| getMaxVideoStreams() | CAUSES NUMBER OF VIDEO STREAMS THAT CAN BE SELECTED TO BE OBTAINED. DESCRIBES WHETHER OR NOT getVideoStreamAvailability() IS SUFFICIENT. |

REPRODUCING APPARATUS, REPRODUCING METHOD, REPRODUCING PROGRAM, AND RECORDING MEDIUM

BACKGROUND OF THE INVENTION

1. Field of the Invention

The present invention relates to a reproducing apparatus, a reproducing method, a reproducing program, and a recording medium that allow a user to interactively operate a program recorded on a large capacity recording medium such as a blu-ray disc.

2. Description of the Related Art

In recent years, as a standard for a recordable disc type recording medium that is detachable from a recording and reproducing apparatus, blu-ray disc standard has been proposed. The blu-ray disc standard prescribes a disc that has a recording medium having a diameter of 12 cm and a cover layer having a thickness of 0.1 mm. The blu-ray disc standard uses a bluish-purple laser having a wavelength of 405 nm and an objective lens having a numerical aperture of 0.85. The blu-ray disc standard accomplishes a recording capacity of 27 GB (Giga bytes) maximum. As a result, a program of a broadcasting satellite (BS) digital high-vision broadcast available in Japan can be recorded for two hours or longer without deterioration of picture quality.

As sources (supply sources) of audio/video (AV) signals recorded on the recordable optical disc, an analog signal of for example a conventional analog television broadcast and a digital signal of for example a digital television broadcast such as a BS digital broadcast will be used. The blu-ray disc standard has established a method for recording AV signals of such broadcasts.

On the other hand, as a derivative standard of the current blu-ray disc standard, a reproduction-only recording medium on which a movie, music, or the like is prerecorded is being developed. As a disc-shaped recording medium on which a movie or music is prerecorded, a digital versatile disc (DVD) has been widely used. The reproduction-only optical disc in accordance with the blu-ray disc standard is largely different from and superior to the conventional DVD in a large recording capacity and a high speed transfer speed that allow a high-vision picture to be recoded for two hours or longer in high quality.

On the other hand, the current blu-ray disc standard prescribes neither a method for displaying a list of video contents of a disc on a screen nor a user interface function for allowing a user to move a cursor on the list and select a video content that he or she wants to reproduce from the list. These functions are accomplished by a recording and reproducing apparatus main unit that records and reproduces video contents to and from the blu-ray disc. Thus, even if a video content is reproduced from the same recording medium, the layout of the contents list screen depends on the recording and reproducing apparatus for use, and so does the user interface. Thus, the user cannot easily use the blu-ray disc. Consequently, it is necessary to allow the reproduction-only disc to display a menu screen and so forth that the disc (contents) producer has designed, not depend on the reproducing apparatus.

In addition, a multiple story function of which a selection screen is displayed while a video content is being reproduced is generally called an interactive function. To accomplish the interactive function, it is necessary for the disc producer to create a scenario that he or she has designated a reproduction order and branches of the video content, describe the scenario using a program language, a script language, or the like, and record the described scenario on a disc. The reproducing apparatus side reads and executes the scenario. As a result, the reproducing apparatus reproduces a video content and displays selection screens that allow the user to select branches of the video content that the producer has designated.

Thus, the current blu-ray disc standard (blu-ray disc rewritable format ver 1.0) prescribes neither a method for composing a menu screen and a branch selection screen that a contents producer has designated, nor a method for describing a process for a user input. Consequent, to date, it is difficult to reproduce a video content from the blu-ray disc in accordance with a scenario that the producer has designated with compatibility irrespective of manufactures and models of reproducing apparatuses.

For a reproduction-only disc on which a movie has been recorded, a function for displaying subtitles is essential. However, the current blu-ray disc standard does not prescribe the function for describing subtitles.

On the other hand, the foregoing interactive function has been already accomplished in for example the DVD (Digital Versatile Disc) standard. For example, in the DVD video, while a moving picture is being reproduced, a menu screen is called using a remote control commander. For example, by selecting a button displayed on a menu screen, the user can perform a process for changing the current scene that is being reproduced. The DVD standard also prescribes a function for displaying subtitles. That function allows the user to switch Japanese subtitles to English subtitles or vice versa that have been prepared.

In the case of the DVD, a menu screen is composed of a fixed sub picture. When the menu screen is called, it is displayed in such a manner that the sub picture is combined with a moving picture. Japanese Patent Laid-Open Publication No. HEI 10-308924 (hereinafter referred to as the patent document 1) describes a structure for combining sub picture data with moving picture data and recording the combined data on a recordable DVD.

Next, an example of a menu screen according to the related art reference will be described in brief. Before a movie main part is reproduced from a DVD by a reproducing apparatus, a menu screen is displayed. Generally, a plurality of buttons are disposed on the menu screen. Each button is assigned a predetermined operation. When the user selects a button and causes the operation of the selected button to be executed, the operation assigned to the selected button is executed. For example, when the user selects a button "movie main part" and causes the operation of the selected button to be executed, the operation assigned to the button is executed. As a result, the movie main part is reproduced from the DVD.

The user operates keys (direction keys) assigned to up, down, left, and right directions with for example the remote control commander (hereinafter referred to as remote controller) so as to select one button displayed on the menu screen. Thereafter, with an OK key, the user causes the operation assigned to the selected button to be executed. In addition, each button has three states that are a normal state (non-selection state), a selection state, and an execution state. To allow the user to easily distinguish them, they have different images and colors. Generally, there is only one button that is placed in the selection state or the execution state.

For example, in the DVD video, each button is displayed with two types of data called sub picture and highlight. FIG. 1 shows an example of a DVD menu screen 300 according to a related art reference. The menu screen 300 is referred to as "title menu". The menu screen 300 has three buttons 301A, 301B, and 301C that represent "move main part play", "bonus picture", and "sound setting", respectively. In the example shown in FIG. 1, the color of an outer frame of the "movie main part play" button 301A has been changed from the original color. That describes that the "movie main part play" button 301A has been placed in the selection state.

In such a state, when the user operates the direction keys on the remote controller, for example as shown in FIG. 2A, FIG. 2B, and FIG. 2C, he or she can cause another button to be placed in the selection state. Like the case shown in FIG. 1, the color of the outer frame of the button that has been selected is different from the colors of the outer frames of the other buttons that have not been selected (non-selected buttons). For example, in the state shown in FIG. 1, when the user operates an OK button disposed on the remote controller, as shown in FIG. 3, the color of the "movie main part play" button 301A is changed to a color that represents the execution state. Thereafter, the menu screen 300 is cleared and the movie main part is reproduced. The foregoing is a basic operation of buttons of the DVD video.

The menu screen 300 as shown in FIG. 1 is composed of three types of data that are a background picture 310, a sub picture 311, and a highlight 312 that are shown in FIG. 4A, FIG. 4B, and FIG. 4C, respectively. The background picture 310 is a still picture, a moving picture of a content main part prerecorded on the DVD, or the like.

As shown in FIG. 5, the sub picture 311 has one bit map picture, four-color information (A0, B0, C0, and D0), and coordinates (X, Y). The bit map picture is represented with information of two bits per pixel. The coordinates (X, Y) represent the display start position of the sub picture 311. Each of the color information A0, B0, C0, and D0 is one-color information data composed of one set of R (Red), G (Green), and B (Blue) data. Each of colors R, G, and B has information of eight bits. The bit map picture has information of two bits per pixel. With two bits, one is selected from the foregoing four-color information (A0, B0, C0, D0) for each pixel. Color information also has transparency data. The sub picture 311 may have a region in which the background picture 310 is transparent. The display position of the upper left corner of the sub picture 311 is represented with coordinates (X, Y) relative to the background picture 310.

In addition, the sub picture 311 may have information that represents a display start time and a display end time and commands that cause visual effects such as fade-in and fade-out to be applied to the sub picture 311.

In the DVD video, a plurality of bit map pictures cannot be displayed at the same time. Thus, the menu screen 300 on which the plurality of buttons as shown in FIG. 1 are placed is displayed with one large bit map picture that has three button images as shown in FIG. 4B. In the bit map picture of the sub picture 311 shown in FIG. 4B, when a region outside the buttons 301A, 301B, and 301C is designated as a transparent region and the sub picture 311 is combined with the background picture 310, the background picture 310 becomes transparent outside the display regions of the buttons 301A, 301B, and 301C.

The highlight 312 is information used to change four colors used for the sub picture 311 to other four colors. As shown in FIG. 5, as color information, the highlight 312 has color information (A1, B1, C1, D1) of a selection state and color information (A2, B2, C2, D2) of an execution state. These color information is four-color information represented with RGB of eight bits each like the foregoing sub picture 311.

The highlight 312 has a set of coordinates of regions in which colors are changed. The range of which colors are changed is not limited to all the sub picture 311, but a part of the sub picture 311 as a square region. The number of square regions in the sub picture 311 of which colors are changed by the highlight 312 corresponds to the number of buttons that the user can select. The display position of each square region is represented by coordinates (X, Y) of the positions of the upper left corner and the lower left corner thereof. For example, the position of the highlight 312A corresponding to the button 301A is represented by coordinates (X1, Y1) and (X1', Y1'). That applies to the highlights 312B and 312C corresponding to the buttons 301B and 301C, respectively.

For example, in the highlight 312A, color information (A0, B0, C0, D0) of a region represented by coordinates (X1, Y1) and (X1', Y1') of the background picture 310 is changed to color information (A1, B1, C1, D1) designated as a color of a selection state. At this point, the color information A0 of the background picture 310 is changed to color information A1 of the highlight 312A. Likewise, the color information B0 of the background picture 310 is changed to the color information B1. The color information C0 is changed to the color information C1. The color information D0 is changed to the color information D1.

Next, an example of a color change of the highlight 312 will be described corresponding to a change of a state of the button 301A on the menu screen 300 shown in FIG. 1, FIG. 2A, FIG. 2B, FIG. 2C, and FIG. 3. It is assumed that when the button 301A is in the non-selection state, the frame, front surface, and characters of the button 301A are displayed with the color information B0, the color information C0, and the color information D0, respectively. When the button 301A is placed in the selection state, the frame color B0 of the button 301A is changed to the color information B1 corresponding to the selection state of the highlight 312A. At this point, the front surface color C0 and the character color D0 are not changed. Thereafter, when the button 301A is placed in the execution state, the front surface color C0 of the button 301A, which is the color of the selection state, is changed to the color information C1. At this point, the frame color B1 and the character color D0, which are the colors of the selection state, are not changed.

When a picture of the DVD video is normally reproduced, a picture corresponding to the background picture 310 is displayed. On the other hand, when a movie that has subtitles is reproduced, the background picture 310 of which the movie main part is reproduced and the sub picture 311 of which the subtitles are displayed are combined and displayed.

However, in the DVD video, the sub picture 311, the highlight 312 that represents the selection state, and the highlight 312 that represents the execution state can use only up to four colors each. Thus, as a problem of the related art, a sub picture having many colors cannot be displayed.

In addition, the highlight 312 only changes the color of the sub picture 311. Thus, characters of a button cannot be changed in for example the selection state and the execution state. In addition, an effect of which the shape of a button is changed cannot be accomplished. Thus, the related art cannot accomplish an enriched user interface.

In addition, conventionally, subtitles and buttons are displayed with the same scheme using the sub picture 311. Thus, the subtitles and the buttons cannot be independently controlled and displayed. In addition, a combining process for setting and combining transparencies of the subtitles and buttons and displaying the combined picture cannot be performed.

In addition, in the DVD video, when the menu screen is called, moving picture data reproduced in the background thereof is stopped. Thus, conventionally, even if such an interactive function were accomplished, the flexibility of the user interface that accomplishes the function would be low.

In the DVD video, a scheme for generating an effect sound in synchronization with subtitles displayed and changed has not been prescribed in the standard. Thus, an effect sound cannot be generated in synchronization with for example subtitles as a problem of the related art.

In addition, the standard does not prescribe a scheme for generating effect sounds for buttons such as an effect sound that is generated when the user places a button in the selection state and a click sound that is generated when the user operates an OK key in the selection state of a button. Thus, it is difficult to accomplish an enriched user interface as a problem of the related art.

In the foregoing, the effect sound is not sound data that is reproduced in synchronization with a moving picture or a still picture displayed on the moving picture plane (for example, sound that is recoded as a pair of a movie picture), but audio data reproduced by or in synchronization with a display control of subtitles and buttons.

OBJECTS AND SUMMARY OF THE INVENTION

Therefore, an object of the present invention is to provide a reproducing apparatus, a reproducing method, a reproducing program, and a recording medium that allow a user interface with high flexibility for a large capacity reproduction-only optical disc to be accomplished.

Another object of the present invention is to provide a reproducing apparatus, a reproducing method, a reproducing program, and a recording medium that allow an enriched user interface for a large capacity reproduction-only optical disc to be accomplished.

A first aspect of the present invention is a reproducing apparatus for reproducing contents data recorded on a disc-shaped recording medium, the apparatus comprising inputting means for inputting a non-real time stream and a real time stream reproduced from the recording medium, the non-real time stream containing a file storing as a set of at least a program code, image data composing an operation screen prompting a user to perform an operation, and a plurality of pieces of sound data with which effects sounds are reproduced, the real time stream containing at least moving picture data and subtitle data; storing means for storing the program code that has been input by the inputting means; image data storing means for storing the image data that has been input by the inputting means; first combining means for combining decoded moving picture data of which the moving picture data that had been input by the inputting means has been decoded and decoded subtitle data of which the subtitle data that had been input by the inputting means has been decoded; and second combining means for combining the decoded image data that has been stored in the image data storing means and the combined data of the decoded moving picture and the decoded subtitle data combined by the first combining means in accordance with the program code stored in the code storing means.

A second aspect of the present invention is a reproducing method for reproducing contents data recorded on a disc-shaped recording medium, the method comprising the steps of inputting a non-real time stream and a real time stream reproduced from the recording medium, the non-real time stream containing a file storing as a set of at least a program code, image data composing an operation screen prompting a user to perform an operation, and a plurality of pieces of sound data with which effects sounds are reproduced, the real time stream containing at least moving picture data and subtitle data; storing the program code that has been input at the inputting step; storing the image data that has been input at the inputting step; combining decoded moving picture data of which the moving picture data that had been input at the inputting step has been decoded and decoded subtitle data of which the subtitle data that had been input at the inputting step has been decoded; and combining the decoded image data that has been stored at the second storing step and the combined data of the decoded moving picture and the decoded subtitle data combined at the first combining step in accordance with the program code stored at the first storing step.

A third aspect of the present invention is a reproducing program for causing a computer device to execute a reproducing method for reproducing contents data recorded on a disc-shaped recording medium, the method comprising the steps of inputting a non-real time stream and a real time stream reproduced from the recording medium, the non-real time stream containing a file storing as a set of at least a program code, image data composing an operation screen prompting a user to perform an operation, and a plurality of pieces of sound data with which effects sounds are reproduced, the real time stream containing at least moving picture data and subtitle data; storing the program code that has been input at the inputting step; storing the image data that has been input at the inputting step; combining decoded moving picture data of which the moving picture data that had been input at the inputting step has been decoded and decoded subtitle data of which the subtitle data that had been input at the inputting step has been decoded; and combining the decoded image data that has been stored at the second storing step and the combined data of the decoded moving picture and the decoded subtitle data combined at the first combining step in accordance with the program code stored at the first storing step.

A fourth aspect of the present invention is a recording medium from which a computer device can read a reproducing program that causes the computer device to execute a reproducing method for reproducing contents data recorded on a disc-shaped recording medium, the method comprising the steps of inputting a non-real time stream and a real time stream reproduced from the recording medium, the non-real time stream containing a file storing as a set of at least a program code, image data composing an operation screen prompting a user to perform an operation, and a plurality of pieces of sound data with which effects sounds are reproduced, the real time stream containing at least moving picture data and subtitle data; storing the program code that has been input at the inputting step; storing the image data that has been input at the inputting step; combining decoded moving picture data of which the moving picture data that had been input at the inputting step has been decoded and decoded subtitle data of which the subtitle data that had been input at the inputting step has been decoded; and combining the decoded image data that has been stored at the second storing step and the combined data of the decoded moving picture and the decoded subtitle data combined at the first combining step in accordance with the program code stored at the first storing step.

A fifth aspect of the present invention is a disc-shaped recording medium on which contents data is recorded, a non-real time stream that contains at least a program code and image data that composes an operation screen that prompts a user to perform an operation, a real time stream that contains at least moving picture data and subtitle data, and a file that stores as a set of a plurality of pieces of sound data with which effects sounds being recorded, decoded image data that has been stored and combined data of decoded moving picture and decoded subtitle data that have been combined being combined in accordance with the program code.

A sixth aspect of the present invention is a recording apparatus for recording contents data on a disc-shaped recording medium, the apparatus comprising; recording means for recording a non-real time stream and a real time stream, the non-real time stream containing a file storing as a set of at least a program code, image data composing an operation screen prompting a user to perform an operation, and a plurality of pieces of sound data with which effects sounds, the real time stream containing at least moving picture data and subtitle data; wherein the program code is to execute a combining decoded image data obtained by decoding the image data which is recorded by the recording means and combined data which is comprising of decoded moving picture data of the real-time stream and decoded subtitle data of which the subtitle data of the real-time stream.

As described above, according to the first to fourth aspect of the present invention, a non-real time stream and a real time stream that have been reproduced from the recording medium are input. The non-real time stream contains a file that stores as a set of at least a program code, image data that composes an operation screen prompting a user to perform an operation, and a plurality of pieces of sound data with which effects sounds are reproduced. The real time stream contains at least moving picture data and subtitle data. The program code is stored in code storing means. The image data is stored in image data storing means. Decoded moving picture data of which the moving picture data that had been input has been decoded and decoded subtitle data of which the subtitle data that had been input has been decoded are combined and combined data of the decoded moving picture and the decoded subtitle data is obtained. The decoded image data that has been stored in the image data storing means and the combined data of the decoded moving picture and the decoded subtitle data are combined in accordance with the program code stored in the code storing means. Thus, when contents data is reproduced, the operation screen using the same image data can be easily displayed at different timings. In addition, effect sounds that prompt the user to operate on the operation screen can be reproduced.

According to the fifth aspect of the present invention, a non-real time stream that contains at least a program code and image data that composes an operation screen that prompts a user to perform an operation, a real time stream that contains at least moving picture data and subtitle data, and a file that stores as a set of a plurality of pieces of sound data with which effects sounds being recorded are recorded. Decoded image data that has been stored and combined data of decoded moving picture and decoded subtitle data that have been combined being combined in accordance with the program code. Thus, when contents data is reproduced, the operation screen using the same image data can be easily displayed at different timings. In addition, effect sounds that prompt the user to operate on the operation screen can be reproduced.

According to the sixth aspect of the present invention, a non-real time stream that contains at least a program code and image data that composes an operation screen that prompts a user to perform an operation, a real time stream that contains at least moving picture data and subtitle data, and a file that stores as a set of a plurality of pieces of sound data with which effects sounds being recorded are recorded in recording medium. Decoded image data that has been stored and combined data of decoded moving picture and decoded subtitle data that have been combined being combined in accordance with the program code which is recorded in recording medium. Thus, when contents data in recording medium is reproduced, the operation screen using the same image data can be easily displayed at different timings. In addition, effect sounds that prompt the user to operate on the operation screen can be reproduced.

As described above, a prerecorded large capacity disc according to the present invention has three independent planes that are a moving picture plane for a moving picture, a subtitle plane for subtitles, and a graphics plane for a screen having an interruptive function such as a menu screen. These planes are combined and displayed. Thus, as an effect of the present invention, a moving picture can be displayed on the moving picture plane, while a menu screen and so forth are displayed on the graphics plane with a background of the moving picture.

In addition, according to the present invention, since a buffer that stores image data to be displayed on the graphics plane is disposed, the same image data can be repeatedly displayed on the graphics plane. Thus, as an effect of the present invention, a menu screen and so forth can be structured with higher flexibility than before.

In addition, according to the present invention, a display control for graphics displayed on a graphic plane is described using display control commands. Thus, as an effect of the present invention, an interactive function can be accomplished with a screen displayed on the graphics plane.

In addition, a prerecorded large capacity disc according to the present invention has three independent planes that are a moving picture plane for a moving picture, a subtitle plane for subtitles, and a graphics plane for a screen having an interruptive function such as a menu screen. These planes are combined and displayed. A common graphics object as a format of an object displayed on the subtitle plane and the graphics plane is defined. A decoder model, display control commands, and an operation model are defined. As a result, as an effect of the present invention, subtitles and buttons can be displayed in synchronization with a moving picture.

In addition, a simple animation of which subtitles and buttons are scrolled and moved and enriched buttons of which the contents of an image are varied corresponding to a user's input can be accomplished.

In addition, according to the present invention, a decoder model of which sound data is contained in a graphics object and of which the sound data is reproduced while a button image contained in the graphics object is displayed is defined. Thus, sound data can be easily reproduced in synchronization with a graphics object that is displayed.

In addition, according to the present invention, a command that causes sound data to be reproduced is defined against a display control command for a graphics object. In addition, sound data can be assigned to image data contained in a graphics object against a display control command for an object. Thus, as an effect of the present invention, sound data such as an effect sound can be reproduced at any time and subtitles and buttons that have effect sounds can be accomplished.

In addition, according to the present invention, a scheme for generating effect sound such as click sound when the user has selected a button on a menu screen displayed by a graphical user interface (GUI) or he or she has operated an OK button after a button has been selected is provided. Thus, in a reproducing apparatus, a reproducing method, a reproducing program, and a recording medium that allows the user to interactively operate a program prerecorded on a large capacity recording medium such as the blu-ray disc, an enriched user interface can be accomplished.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawing, wherein similar reference numerals denote similar portions, in which:

FIG. 5 is a schematic diagram showing an example of a data structure of a sub picture according to the related art reference;

FIG. 10 is a schematic diagram showing syntax that describes an example of a structure of a file "info.bdav";

FIG. 11 is a schematic diagram showing syntax that describes an example of a structure of a block UIAppInfoB-DAV( );

FIG. 12 is a schematic diagram showing syntax that describes an example of a structure of a block TableofPlay-Lists ( );

FIG. 13 is a schematic diagram showing syntax that describes an example of a structure of files "#####.rpls" and "#####.vpls";

FIG. 14 is a schematic diagram showing syntax that describes an example of a structure of a block UIAppInfoPlayList( );

FIG. 15 is a schematic diagram showing syntax that describes an example of a structure of a block PlayList( );

FIG. 16 is a schematic diagram showing syntax that describes an example of a structure of a block PlayItem( );

FIG. 18 is a schematic diagram showing syntax that describes an example of a structure of a block PlayList Mark( );

FIG. 19 is a schematic diagram showing syntax that describes an example of a structure of a file "%%%%%.clpi";

FIG. 20 is a schematic diagram showing an example of a plane structure used as a display system of a picture according to an embodiment of the present invention;

FIG. 21 is a schematic diagram showing examples of resolutions and displayable colors of a moving picture plane, a subtitle plane, and a graphics plane;

FIG. 23 is a schematic diagram showing an example of input and output data of a palette;

FIG. 24 is a schematic diagram showing an example of a palette table held in a palette;

FIG. 28 is a schematic diagram showing examples of events originally defined for the BD virtual player;

FIG. 29A and FIG. 29B is a schematic diagram showing examples of methods defined for the BD virtual player according to the embodiment of the present invention;

FIG. 30A, FIG. 30B, FIG. 30C and FIG. 30D is a schematic diagram showing examples of methods defined for the BD virtual player according to the embodiment of the present invention;

FIG. 31A, FIG. 31B, FIG. 31C and FIG. 31D is a schematic diagram showing examples of methods defined for the BD virtual player according to the embodiment of the present invention;

FIG. 33 is a schematic diagram showing a list of files necessary for structuring a scenario;

FIG. 35 is a schematic diagram showing a more practical example of a description of a script file;

FIG. 36 is a schematic diagram showing a more practical example of a description of a script file;

FIG. 37 is a schematic diagram showing a more practical example of a description of an HTML file;

FIG. 38 is a schematic diagram showing a more practical example of a description of a script file;

FIG. 43 is a schematic diagram showing a state of which a graphics object is divided and contained in a PES packet;

FIG. 46 is a schematic diagram describing an update speed of a plane;

FIG. 47 is a schematic diagram showing syntax that describes an example of a structure of a graphics object;

FIG. 48 is a schematic diagram showing syntax that describes an example of a structure of a block GlobalPaletteTable( );

FIG. 49A and FIG. 49B is a schematic diagram showing an example of a list of display control commands of a command group DispCmds(i);

FIG. 55A and FIG. 55B are schematic diagrams showing an example of which subtitles that are displayed are scrolled;

FIG. 56A and FIG. 56B are schematic diagrams showing an example of which a frame that represents a part of a PNG image is designated, the frame is moved on the PNG image, and the position thereof is moved on the plane;

FIG. 58 is a schematic diagram showing an example of a data structure of a graphics object of which sound data has been assigned to a button image;

FIG. 60 is a functional block diagram showing an example of a graphics object decoder model to which a sound data processing system has been added;

FIG. 61 is a schematic diagram showing syntax that describes an example of a structure of a graphics object to which sound data is added;

FIG. 65 is a schematic diagram showing syntax that describes an example of a file "HdmvSound.bdmv";

FIG. 67 is a schematic diagram showing an example of an image of an application for reproducing an effect sound according to a third storing method;

FIG. 69 is a schematic diagram showing an example of a structure of an interactive composition segment;

FIG. 74 is a functional block diagram showing an example of a structure of a player decoder;

FIG. 75 is a functional block diagram showing another example of a structure of a player decoder;

FIG. 86 is a schematic diagram showing syntax that describes an example of a structure of a scenario file (scenario.pbc) for a scenario;

FIG. 87 is a schematic diagram showing syntax that describes an example of a structure a block Global Command( );

FIG. 88 is a schematic diagram showing syntax that describes an example of a data structure a block TitleEntry( );

FIG. 89 is a schematic diagram showing syntax that describes an example of a structure a block scenario( );

FIG. 90 is a schematic diagram showing examples of commands used in a scenario according to the second mode of the present invention.

DETAILED DESCRIPTION OF THE PREFERRED EMBODIMENTS

Next, the present invention will be described in the following order.
1. Outline of BDAV format
2. First mode of present invention
   2-1. About planes
   2-2. Menu screen
   2-3. About scenarios
   2-4. About virtual player model
   2-5. About methods
   2-6. About execution of commands
   2-7. Decoder model
   2-8. User interface
   2-9. About data structure
   2-10. About decoder model for graphics objects
   2-11. About transfer speed of graphics
   2-12. Details of structure of graphics objects
   2-13. About effect sounds
   2-14. About methods for storing sound data to disc
      2-14a. First storing method
      2-14b. Second storing method
      2-14c. Third storing method
   2-15. Another example of plane
   2-16. Another example of decoder model
   2-17. Further example of decoder model
3. Second mode of present invention
   3-1. About scenarios
   3-2. Categories of scenarios
   3-3. About virtual player model 3-4. About syntax 3-5. About commands 4. Others 1. Outline of BDAV Format First of all, for easy understanding of the present invention, a management structure as prescribed in "Blu-ray Disc Rewritable Format Ver 1.0 part 3 Audio Visual Specification) for contents namely AV (Audio/Video) data prerecorded on the blu-ray disc will be described. In the following description, the management structure is referred to as BDAV format.

A bit stream that has been encoded in accordance with an encoding system such as MPEG (Moving Pictures Experts Group) video or MPEG audio and multiplexed in accordance with MPEG-2 system is referred to as clip AV stream (or simply AV stream). The clip AV stream is recorded as a file on a disc by a file system defined in "Blu-ray Disc Rewritable Format Ver 1.0 part 2" for the blu-ray disc. This file is referred to as clip AV stream file (or simply AV stream).

A clip AV stream file is a management unit on the file system. Thus, it cannot be said that a clip AV stream file is a management unit that the user can easily understand. From a view point of user's convenience, it is necessary to record a scheme necessary for combining a video content that has been divided into a plurality of clip AV stream files and reproducing the combined video content, a scheme necessary for reproducing only a part of a clip AV stream file, information necessary for smoothly performing a special reproduction and a search reproduction, and so forth as a database. "Blu-ray Disc Rewritable Format Ver. 1.0 part 3" as a standard for the blu-ray disc prescribes such a database.

Figure 1:
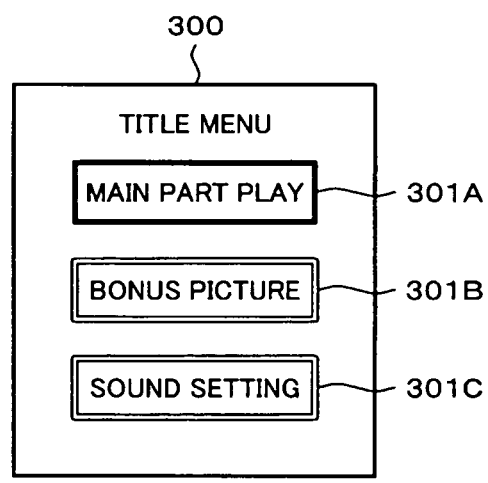
FIG. 1 is a schematic diagram showing an example of a DVD menu screen according to a related art reference.
Figure 2A:
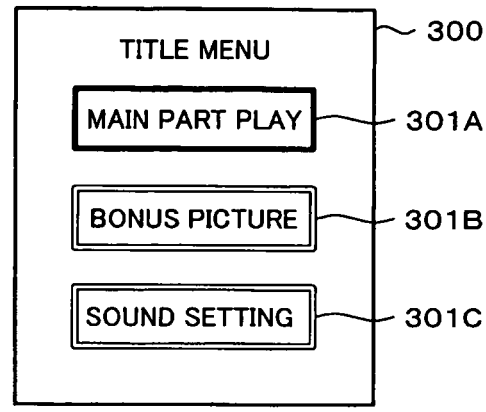
FIG. 2A, FIG. 2B, and FIG. 2C are schematic diagrams showing that buttons whose selection states are changed by an operation of a remote controller.
Figure 2B:
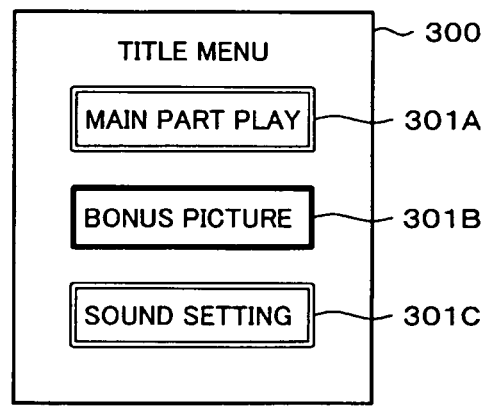
Figure 2C:
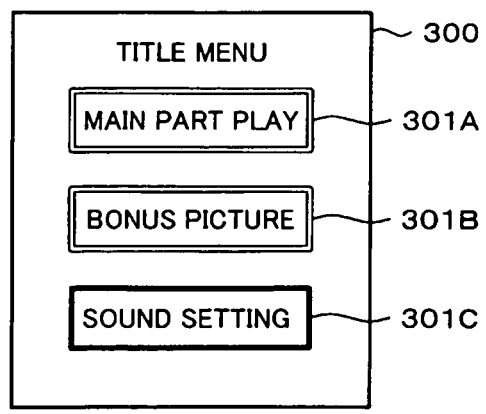
Figure 3:
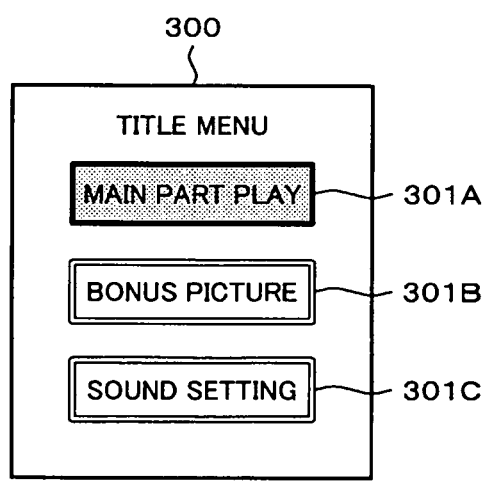
FIG. 3 is a schematic diagram showing that a color of a button is changed to a different color that represents an execution state by an operation of an OK button.
Figure 4A:
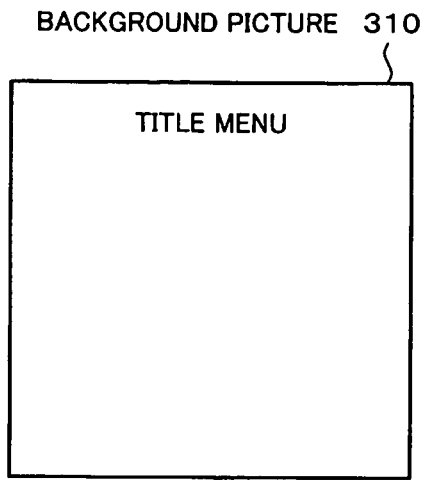
FIG. 4A, FIG. 4B, and FIG. 4C are schematic diagrams showing an example of a structure of a menu screen according to the related art reference.
Figure 4B:
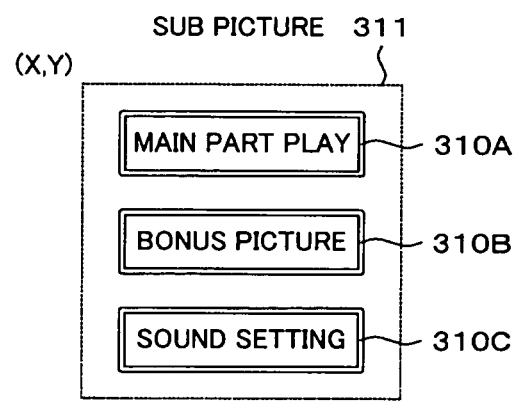
Figure 4C:
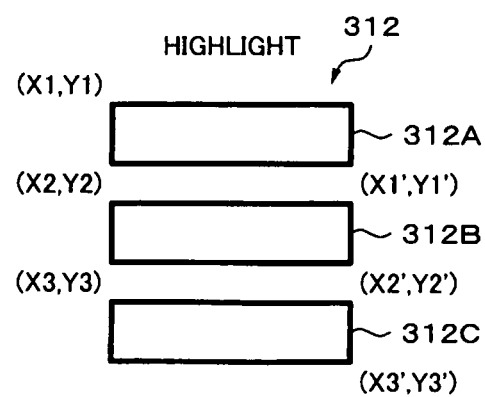
Figure 6:
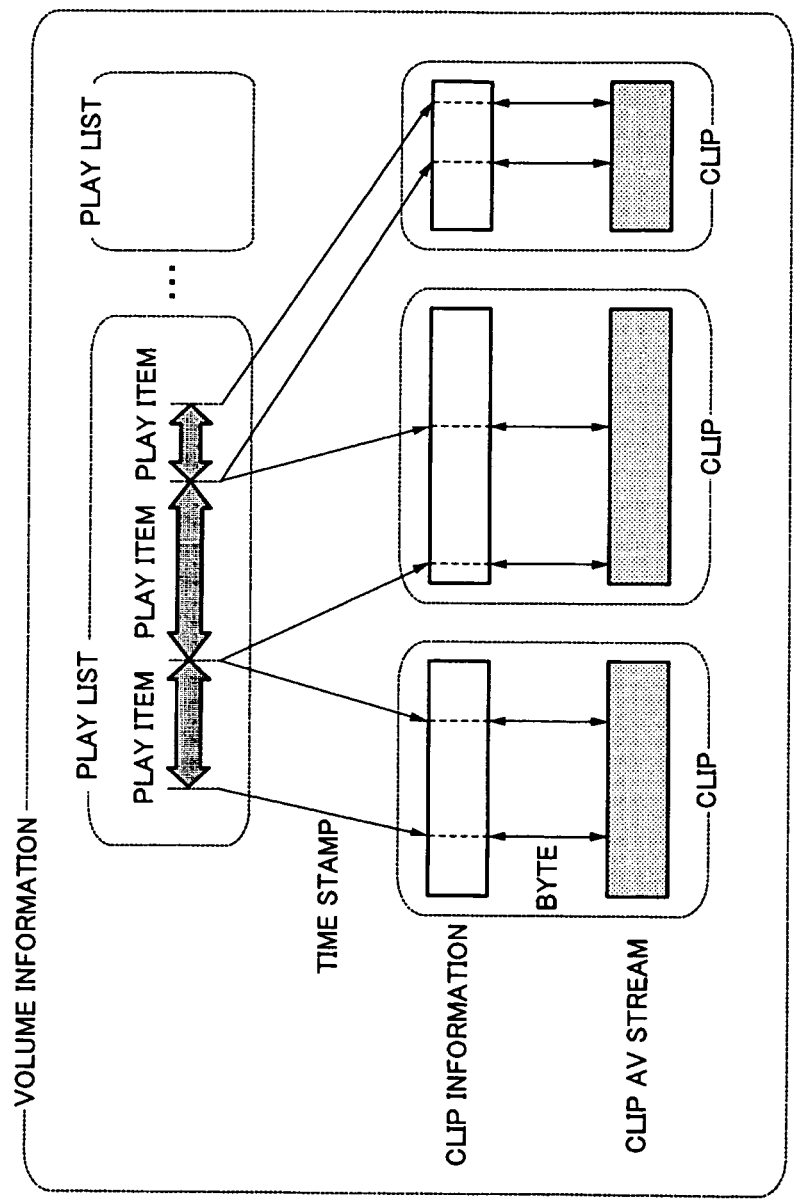
FIG. 6 is a schematic diagram showing a scheme for designating a reproduction order of an AV stream file.

FIG. 6 shows a scheme for designating a part of all an AV stream file, arranging only desired portions thereof, and reproducing the arranged portions. In FIG. 6, a play list (PlayList) causes a part or all an AV stream file to be designated and only desired portions thereof to be reproduced. When the user wants to reproduce a content, he or she selects it in the unit of a play list. A play list is one video/audio unit in which the user implicitly expects that a content will be successively reproduced.

The simplest structure of a play list is one AV stream file obtained after recording of a content is started until the recording is stopped. Unless the AV stream file is edited, it becomes one play list.

A play list is composed of information that represents an AV stream file to be reproduced and sets of reproduction start points and reproduction stop points that designate reproduction start positions and reproduction stop positions of the AV stream file. A pair of information of a reproduction start point and information of a reproduction stop point is referred to as play item (PlayItem). A play list is composed of a set of play items. When a play item is reproduced, a part of the AV stream file referred from the play item is reproduced.

As described above, a clip AV stream is a bit stream of which video data and audio data have been multiplexed in the format of an MPEG2 TS (Transport Stream). Information about the clip AV stream is recorded as clip information to a file.

A set of a clip AV stream file and a clip information file that has corresponding clip information is treated as one object and referred to as clip. A clip is one object that is composed of a clip AV stream and clip information.

A file is generally treated as a sequence of bytes. A content of a clip AV stream file is expanded on the time base. An entry point in a clip is regularly designated on the time base. When a time stamp of an access point to a predetermined clip is given, a clip information file can be used to find information of an address from which data is read in a clip AV stream file.

All play lists and clips recorded on one disc are managed with volume information.

Figure 7:
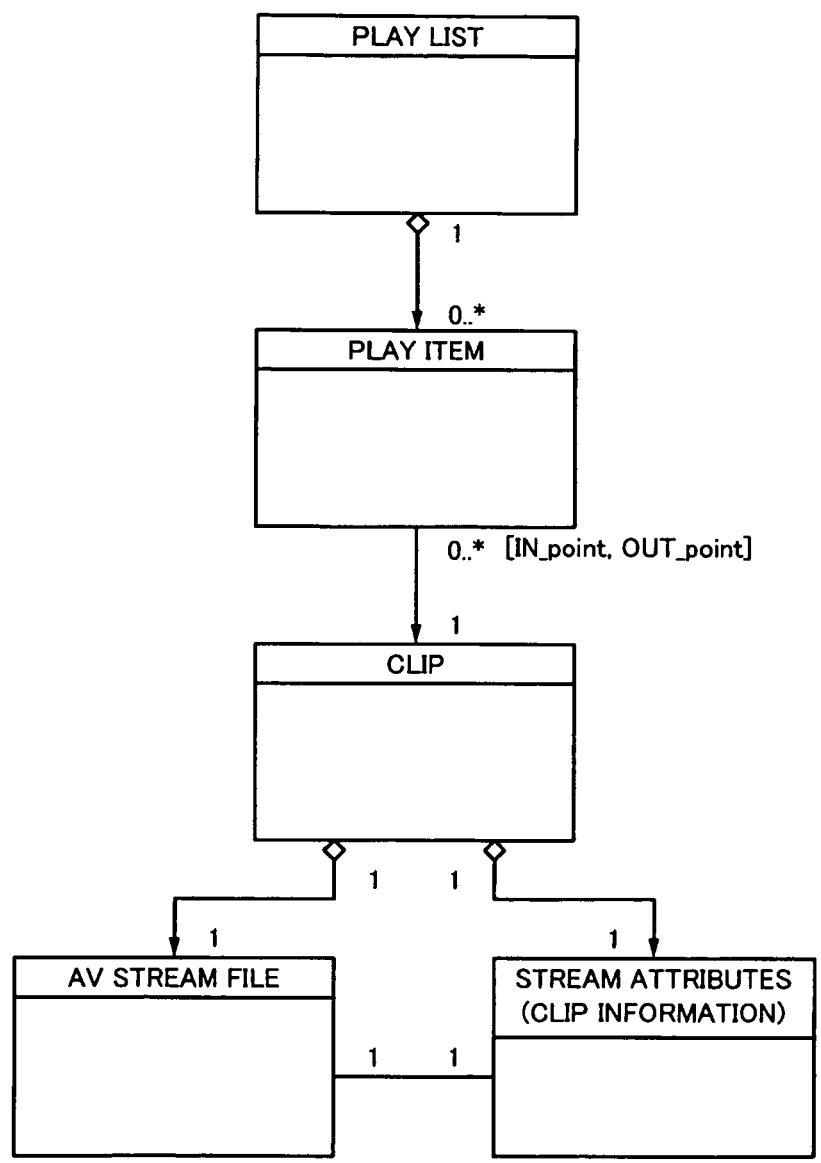
FIG. 7 is a UML diagram showing the relation of a clip AV stream, clip information, a clip, a play item, and a play list.

FIG. 7 shows a unified modeling language (UML) diagram that represents the relation of the foregoing clip AV stream, clip information (stream attributes), clips, play items, and play list. One play list is correlated with one or a plurality of play items. One play item is correlated with one clip. One clip may be correlated with a plurality of play items whose start points and/or end points are different. One clip AV stream file is referenced from one clip. Likewise, one clip information file is referenced from one clip. In addition, one clip AV stream file and one clip information file are correlated with the relation of one to one. With such a structure defined, a reproduction order can be non-destructively designated by reproducing only any part, not changing a clip AV stream file.

Figure 8:
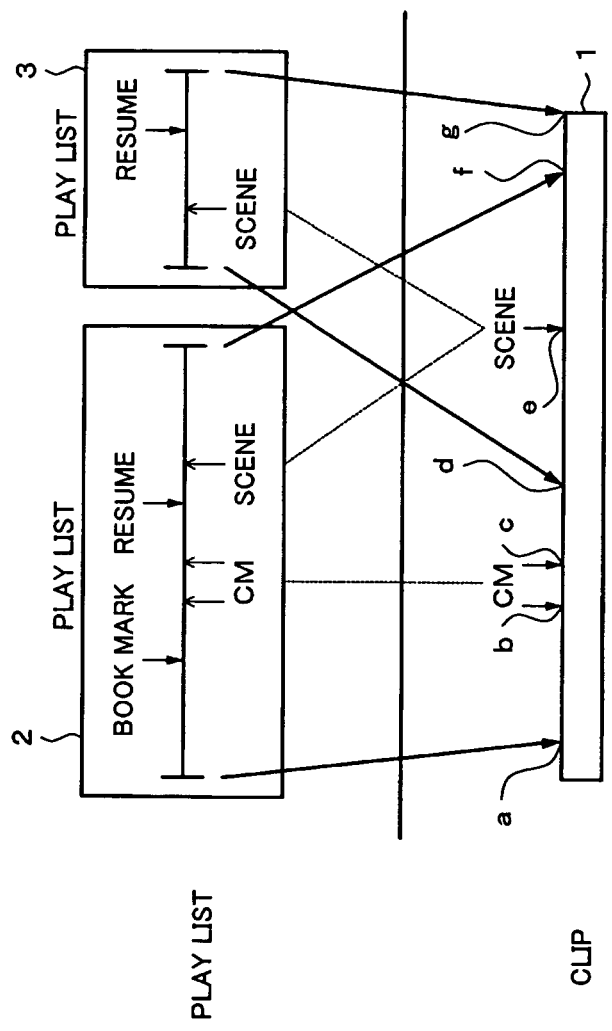
FIG. 8 is a schematic diagram describing a method for referencing the same clip from a plurality of play lists.

In addition, as shown in FIG. 8, the same clip can be referenced from a plurality of play lists. In the example shown in FIG. 8, a clip 1 is referenced from two play lists 2 and 3. In FIG. 8, the horizontal direction of the clip 1 represents the time base. The play list 2 references regions a to f of the clip 1 that include commercial message regions b and c and a scene e. On the other hand, the play list 3 references regions d to g of the clip 1 that include a scene e. When the play list 2 is designated, the regions a to f of the clip 1 can be reproduced. When the play list 3 is designated, the regions d to g of the clip 1 can be reproduced.

Figure 9:
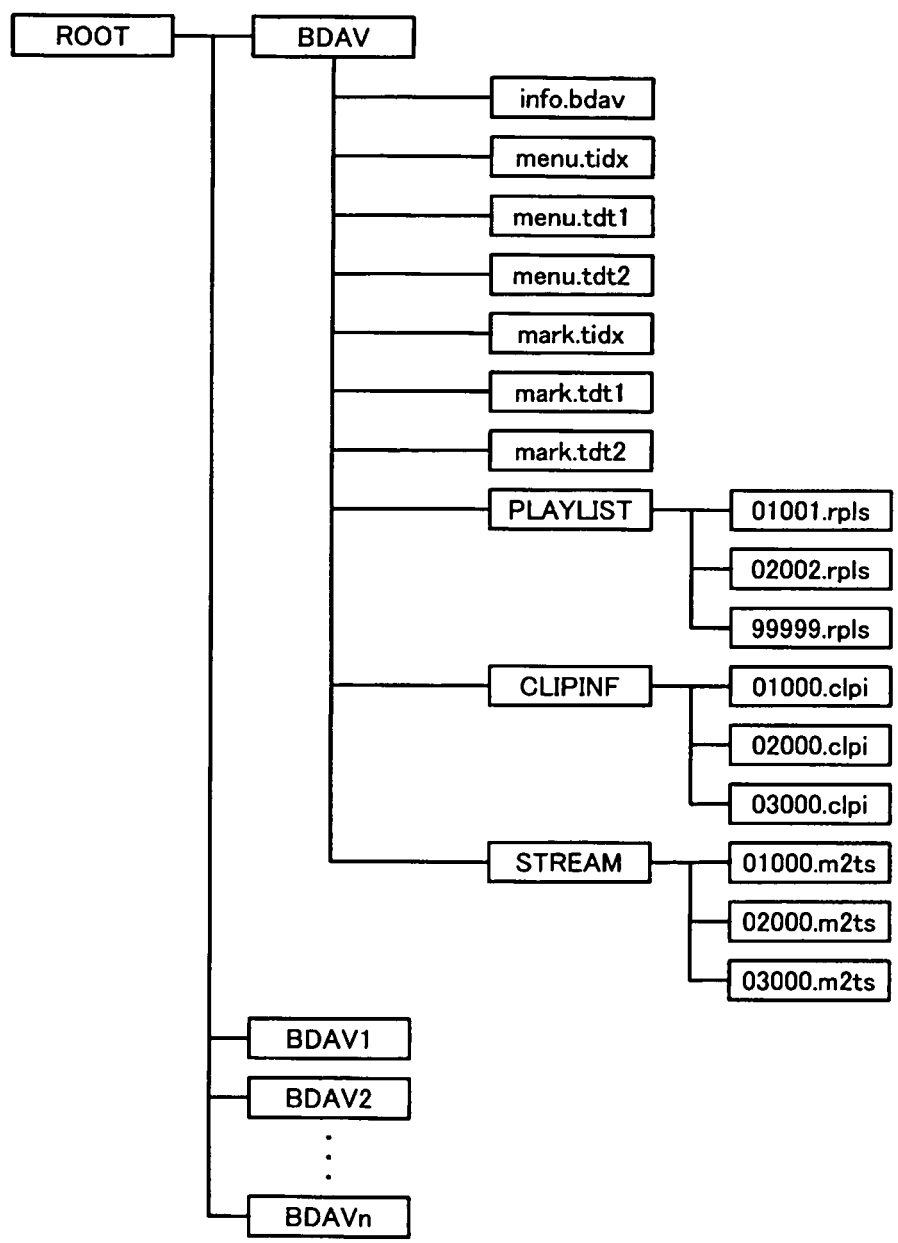
FIG. 9 is a schematic diagram describing a management structure of files recorded on a recording medium.

Next, with reference to FIG. 9, a management structure for files recorded on a recording medium prescribed in "Blu-ray Disc Rewritable Format Ver 1.0 part 3" will be described. Files are hierarchically managed in a directory structure. One directory (a root directory in the example shown in FIG. 9) is created on the recording medium. Under the directory, files are managed by one recording and reproducing system.

Under the root directory, a directory BDAV is placed. As shown in FIG. 9, a plurality of directories such as directories BDAV, BDAV1, BDAV2, . . . , BDAVn can be placed. In the following description, the plurality of directories BDAV, BDAV1, BDAV2 . . . , and BDAVn are represented by the directory BDAV. Only the representative directory BDAV will be described.

Under the directory BDAV, the following six types of files are placed.

(1) info.bdav (2) menu.tidx, mark.tidx (3) menu.tdt1, menu.tdt2, mark.tdt1, mark.tdt2

(4) #####.rpls, #####.vpls (5) %%%%%.clpi (6) *****.m2ts

In the files "#####.rpls" and "#####.vpls" categorized as (4), "#####" represents any number. Likewise, in the file "%%%%%.clpi" categorized as (5), "%%%%%" represents any number. In the file "***.m2ts" categorized as (6), "*" represents a number of which a file "*.m2ts" corresponds to a file "%%%%%.clpi" with the relation of one to one. For example, a number "***" can be the same as a number "%%%%%".

The file "info.bdav" categorized as (1) is a file that has information of all the directory BDAV. The files "menu.tidx" and "mark.tidx" categorized as (2) are files that have information of thumbnail pictures. The files "menu.tdt1", "menu.tdt2", "mark.tdt1", and "mark.tdt2" categorized as (3) are files that have thumbnail pictures. The extensions "tdt1" and "tdt2" of those files represent whether or not data of thumbnail pictures in those files have been encrypted.

The files "#####.rpls" and "#####.vpls" categorized as (4) are files that have information of play lists. The files "#####.rpls" and "#####.vpls" are placed under the directory PLAYLIST, which is placed under the directory BDAV.

The file "%%%%%.clpi" categorized as (5) is a file that has clip information. The file "%%%%%.CLP" is placed under the directory CLIPINF, which is placed under the directory BDAV. The file "***.m2ts" categorized as (6) is a clip AV stream file that has a clip AV stream. A clip AV stream file is correlated with one clip information file "%%%%%.clpi" with a file name number "*". The file "***.m2ts" is placed under the directory STREAM, which is placed under the directory BDAV.

Next, each file will be described in detail. The file "info.bda" categorized as (1) is only one file placed under the directory BDAV. FIG. 10 shows syntax that describes an example of a structure of the file "info.bdav". In this example, the syntax is represented by a descriptive method of C language, which is used as a program descriptive language for computer devices. This applies to drawings that show other syntax.

In FIG. 10, the file "info.bdav" is divided into blocks corresponding to functions. A field type_indicator describes a character string "BDAV" that describes that the file is "info.bdav". A field version_number describes a version of the file "info.bdav". A block UIAppInfoBDAV( ) describes information about files placed under the directory DBAV. A block TableOfPlayList( ) describes information about the arrangement of the play list. A block MakersPrivateData( ) describes unique information of the maker of the recording and reproducing apparatus.

Addresses that represent the beginnings of individual blocks are described at the beginning of the file "info.bdav". For example, a field TableOfPlayLists_Start_address represents the start position of the block "TableOfPlayLists( )" with the relative number of bytes in the file.

FIG. 11 shows syntax that describes an example of a structure of the block UIAppInfoBDAV( ). A field length represents the length immediately after the field length until the end of the block UIAppInfoBDAV( ) in bytes. A field BDAV_character_set represents a character set of a character sequence described in a field BDAV_name of the block UIAppInfoBDAV( ). As a character set, ASCII, Unicode, or the like can be selected.

A flag BDAV_protect_flag describes whether or not the user is unconditionally permitted to watch a content placed under the directory BDAV. When the flag has been set to "1" and the user has input a correct personal identification number (PIN), he or she is permitted to watch a content placed under the directory BDAV. In contrast, when the flag BDAV_protect_flag has been set to "0", even if the user does not input his or her PIN, he or she is permitted to watch a content placed under the directory BDAV.

The personal identification number PIN is described in a field PIN. The personal identification number PIN is composed of for example a four-digit number, each digit ranging from 0 to 9. The personal identification number PIN represents a personal identification number that is required when the reproduction control is validated. Digits of the personal identification number PIN are encoded in accordance with for example International Organization for Standardization (ISO)/International Electrotechnical Commission (IEC) 646 standard.

With the foregoing information described in the block UIAppInfoBDAV( ), the reproduction restriction for the directory BDAV is prescribed. As will be described later, the reproduction restriction for each play list is prescribed with a flag playback_control_flag defined in the block UIAppInfoPlayList( ) described in the files "#####.rpls" and "#####.vpls".

In the example, to resume reproducing a content placed under the directory BDAV, a resume function can be used. The resume function allows a play list of a content to be reproduced in priority to be designated. It is assumed that the resume function is used when the user wants to resume reproducing a content from the last stop position.

In FIG. 11, a flag resume_valid_flag describes whether the resume function is valid/invalid. When the value of the flag has been set to "0", the resume function is invalid. When the value of the flag has been set to "1", the resume function is valid. At this point, a play list designated by a field resume_PlayList_file_name is treated as a play list to be reproduced in priority.

A field ref_to_menu_thumbnail_index is a region that describes a thumbnail number that identifies a thumbnail picture that typifies the directory BDAV. In the blu-ray disc standard, a still picture that typifies the directory BDAV is referred to as menu thumbnail. A thumbnail picture that has an index thumbnail_index described in the field ref_to_menu_thumbnail_index is the menu thumbnail of the directory BDAV.

A field BDAV_name_length describes the byte length of the name of the directory BDAV described in a field BDAV_name. The number of bytes described in the field BDAV_name_length is valid for the character string of the field BDAV_name that describes the name of the directory BDAV. The rest of the byte sequence after the valid character string described in the field BDAV_name_length may have any value.

FIG. 12 shows syntax that describes an example of a structure of the block TableOfPlayLists( ). A field number_of_PlayLists describes the number of play lists placed under the directory BDAV. The number of play lists is a loop variable. The field number_of_PlayLists is followed by a loop of a "for" statement. The arrangement of play lists described in a field PlayList_file_name in a loop of a "for" statement represents the order of play lists displayed on a play list table display screen or the like. A play list is designated with a file name such as "#####.rpls" or "#####.vpls" in the field PlayList_file_name.

As described above, the files "#####.rpls" and "#####.vpls" are placed under the directory PLAYLIST. These files correspond to individual play lists in the relation of one to one.

FIG. 13 shows syntax that describes an example of a structure of the files "#####.rpls" and "#####.VPLS". In FIG. 13, the files "#####.rpls" and "#####.vpls" each have blocks corresponding to functional information. A field type_indicator describes a character string that represents the file. A field version_number describes a version of the file.

A block UIAppInfoPlayList( ) describes attribute information of the play list. A block PlayList( ) describes information about play items that compose the play list. A block PlayListMark( ) describes information about a mark added to the play list. A block MakersPrivateData( ) describes maker's unique information of the apparatus that has recorded the play list file. Fields PlayList_start_address, PlayListMark_start_address and MakersPrivateData_start_address are placed at the beginning of each of the files "#####.rpls" and "#####.vpls". These fields describe the start addresses of the corresponding blocks as address information of 32 bits.

Since the start address of each block is described at the beginning of each of the files "#####.rpls" and "#####.vpls", data padding_word of any length can be placed before each block and/or after each block. However, the start position of the block UIAppInfoPlayList( ), which is the first block of each of the files "#####.rpls" and "#####.vpls", is fixed at the 320-th byte from the beginning of each of these files.

FIG. 14 shows syntax that describes an example of a structure of the block UIAppInfoPlayList( ). The block UIAppInfoPlayList( ) describes various types of attribute information about the play list. The attribute information is not directly used for reproducing the play list. A field PlayList_character_set describes a character set of character string information about the play list.

A flag playback_control_flag describes whether or not display of information and reproduction of a play list are restricted in accordance with a personal identification number PIN. When the value of the flag playback_control_flag is for example "1", unless the user inputs a correct personal identification number PIN, information such as a thumbnail picture of a play list cannot be displayed and the play list cannot be reproduced. A flag write_protect_flag is an erase prohibition flag. It is necessary to structure the user interface so that when the value of the flag write_protect_flag is "1", the user cannot easily erase the play list. A flag is_played_flag describes that the play list has been reproduced. A flag is_edited_flag describes that the play list has been edited.

A field time_zone describes a tine zone of which the play list was recorded. A field record_time_and_date describes the date and time on and at which the play list was recorded. A field PlayList_duration describes the reproduction duration of the play list.

Fields maker_ID and maker_model_code describe information that identifies a maker and a model of the recording apparatus that last updated the play list. The fields maker_ID and maker_model_code are for example numbers. A field channel_number describes a channel number of a recorded clip AV stream. A field channel_name describes a channel name. A field channel_name_length describes the length of the channel name described in the field channel_name. In the field channel_name, a character string having the length described in the field channel_name_length is valid. A field PlayList_name describes a play list name having an effective length of a value described in the field PlayList_name_length. A field PlayList_detail describes detailed information of the play list having an effective length of a value described in the field PlayList_detail_length.

FIG. 15 shows syntax that describes an example of a structure of a block PlayList ( ). A field length describes the length of bytes immediately after the field length until the end of the block PlayList( ). A field PL_CPI_type describes the type of characteristic point information (CPI) of the play list. A field number_of_PlayItems describes the number of play items that compose the play list. A field number_of_SubPlayItems describes the number of play items for after-recording audio (sub play items) added to the play list. In short, a play list can have a sub play item when the play list satisfies a predetermined condition.

A block PlayItem( ) describes information of a play item. A block SubPlayItem( ) describes information of a sub play item.

FIG. 16 shows syntax that describes an example of a structure of the block PlayItem( ). A field Clip_Information_file_name describes a character string of a file name of a clip information file (that is a file having an extension clpi) that has the relation of one to one with a clip that the play item references. The clip information file is a file having an extension "clpi".

A field Clip_codec_identifier describes an encoding system of a clip that the play item references. In the example, the field Clip_codec_Identifier is fixed to a value "M2TS". A field connection_condition describes information of how this play item is connected to the next play item. In other words, the field connection_condition describes whether or not play items can be seamlessly reproduced.

A field ref_to_STC_id describes a sequence STC_sequence of a clip that the play item references. The sequence STC_sequence is a unique structure of the blu-ray disc standard. The structure represents a range of which a program clock reference (PCR) that is a reference of an MPEG2 TS (Transport Stream) is continuous on the time base. A number STC_id that is unique in the clip is assigned to the sequence STC_sequence. In the sequence STC_sequence, since a continuous time base can be defined, the start time and end time of a play item can be uniquely designated. The start point and end point of each play item should exist in the same sequence STC_sequence. A field ref_to_STC_id describes a sequence STC_sequence with a number STC_id.

Fields IN_time and OUT_time describe time stamps pts (presentation_time_stamp) of the start point and end point of the play item in the sequence STC_sequence, respectively.

Figure 17:
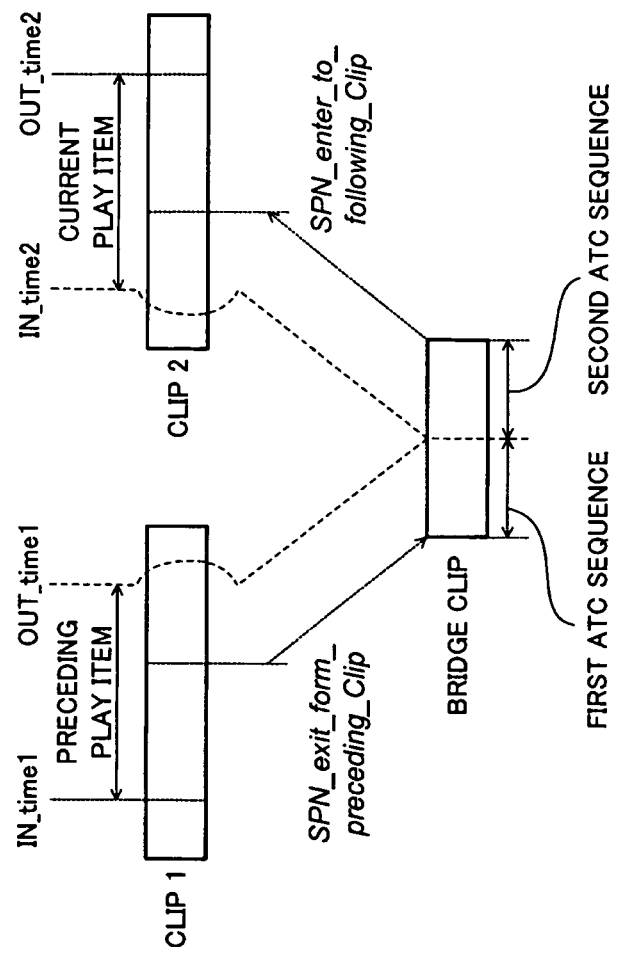
FIG. 17 is a schematic diagram describing a bridge clip.

A block BridgeSequenceInfo( ) describes information about a bridge clip (Bridge_Clip). As shown in FIG. 17, a bridge clip is a bit stream that is created when a function for seamlessly reproducing play items is accomplished. By reproducing a bridge clip instead of an original bit stream at a boundary of the preceding play item and the current play item, the two play items can be seamlessly reproduced. Since the function of the bridge clip does not closely relate to the present invention, the description of the function will be omitted.

FIG. 18 shows syntax that describes an example of a structure of a block PlayListMark( ). The block PlayListMark( ) has a data structure that describes information of a mark. A mark is a structure that describes time of a play list. With a mark, a function for setting a search point to a play list, a function for dividing a play list into chapters, and so forth are accomplished. In addition, timing of display start and display stop of a picture on a graphics plane (that will be described later) can be designated with a mark.

A field length describes the length of bytes immediately after the field length until the end of the block PlayListmark( ). A field number_of_PlayList_marks describes the number of marks in the play list. One loop of a "for" statement represents information of one mark. A flag mark_invalid_flag describes whether or not the mark is valid. When the value of the flag mark_invalid_flag is "0", it describes that the mark is valid. When the value of the flag mark_invalid_flag is "1", it describes that although information of the mark exists in the database, the mark is an invalid mark that is transparent to the user.

A field mark_type describes the type of the mark. There are a mark that represents the position of a picture as a thumbnail picture (representative picture) of the play list, a resume mark that represents a position from which reproduction is resumed, a chapter mark that represents a search point, a skip mark that represents a region to be skipped and reproduced, a mark that represents read start timing of a graphics image, a mark that represents display start timing of a graphics image, a mark that represents display stop timing of a graphics image, and so forth.

A field mark_name_length describes a data length of a field mark_name (that will be described later). A field maker_ID describes a maker of a recording apparatus that created the mark. The field maker_ID is used to identify a mark unique to a maker. A field ref_to_PlayItem_id describes what play item has time designated by the mark. A field mark_time_stamp describes time designated by the mark.

A field entry_ES_PID describes to what elementary stream the mark was added (namely, whether the mark was added to a stream of which picture data and/or sound data was encoded). A field ref_to_menu_thumbnail_index and a field ref_to_mark_thumbnail_index describe thumbnail pictures that visually represent marks. A thumbnail picture is for example a still picture that was extracted at time designated by the mark.

A field duration is used when a mark has a length on the time base. When a skip mark is used, the field duration describes for what duration the skip is performed.

A field makers_information is a region that describes information unique to the maker. A field mark_name is a region that describes a name that is assigned to a mark. The size of a mark is described in the field mark_name_length.

FIG. 19 shows syntax that describes an example of a structure of a file "%%%%%.clpi". As described above, the file "%%%%%.clpi" is placed under the directory CLIPINF. The file "%%%%%.clpi" is created for each AV stream file (file "*****.m2ts"). The file "%%%%%.clpi" has blocks corresponding to functional information. A field type_indicator describes a character string that represents the file. A field version_number describes a version of the file.

A block ClipInfo( ) describes information about a clip. A block SequenceInfo( ) describes information about an incontinuous point of PCR that represents a time reference of a transport stream of the MPEG2 system. A block ProgramInfo( ) describes information about a program of the MPEG2 system. A block CPI( ) describes information about characteristic point information CPI that represents a characteristic portion in an AV stream. A block ClipMark( ) describes mark information that represents a search index point added to a clip and commercial start and/or end points. A block MakersPrivateData( ) describes information unique to a maker of a recording apparatus.

Address information that represents the beginning of each block in the file "%%%%%.clpi" is described as fields SequenceInfo_start_address, ProgramInfo_start_address, CPI_start_address, ClipMark_start_address, and MakersPrivateData_start_address. Since the function of the clip file "%%%%%.clpi" does not closely relate to the present invention, the description of the file will be omitted.

Since the BDAV format has the foregoing data structure, with a play list composed of play items that describe sets of start points and end points of portions to be reproduced in a clip AV stream, contents recorded on the disc can be managed in a reproduction unit that the user can recognize.

2. First Mode of Present Invention

Next, the first mode of the present invention will be described. According to the present invention, the foregoing BDAV format is extended. With moving picture data and subtitle data corresponding to the real time decoding system and picture data corresponding to stored type decoding system that are independently provided, these data are combined and displayed. As a result, a user interface having a higher flexibility than the related art can be accomplished.

In addition, the BDAV format is extended so that it can have compatibility with play lists prescribed in "Blu-ray Disc Rewritable Format Ver 1.0 part 3". As a result, the extension of the interactive function is accomplished. Hereinafter, the extended BDAV format is referred to as BDMV format. The BDMV format is suitable for reproduction-only discs (blu-ray disc-read only memory: BD-ROM).

2-1. About Planes

According to the first mode of the present invention, a plane structure as shown in FIG. 20 is used. A moving picture plane 10 is displayed on the rearmost side (bottom). The moving picture plane 10 deals with a picture (mainly, moving picture data) designated by a play list. A subtitle plane 11 is displayed above the moving picture plane 10. The subtitle plane 11 deals with subtitle data displayed while a moving picture is being reproduced. A graphics plane 12 is displayed on the most front. The graphics plane 12 deals with character data for a menu screen and graphics data such as bit map data for buttons. One display screen is composed of these three planes.

The difference between the present invention and the conventional DVD video is in that sub pictures for subtitles, a menu screen, buttons, and so forth are separated into the subtitle plane 11 and the graphics plane 12 so that the subtitles and buttons are independently controlled. As described above, in the conventional DVD video, graphics such as a menu screen and buttons and subtitles are controlled by the same scheme. They are displayed on the same plane. The number of bit map pictures that can be displayed at the same time is limited to one. Thus, in the DVD video, a plurality of bit map pictures cannot be displayed at the same time. In contrast, according to the present invention, since the subtitle plane 11 and the graphics plane 12 are independently disposed for subtitles and graphics, respectively, the foregoing problem of the DVD can be solved.

It can be thought that the subtitle plane 11 and the graphics plane 12 are an extension portion of "Blu-ray Disc Rewritable Format Ver 1.0 part 3".

The moving picture plane 10, the subtitle plane 11, and the graphics plane 12 can be independently displayed. The moving picture plane 10, the subtitle plane 11, and the graphics plane 12 have resolutions and display colors as shown in FIG. 21. The moving picture plane 10 has a resolution of 1920 pixels×1080 lines, a data length of 16 bits per pixel, a color system of YCbCr (4:2:2), where Y represents a luminance signal and Cb and Cr represent color difference signals. YCbCr (4:2:2) is a color system having a luminance signal Y of eight bits per pixel and color difference signals Cb and Cr of eight bits each. With two horizontal pixels of the color difference signals Cb and Cr, data of one color data is composed.

The graphics plane 12 has a resolution of 1920 pixels×1080 lines, a sampling depth of eight bits per pixel, and a color system that is selectable from YCbCr (4:4:4) and RGB (4:4:4) of which R (red): G (green): B (blue)=4:4:4). The subtitle plane 11 has a resolution of 1920 pixels×1080 lines, a sampling depth of eight bits per pixel, and a color system having eight-bit color map addresses using a palette of 256 colors.

The graphics plane 12 and the subtitle plane 11 can be alpha-blended in 256 levels. When the graphics plane 12 and the subtitle plane 11 are combined with another plane, the intransparency can be set in 256 levels. The intransparency can be set for each pixel. In the following description, the intransparency α is represented in the range of ($0 \leq \alpha \leq 1$) where intransparency α=0 represents perfect transparent; intransparency α=1 represents perfect intransparent.

The subtitle plane 11 deals with picture data of for example PNG (Portable Network Graphics) format. Likewise, the graphics plane 12 can deal with picture data of the PNG format. In the PNG format, the sampling depth of one pixel is in the range from one bit to 16 bits. When the sampling depth is eight bits or 16 bits, an alpha channel, namely intransparency information (referred to as alpha data) of each pixel component can be added. When the sampling depth is eight bits, intransparency can be designated in 256 levels. With the intransparency information of the alpha channel, alpha-blending is performed. A palette image of up to 256 colors can be used. An element (index) of the prepared palette can be represented with an index number.

In addition, picture data dealt with the subtitle plane 11 and the graphics plane 12 is not limited to the PNG format. Alternatively, picture data that has been compression-encoded in accordance with for example JPEG system, picture data that has been run-length-compressed, or bit map data that has not been compression-encoded may be used.

Figure 22:
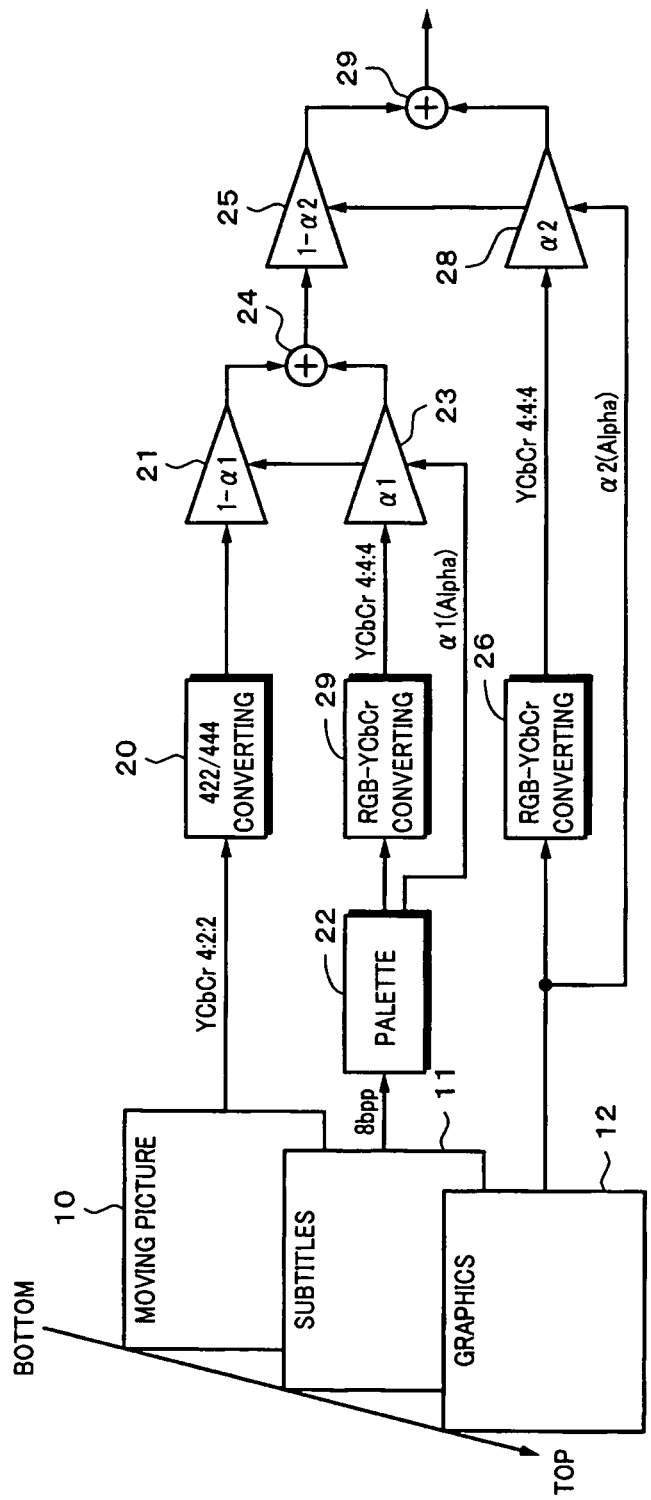
FIG. 22 is a block diagram showing an example of a structure that combines the moving picture plane, the subtitle plane, and the graphics plane.

FIG. 22 shows an example of a structure of which three planes are combined with reference to FIG. 20 and FIG. 21. Moving picture data of the moving picture plane 10 is supplied to a 422/444 converting circuit 20. The 422/444 converting circuit 20 converts the color system of the moving picture data from YCbCr (4:2:2) into YCbCr (4:4:4) and inputs the converted data to a multiplying device 21.

Picture data of the subtitle plane 11 is input to a palette 22. The palette 22 outputs picture data of RGB (4:4:4). When intransparency of alpha-blending has been designated for the picture data, designated intransparency $\alpha 1$ ($0 \leq \alpha 1 \leq 1$) is output from the palette 22.

FIG. 23 shows an example of input/output data of the palette 22. The palette 22 holds palette information as a table corresponding to for example a PNG format file. An index number is referenced as an address of picture data of input data of eight bits from the palette 22. In accordance with the index number, data of RGB (4:4:4) composed of data of eight bits each is output. In addition, data a of the alpha-channel that represents intransparency is obtained from the palette 22.

FIG. 24 shows an example of a palette table that the palette 22 has. 256 color index values [0x00] to [0×FF] (where [0x] represents hexadecimal notation) are assigned three primary color values R, G, and B and intransparency $\alpha$ each of which is represented with eight bits. The palette 22 references the palette table in accordance with the input PNG format picture data and outputs data of colors R, G, and B (RGB data) and intransparency $\alpha$ of eight bits each for each pixel in accordance with an index value designated by the picture data.

The RGB data that is output from the palette 22 is supplied to an RGB/YCbCr converting circuit 29. The RGB/YCbCr converting circuit 29 converts the RGB data into a luminance signal Y and color difference signals Cb and Cr of eight bits each (hereinafter, they together are referred to as YCbCr data). This is because data of planes should be combined in the common data format. Data is unified to YCbCr data that is the data format of moving picture data.

The YCbCr data and the intransparency data $\alpha 1$ that are output from the RGB/YCbCr converting circuit 29 are input to a multiplying device 23. The multiplying device 23 multiplies the input YCbCr data by the intransparency data $\alpha 1$. The multiplied result is input to one input terminal of an adding device 24. The multiplying device 23 multiplies each of the luminance signal Y and the color difference signals Cb and Cr of the YCbCr data by the intransparency data $\alpha 1$. A complement ($1-\alpha 1$) of the intransparency data $\alpha 1$ is supplied to the multiplying device 21.

The multiplying device 21 multiplies the moving picture data that is input from the 422/444 converting circuit 20 by the complement ($1-\alpha 1$) of the intransparency data $\alpha 1$. The multiplied result is input to the other input terminal of the adding device 24. The adding device 24 adds the multiplied results of the multiplying device 21 and the multiplying device 23. As the result, the moving picture plane 10 and the subtitle plane 11 are combined. The added result of the adding device 24 is input to a multiplying device 25.

Picture data of the graphics plane 12 is input to an RGB/YCbCr converting circuit 27. When the color system of picture data of the graphics plane 12 is RGB (4:4:4), it is converted into YCbCr (4:4:4) and output from an RGB/YCbCr converting circuit 26. The YCbCr data that is output from the RGB/YCbCr converting circuit 26 is input to a multiplying device 27.

Picture data used on the graphics plane 12 is of the PNG format, intransparency data $\alpha 2$ ($0 \leq \alpha 2 \leq 1$) can be set for each pixel of the picture data. The intransparency data $\alpha 2$ is supplied to the multiplying device 27. The multiplying device 27 multiplies each of the luminance signal Y and the color difference signals Cb and Cr of the YCbCr data that is input from the RGB/YCbCr converting circuit 26 by the intransparency data $\alpha 2$. The multiplied result of the multiplying device 27 is input to one input terminal of an adding device 28. A complement ($1-\alpha 2$) of the intransparency data $\alpha 2$ is supplied to the multiplying device 25.

The multiplying device 25 multiplies the added result of the adding device 24 by the complement ($1-\alpha 2$) of the intransparency data $\alpha 2$. The multiplied result of the multiplying device 25 is input to the other input terminal of the adding device 28. The adding device 28 adds the multiplied results of the multiplying device 25 and the multiplying device 27. As a result, the graphics plane 12 and the combined result of the moving picture plane 10 and the subtitle plane 11 are combined.

When the intransparency $\alpha$ of a non-picture region of the subtitle plane 11 and the graphics plane 12 is set to 0 (a=0), a plane below those planes 11 and 12 becomes transparent. As a result, for example, moving picture data on the moving picture plane 10 can be displayed as a background of the subtitle plane 11 and the graphics plane 12.

The structure shown in FIG. 22 can be accomplished by any one of hardware and software.

2-2. Menu Screen

Figure 25:
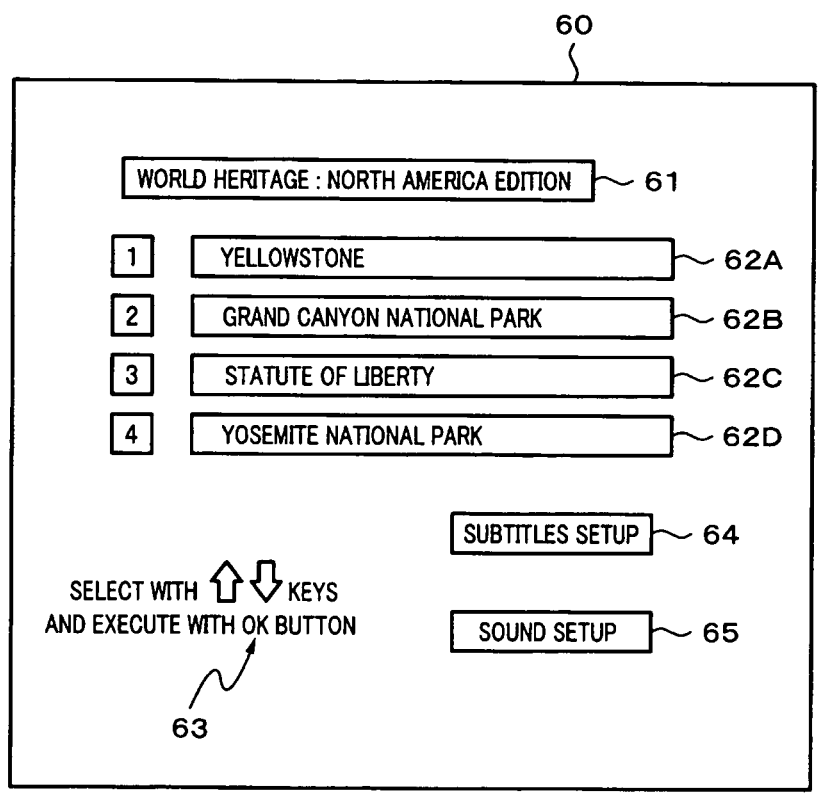
FIG. 25 is a schematic diagram showing an example of a menu screen displayed on the graphics plane.

A screen that prompts the user to perform an operation, for example, a menu screen, can be displayed on the graphics plane 12. FIG. 25 shows an example of a menu screen 60 displayed on the graphics plane 12. On the menu screen 60, characters and images are displayed at particular positions. With characters and images, the menu screen 60 provides the user with a graphical user interface (GUI) that allows him or her to select a new operation.

A "link" describes an access method to a predetermined file with a character string or image data. When the user designates the character string or image data on a screen with for example a pointing device, he or she can access the predetermined file in accordance with the access method designated with the character string or image data. A "button" has for example three types of image data that represent a normal state, a selection state, and a pressed state for a "link". When the user designates one button image, the image data is changed in accordance with the state that he or she has operated so that he or she can easily recognize the current state of the button.

When the user designates a "link" or a "button", he or she moves a cursor on the screen with for example a mouse and clicks a mouse button (presses the mouse button several times) on a character string or an image on the "link" or an image on a "button". The same operation can be performed with another pointing device other than the mouse. Alternatively, with a remote control commander or a key operation of a keyboard, the user can designate a "link" or a "button". At this point, the user selects his or her desired "link" or "button"

with a predetermined key such as a direction key and designates the selected "link" or "button" with an OK key or the like.

In the example shown in FIG. 25, a title 61 as image data is displayed at an upper portion of the menu screen 60 that is displayed on the graphics plane 12. The title 61 is followed by selection items 62A, 62B, 62C, and 62D as links. When the user selects and designates one of the selection items 62A, 62B, 62C, and 62D with a key operation of for example the remote control commander, a file linked to the designated selection item is accessed.

AT lower positions of the menu screen 60, buttons 64 and 65 are displayed. With the buttons 64 and 65, subtitles can be displayed and a language of output sound can be selected from for example English and Japanese. When the buttons 64 and 65 are operated in the foregoing manner, files used to display their setup screens are accessed and the predetermined screens are displayed.

In addition, at a lower left portion of the menu screen 60, a character string 63 that describes a method for selecting an item is displayed. The character string 63 is displayed on the graphics plane 12.

To display for example a screen shown in FIG. 25, any descriptive language for describing a screen display method, link information, and so forth is required. According to the first mode of the present invention, as the descriptive language, hyper text markup language (HTML), which has been widespread in the world wide web (WWW) on the Internet, is used.

As well known, an HTML document describes a document structure with tags. A tag is composed of one pair of symbols that represent the beginning and end of a range. A tag is embedded in a text so as to designate any range. For example, a start tag that represents the beginning of a range is described by surrounding an element defined as a character string with symbols "<" and ">". Likewise, an end tag that represents the end of a range is described by surrounding the same character string described in that start tag with symbols "</" and ">". An attribute of an element represented by a tag can be described therein. The end tag can be omitted. In addition, some elements do not need to describe their end tags.

A document described in the HTML is placed in a web server connected to the Internet and published by the web server to the Internet. The document is browsed by browser software installed in a computer apparatus such as a personal computer connected to the Internet. According to the first mode of the present invention, the HTML's standard is originally extended so that a menu screen for the blu-ray disc can be displayed.

For example, on the WWW, with link information described in an HTML document, browser software can link and read another HTML file designated by the link information. On the other hand, it is expected that on the menu screen 60 for the blu-ray disc, a table of play lists is displayed with image data, character strings, buttons, and so forth. In addition, it is expected that by designating a play list, the designated play list is read and reproduced from the disc.

This extension to the HTML is equivalent to for example a new function that is defined in a programming language or a new application programming interface (API) that is defined.

2-3. About Scenarios

In the example shown in FIG. 25, a table of play lists is displayed on the menu screen 60. In reality, images and sound of the menu screen 60 and those that are generated in accordance with an item selected on the menu screen 60 are composed of a plurality of play lists. When a plurality of play lists that compose one menu item are correlated, a scheme of which a story is branched can be accomplished. When a story is branched, a multiple story function that causes the contents of the story to vary in accordance with the user's selection and a parental function that causes scenes to be changed in accordance with the age of the user can be accomplished.

Although those functions are especially effective for recoded discs, but they are not prescribed in the current blu-ray disc standard, which mainly aims to record/reproduce television broadcasts.

Information displayed on the screen may be described in accordance with not only the HTML, but for example XHTML (extensible HTML), which is a later version of HTML 4.0. In addition, information on the screen can be described with another markup language.

Figure 26:
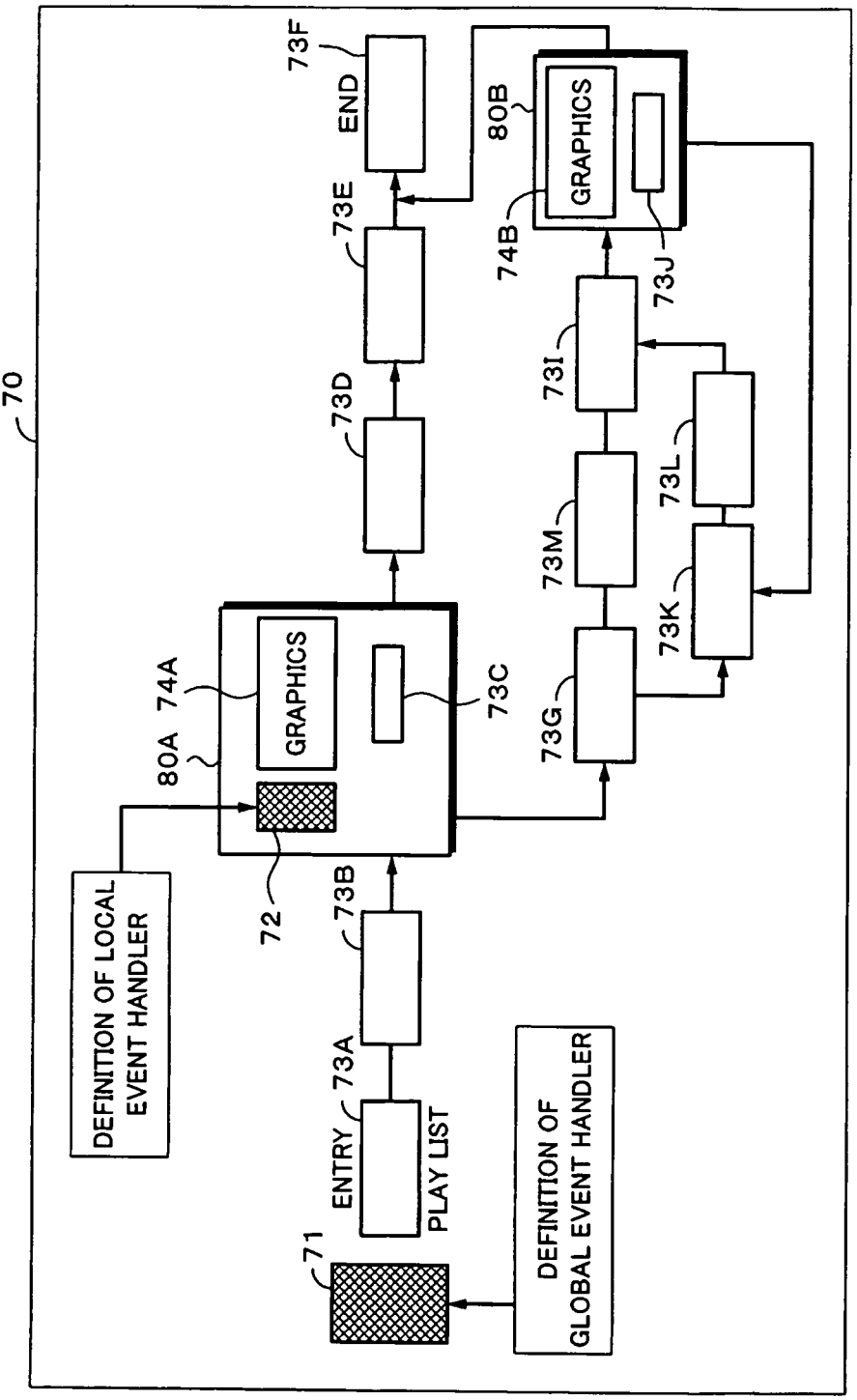
FIG. 26 is a schematic diagram showing an example of an internal structure of a scenario.

In the following description, the structure of which a plurality of play lists are arranged is referred to as scenario. FIG. 26 shows an example of an internal structure of a scenario 70. The scenario 70 has a plurality of play lists 73A to 73M. In addition, the scenario 70 has two portions (screens 80A and 80B) on which branch selection screens are displayed with the graphics plane 12. For example, the screen 80A has graphics data 74A and a play list 73C with which a branch selection screen is displayed. Likewise, the screen 80B has a graphics data 74B and a play list 73J with which a branch selection screen is displayed.

A scenario designates both an arrangement of play lists and display timing at which they are displayed on the graphics plane 12. The display timing of the play lists on the graphics plane 12 can be designated with marks on the play lists. Definitions of event handles 71 and 72 in the scenario 70 will be described later.

In the example shown in FIG. 26, a selection item on the menu screen 60 (for example, the selection item 62A) corresponds to the play list 73A represented by "entry" in the scenario 70. In other words, when the selection item 62A is designated on the menu screen 60, the play list 73A of the scenario 70 is reproduced. After the play list 73A has been completely reproduced, the play list 73B is successively reproduced. After the play list 73B has been completely reproduced, the play list 73C is reproduced. Thereafter, the graphics data 74A is read. As a result, the screen 80A that prompts the user to select a story is displayed.

After the screen 80A is displayed, the story is branched in accordance with a user's selection. In the example shown in FIG. 26, when a first selection is performed, the screen 80A is displayed. Thereafter, the play lists 73D, 73E, and 73F are reproduced in succession. As a result, the reproduction of the scenario 70 is completed. After the play list 73F has been completely reproduced, the main menu screen (for example, the menu screen 60) may be displayed again.

When a second selection is performed on the screen 80A, after the screen 80A is displayed, the play list 73G is reproduced. A mark is set in the play list 73G for example at predetermined timing. When the play list 73B is reproduced, the play list 73G may be branched at the position of the mark or fully reproduced in accordance with the setting of the reproducing apparatus, user's another scenario, or a selection on the branch selection screen. When all the play list 73G is reproduced, after the play list 73G is reproduced, the play lists 73M and 73I are reproduced in succession. Thereafter, the play list 73J is reproduced.

When the play list 73G is branched at the position of the mark, the play lists 73K and 73L are reproduced in succession. After the play list 73L has been completely reproduced, the reproduction is resumed from the position of the mark that has been set in the play list 73I.

In the play list 73J, the graphics data 74B is read. The screen 80B that prompts the user to select a branch of the story is displayed. In the first selection on the screen 80B, the play list 73F is reproduced. In the second selection of the screen 80B, the play list 73K is reproduced from the position of the mark that has been set in the play list 73K.

A mark, a user's input, and an operation change of the player are detected in accordance with an event driven model. In other words, when reproduction of a play list is started, reproduction of a play list is completed, a mark is detected while a play list is being reproduced, or a user inputs data by a key operation of the remote control commander, an event takes place. When a program has an event handler that is executed upon occurrence of an event, an operation expected for the event is executed by the player.

The scenario 70 shown in FIG. 26 has two event handlers 71 and 72. In these, the event handler 71 is a global event handler that describes an event handler that is effective all the scenario 70.

Even if any of the play lists 73A to 73M of the scenario 70 is being reproduced, when a menu button of the remote control commander is pressed, the menu screen 60 for a table of scenarios is displayed. In other words, an operation that performs a reproducing process for a play list for the menu screen 60 will be described. In this case, as an event handler that corresponds to an event that takes place when the menu button of the remote control commander is pressed (menu button press event), a command that causes a play list for the menu screen 60 to be reproduced is described as the global event handler 71.

The event handler 72 is a local event handler that is executed only while a predetermined play list is being reproduced or a predetermined user input screen is being displayed. For example, when the user designates a link displayed on the screen 80A as a branch selection screen, an operation for reproducing another play list is accomplished by describing a command that causes the play list to be reproduced against an event of which the link is designated as a local event handler.

In the first mode of the present invention, as a script language that defines the foregoing event handler, ECMA script is used. The ECMA script is a cross-platform script language in accordance with JavaScript (registered trademark). The ECMA script is prescribed by European Computer Manufacturers Association (ECMA). The ECMA script has a high affinity with an HTML document and allows a unique object to be defined. Thus, the ECMA script is suitable for the first mode of the present invention.

2-4. About Virtual Player Model

Next, a model of a reproducing apparatus that is provided with the graphics plane 12 and that operates in the BDAV format extended with the HTML and ECMA script will be considered. The modeled reproducing apparatus is referred to as BD (blu-ray disc) virtual player. The definition of the structure of the BD virtual player is referred to as BD virtual player model.

Next, with reference to FIG. 27, the BD virtual player model will be described. The BD virtual player 30 reproduces data from the blu-ray disc (hereinafter referred to as disc). The BD virtual player 30 is an object in a computer environment such as a personal computer. The computer environment is not limited to a general-purpose personal computer. Instead, the computer environment includes a software environment installed in a dedicated reproducing apparatus and/or recording and reproducing apparatus that reproduces data from for example the blu-ray disc or the like.

The BD virtual player 30 roughly has two states A and B. In the state A, the BD virtual player 30 reproduces a play list and graphics. In the state B, the BD virtual player 30 stops reproducing a play list and graphics. A state change from one state to another state and a designation of the next operation in one state are performed by commands to an object of the BD virtual player 30.

The state A has a plurality of operations. As operations in the state A, there would be a high speed reproduction, a variable speed reproduction such as a reverse reproduction, and a special reproduction such as a jumping reproduction that starts from any time of a disc. When data of the graphics plane 12 is displayed, the variable speed reproduction and the special reproduction of the BD virtual player 30 would be restricted.

A play back control (PBC) program 40 corresponds to a scenario recorded on the disc. As will be described later, a scenario describes a reproducing method for a play list recorded on the disc and a displaying method for a menu screen. The PBC program 40 and the BD virtual player 30 exchange methods through an application programming interface (API) 41 so as to reproduce a play list recorded on the disc.

In more reality, when the state of the BD virtual player 30 changes, the PBC program 40 causes necessary information to be transferred to common parameters 32 defined as a dedicated memory of the BD virtual player 30 through the API 41. Values of the common parameters 32 are set directly with player commands 31 as methods exchanged between the PBC program 40 and the BD virtual player 30 through the API 41.

According to the first mode of the present invention, as described above, the BD virtual player 30 is controlled under an event driven model. While the BD virtual player 30 is operating, various events take place. Events are generated by hardware/OS (Operating System) 50 for example when the user performs a key input or operates the remote control commander or a timer interrupt takes place. The events are sent to the BD virtual player 30. Alternatively, events may be generated when a mark is detected in a reproduced play list. Furthermore, events may be generated by the BD virtual player 30 itself for example the state of which the operation of the player is changed is detected. Events are processed with a concept of event bubbles.

The types of events that take place are defined in the BD virtual player model. When an event takes place, if an event handler as a script program has been described, the event handler is executed. If an event handler has not been described, a default event handler is executed and an operation prescribed in the standard for the player is executed.

When a method for a player operation is executed, the result of whether or not the player operation has been normally started is represented with a return value against the method. On the other hand, the end time at which a command was completed can be obtained with only the fact of which an event took place. Thus, when a method that starts reproducing the end of a scenario is described in a script program, it is preferred that the method should be described along with an event handler that receives an event representing the end of the scenario and that executes it.

An event handler can be different in each scenario for the same event.

Interrupt events of the BD virtual player 30 are roughly categorized as (1) an event that takes place in a content that is being reproduced, (2) an event that takes place with an interrupt by the user, and (3) an event that takes place due to a state change of the player.

The event (1), which takes place in a content that is being reproduced, is a predetermined interrupt. Whenever the content is reproduced, the event (1) takes place at the same timing. While the BD virtual player 30 is reproducing a play list, when time designated by a mark described in the play list has elapsed on the disc, a mark detection interrupt takes place in the BD virtual player 30. When a timer is designated by a script, a timer interrupt event takes place at the designated time or 10 seconds after the timer setup time designated by the script.

The event (2), which is a user's interrupt, is an event whose occurrence and occurrence timing cannot be predicted. When the user operates a key of the remote control commander, the interrupt event takes place. In this case, since it is uncertain when the user performs a key operation, the timing cannot be obtained in advance.

The event (3), which takes place due to a state change of the BD virtual player 30, is an event that causes a change of a stream of sound or subtitles to be informed. This event takes place when the state of the player changes from the reproduction state to the stop state or vice versa for a content. An event due to the state change of the player may take place in association with the event (1), which takes place in a content that is being reproduced, or the event (2), which takes place due to a user's interrupt event. As an example of an event that causes a change of a stream of sound or subtitles to be informed, when an interrupt event of a user's key operation of the remote control commander takes place, a stream of sound or subtitles is changed. As a result, since the state of the BD virtual player 30 changes, the event that causes the state change to be informed takes place.

In the first mode of the present invention, the display control using the graphics plane 12 is described as an HTML (Hyper Text Markup Language) 4.01 document or an XHTML (extensible HTML) document. As events for a display screen of the graphics plane 12, HTML 4.0 build-in events are used. If events other than the HTML 4.0 built-in events are required, they can be described using the ECMA script.

When the HTML format and the ECMA script are used in combination, if an event takes place, a process that is performed depends on whether an event handler designated with an attribute of an element of the event exists in the document. When an event handler exists, it is executed. When an event handler does not exist, it is determined whether or not a global event handler exists in the document. As a result, if a global event handler exists in the document, the event handler is executed. When the document does not describe an event handler in the script language, the BD virtual player 30 performs a default event process prepared for the event.

An event handler can be described as an attribute of an element of an HTML document or a method captureEvents of the ECMA script.

Next, the method for describing an event handler using an HTML document will be described. For example, an event onload, an event onunload, an event onclick, and an event onkeypress of built-in events prescribed in the HTML 4.0 can be used. Each of these events is described as an attribute in an element of a tag.

The event onload takes place when the user agent ends one window or all frames defined with a pair of tags <FRAMESET> </FRAMESET>. When a menu screen is displayed, the event onload takes place.

A window is a unit in which a browser application displays an HTML file in accordance with the prescription of the HTML. A frame is used to display a plurality of HTML files on divided regions of one window. HTML files in a frame and a frame itself are referred to as frame. The event onload attribute can be used with the element BODY and the element FRAMESET.

The event onunload takes place when the user agent removes one HTML document from one window or one frame. The event onunload attribute can be used with the element BODY and the element FRAMESET.

The event onclick takes place when an element is pointed with the pointing device or the like. For example, when a click operation of a mouse button is performed, the event onclick takes place. The event onclick attribute can be used with almost any element of the HTML 4.0.

The event onkeypress takes place when a key is pressed or released on or from an element. For example, when a predetermined key is pressed on the keyboard or a key of the remote control commander is pressed in a region defined with a particular element on the screen and placed in the selection state, the event onkeypress takes place. The event onkeypress attribute can be used with almost any element of the HTML 4.0.

Since the operation of the BD virtual player 30 cannot be sufficiently controlled with events of the foregoing HTML, in the first mode of the present invention, it is necessary to define original events. FIG. 28 shows examples of original events defined in the BD virtual player 30. The events are described in an HTML document using the ECMA script. As an attribute name that designates an event handler, "on" is added to the beginning of an event name.

An event TimerFired takes place when the value of a countdown timer becomes "0" or when the value of a count up timer becomes a predetermined value. An event PlayStopped and an event PlayStilled take place when reproduction is stopped or paused. An event StillReleased takes place when the pause state is released. An event PlayPaused and an event PauseReleased take place when the user temporarily stops the reproduction and when the user releases the pause state of the reproduction. An event PlayStarted takes place when the reproduction is started. An event PlayRepeated takes place when the beginning of a region to be repeatedly reproduced is detected.

An event SPDisplayStatusChanged takes place when the display/non-display state of a sub picture (subtitle) stream is changed. An event SelectedAudioChanged and an event VideoStopped take place when an audio stream and a video stream to be reproduced is changed, respectively.

An event ScenarioStarted and an event ScenarioEnded take place when the beginning and end of a scenario are detected, respectively. An event PlayListStarted and an event PlayListEnded take place when the beginning and end of a play list are detected, respectively. An event PlayItemStarted and an event PlayItemEnded take place when the beginning and end of a play item are detected, respectively.

An event MarkEncountered takes place when a mark is detected while a play list is being reproduced. This event is used when image data is displayed on for example the graphics plane 12. The type and number of a detected mark are described in the common parameters 32.

An event ButtonPressed takes place when a button placed on a screen is pressed. For example, when a button placed on the graphics plane 12 is virtually pressed by a key operation or a click operation of the mouse, the event ButtonPressed takes place.

An event ValidPeriodStarted takes place when a valid period starts. This event can be used when a valid period for which a link can be selected is designated. An event ValidPeriodEnded takes place when the valid period ended. This event can be used when a link is forcedly executed.

An event KeyPressed takes place when a key of the remote control commander is pressed. The type of a pressed key is identified with a "switch" statement or the like of an event handler.

2-5. About Methods

FIG. 29A and FIG. 29B, FIG. 30A, FIG. 30B, FIG. 30C and FIG. 30D, and FIG. 31A, FIG. 31B, FIG. 31C and FIG. 31D show examples of methods that the BD virtual player 30 has and that are defined in the first mode of the present invention. With these commands, the operation and the state of the BD virtual player 30, the retrieval and control of information about a video stream, an audio stream, and a sub picture (image data on the subtitle plane 11), the operation for the common parameters 32, processes for timer and key input interrupts, and the control of picture data handled on the graphics plane 12 are defined.

When these methods are used in a PBC program, the operations of the BD virtual player 30 can be controlled. These methods are built in the API 41 shown in FIG. 27. These methods are called in accordance with the description of the PBC program 40 through the API 41. The reproduction for the disc of the BD virtual player 30 is controlled in accordance with these methods. A real example of the PBC program 40 will be described later.

Next, methods for player operations will be described. A method playscenario (scenarioNumber, [scenarioTime]) causes a scenario designated by "scenarioNumber" to be reproduced. "scenarioNumber" is a URI (Universal Resource Identifier) that represents the location of a file that describes a scenario structure. A method playPlayList (playListNumber) causes a play list designated by "playListNumber" to be reproduced. A method playChapterMark (playListNumber, chapterNumber) causes a play list designated by "playListNumber" to be reproduced from a chapter designated by "chapterNumber". A method playPlayItem (playListNumber, playItemNumber) causes a play list designated by "playListNumber" from a play item designated by "playItemNumber". "playItemNumber" is "playItem_id". When a value "0" is designated to "playItem_id", a play list to which the play item belongs is reproduced from the beginning.

A method play (position) (object) causes the current position to be moved to an adjacent play list or play item. A parameter "position" is any one of "prev", "next", "top", "goUp", and "tail". A parameter "object" describes a moving method to a moving object (a play list, a play item, or a chapter).

A method stop( ) causes the reproduction of a scenario to be stopped. In this case, the value of the standard register is not held. A method resume( ) causes the reproduction to be resumed from the last stop position. A method playSoundEffect( ) causes a selected effect sound to be reproduced.

Next, methods for player states will be described. In FIG. 30A, FIG. 30B, FIG. 30C and FIG. 30D, a method getMenuDescriptionLanguage( ) causes a language of a menu that is displayed to be obtained. A method getScenarioNumber( ), a method getPlayListNumber( ), and a method getChapterNumber( ) cause a scenario number, a play list number, and a chapter number that are being reproduced to be obtained, respectively.

Next, methods for video streams will be described. A method setVideoStreamNumber( ) describes a video stream to be decoded. A method getVideoStreamNumber( ), a method getVideoStreamStatus( ), and a method getVideoStreamAttr( ) cause a video stream number, a state, and an attribute of a video stream that is being reproduced to be obtained, respectively. Attributes of a video stream are for example an encoding system, a resolution, an aspect ratio, a display mode in the case that the aspect ratio is 4:3, and presence/absence of a closed caption. A method setAngleNumber( ) describes an angle number. A method getAngleNumber( ) causes an angle number that has been selected to be obtained. A method getMaxVideoStream( ) causes a maximum number of video streams to be obtained.

Next, methods for audio streams will be described. A method getAudioStreamAvailability( ) causes information that describes whether or not a designated audio stream is contained to be obtained. A method getAudioStreamLanguage( ) causes information about a language of a designated audio stream to be obtained. A method setAudioStreamStatus( ) causes a state of a designated audio stream to be obtained. A method setAudioStreamStatus( ) causes a state of a designated audio stream to be designated. States of an audio stream are for example whether or not it is reproduced. A method getAudioStreamAttribute( ) causes an attribute of a designated audio stream to be obtained.

Next, methods for sub picture streams (subtitle data) will be described. A method getSPStreamAvailability( ) causes information that describes whether or not a designated sub picture stream is contained to be obtained. A method getSPStreamLanguage( ) causes a language used in a designated sub picture stream to be obtained. A method getSPDisplayStatus( ) causes a display state of a sub picture stream to be obtained. A method setSPDisplayStatus( ) describes a display state of a sub picture stream. Display states of a sub picture stream are for example whether or not the sub picture stream is displayed. A method getSpStreamAttribute( ) causes an attribute of a designated sub picture stream to be obtained. Attributes of a sub picture stream are for example whether the sub picture stream is displayed with an aspect ratio of 4:3 or with a wide screen.

Next, methods for the common parameters 32 will be described. In FIG. 31A, FIG. 31B, FIG. 31C and FIG. 31D, methods for the common parameters 32 are represented as methods for register read/write. A method clearReg( ) causes all registers of a memory region of the BD virtual player 30 to be initialized. A method setReg( ) causes a value to be set to a designated register. A method getReg( ) causes a value to be read from a designated register.

Next, methods for timers will be described. A method sleep( ) causes a process to be stopped at designated time. A method setTimeout( ) causes a function or a process to be executed after designated time has elapsed. A method setInterval( ) causes a process to be executed at intervals of designated time. Methods for timers can be designated in the unit of a millisecond. A method clearTimer( ) causes a process that has a designated registration timer to be stopped. A method pauseTimer( ) causes a timer that has a designated registration ID to be temporarily stopped. A method resumeTimer( ) causes a timer that has a designated registration timer ID to be resumed from the pause state.

As a method for a key input, a method getPressedKey( ) causes the type of a key that has been input (pressed) to be obtained.

Next, methods for graphics will be described. A method loadGraphics (htmlfile, ID) causes a file designated by "htmlfile" to be read and the file to be expanded to the graphics plane 12 in a non-display state. An "ID" is assigned to an expanded graphics image and referenced with a method that will be described later. A method showGraphics (ID) causes an image expanded on the graphics plane 12 by the foregoing method load Graphics (htmlfile, ID) to be displayed. A method hideGraphics (ID) causes an image designated by "ID" to be hidden.

Next, other methods will be described. A method random (input Number num) causes a random number from 1 to "num" to be generated. Random numbers are generated by a unique definition. A method catchEvent (eventname, eventhandler) causes a function designated by "eventhandler" to be executed when an event designated by "eventname" takes place.

2-6. About Execution of Commands

Next, a PBC program 40 will be practically described. In the first mode of the present invention, one script file is created for one scenario. When the menu screen 60 is displayed on the graphics plane 12, one HTML file is created for one screen. A script file and an HTML file have extensions "js" and "html", respectively. These extensions distinguish these two types of files. A file of a script program that is initially executed when a disc is loaded into a drive device has a fixed file name for example "startup.js".

Figure 32:
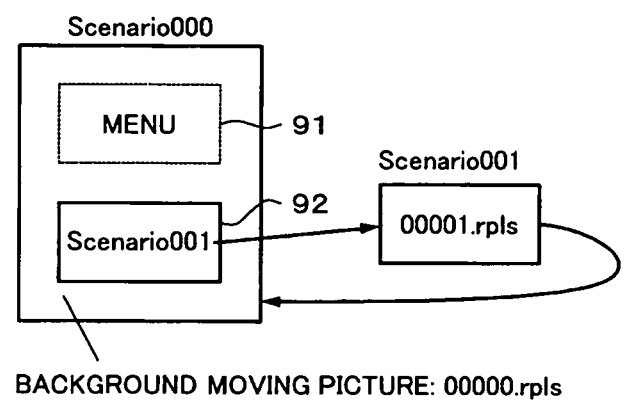
FIG. 32 is a schematic diagram showing an example of a structure of a scenario recorded on a disc.

Next, as an example, a disc having a scenario structure shown in FIG. 32 will be considered. This disc has two scenarios Scenario000 and Scenario001. The scenario Scenario000 causes a menu screen 91 that has a link button to the scenario Scenario001 to be displayed. When the disc is loaded into the reproducing apparatus, the menu screen 91 is displayed. When a button 92 on the menu screen 91 is clicked, the scenario Scenario001 is reproduced. After the scenario Scenario001 has been reproduced, the menu screen 91 is displayed again.

FIG. 33 shows an example of a list of files necessary for the structure shown in FIG. 32. In this example, six files that are a file "startup.js", a file "scenario000.js", a file "000.html", a file "00000.rpls", a file "scenario001.js", and a file "00001.rpsi" are required.

Among those files, the file "scenario000.js" is a script file that describes structural information of the scenario Scenario000. The file "scenario000.js" describes structural information of the menu screen 91, namely a scenario list screen. The file "000.html" is an HTML file that describes layout information of the menu screen 91. The file "00000.rpls" is a play list file that is displayed as a background of the menu screen 91. The file "scenario001.js" is a script file that describes structural information of the scenario Scenario001. The file "00001.rpls" is a play list file that describes information of a play list reproduced in accordance with the scenario Scenario001.

In FIG. 33, contents files (a clip information file "%%%%%.clip" and an AV stream file "*****.m2ts") that are reproduced in accordance with the play list files "00000.rpls" and "00001.rpls" are omitted.

Figure 34:
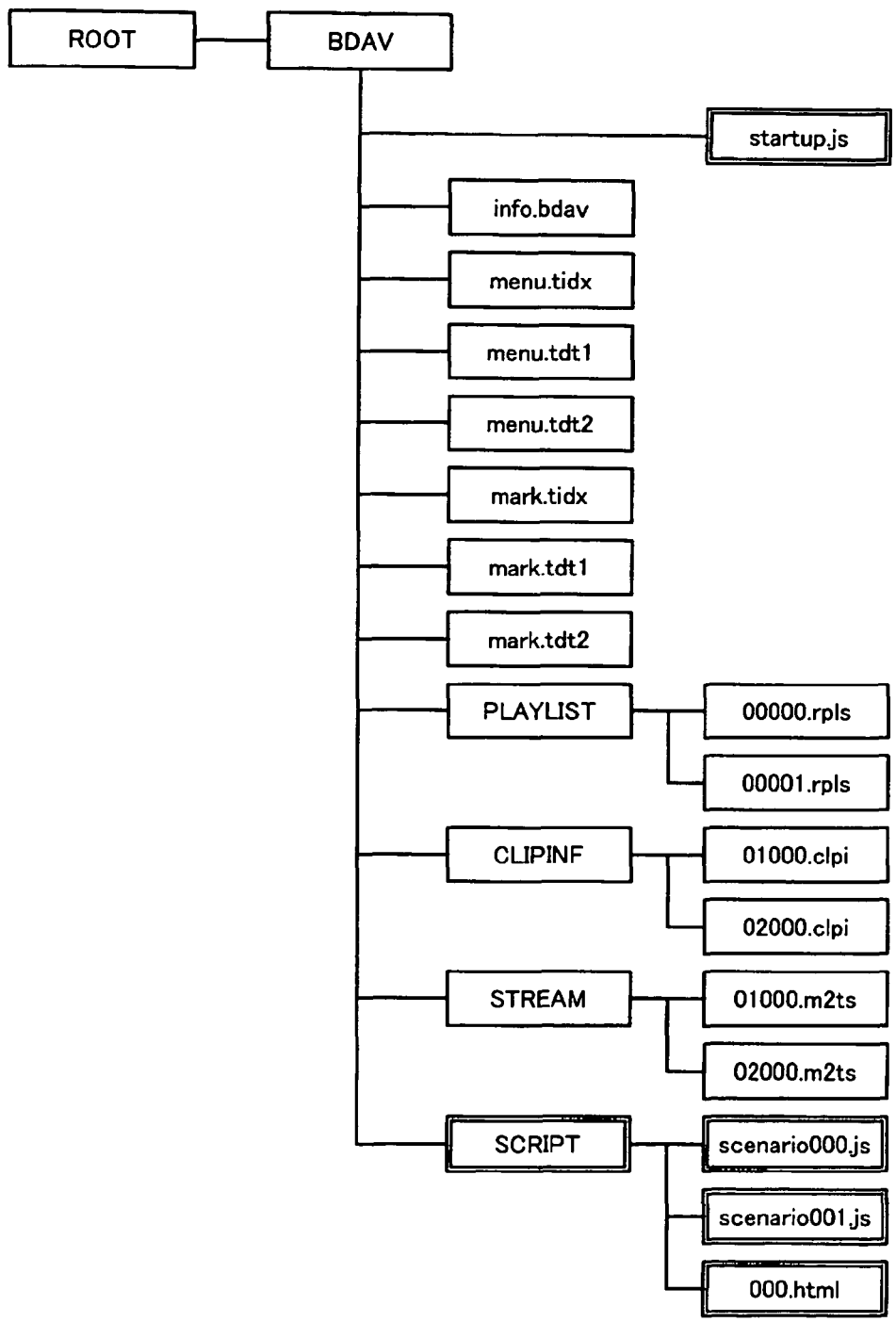
FIG. 34 is a schematic diagram showing an example of a structure of a directory in the case that a scenario is recorded on a disc.

Each file shown in FIG. 33 is recorded on a disc in accordance with a directory structure as shown in FIG. 34.

FIG. 35 to 38 show practical examples of descriptions of script files and HTML files. FIG. 35 is an example of the description of the file "startup.js". The file "startup.js" defines the number of scenarios and names thereof recorded on the disc. A method playScenario ("scenario000") causes the file "scenario000.js" to be called and the scenario Scenario000 to be reproduced. When the scenario Scenario000 is reproduced, the menu screen 91 is displayed.

FIG. 36 is an example of the description of the file "scenario000.js". When an event that defines a function and describes a method catchEvent( ) with "on" (see FIG. 28) takes place, contents defined in the function are executed. In the example shown in FIG. 36, an HTML file "000.html" that describes layout information of the menu screen 91 is designated. Read timing and display timing of the menu screen 91 to the graphics plane 12 are controlled. In addition, a method playPlayList ("00000.rpls") causes the play list "00000.rpls" to be reproduced.

In other words, the file "scenario000.js" causes a moving picture of the play list "00000.rpls" to be displayed on the moving picture plane 10. In addition, the file "scenario000.js" causes the menu screen 91 to be displayed on the graphics plane 12 at timing of a mark detected while the play list "00000.rpls" is being reproduced.

FIG. 37 is an example of the description of the file "000.html". In a portion surrounded by tags <style type="text/css"> and </style>, layout information on the menu screen 91 for an image referenced by "menu" and "scenario000 is described. In the example shown in FIG. 37, the layout information is described with absolute coordinates on the screen. Image data referenced with the image name "menu" is displayed as an image having a width of 200 pixels and a height of 50 pixels at a position of 200 pixels from the upper end of the screen and 800 pixels from the left end of the screen. Likewise, image data referenced with the image name "scenario" is displayed as an image having a width of 400 pixels and a height of 100 pixels at a position of 700 pixels from the upper end of the screen and 700 pixels from the left end of the screen.

In a portion surrounded by tags <script type="text/javascript"> and </script>, event handlers for mouse operations onMoverhandler (f), onMounthandler (f), and onMclickhandler (f) are defined. In the example shown in FIG. 37, image data "201.png", "200.png", and "202.png" as button images are correlated with the event handlers onMovehandler (f) onMouthandler (f), and onMclickhandler (f). In addition, the event handler onMclickhandler (f) causes the scenario file "scenario001.js" to be reproduced.

In a portion surrounded by tags <body> and </body>, image data displayed on the graphics plane 12 of the menu screen 91 is described. File names ("100.png" and "200.png") of image data corresponding to image names described in the portion surrounded by the tags <style type="text/css"> and </style> are described. When events onMouseover, onMouseout, and onclick take place for the image data referenced by the image name "scenario000" in accordance with an operation of a pointing device such as a mouse, event handlers onMoverhandler (f), onMouthandler (f), and onMclinckhandler (f) are executed, respectively.

The event onMouseover is an event that takes place when the cursor is placed at a designated region. The event onMouseout is an event that takes place when the cursor is left from a designated region. The event onclick is an event that takes place when a predetermined operation for example a clicking operation of the pointing device for example the mouse is performed while the cursor is placed in a designated region.

FIG. 38 is an example of the description of the file "scenario001.js". A function UOPControl( ) defines an operation of which while the scenario file "scenario001.js" is being reproduced, if the menu key of the remote controller is pressed, the scenario Scenario000 for displaying the menu screen 91 is reproduced. A function playListEnded( ) defines an operation of which when the play list of the scenario file "scenario001.js" has been reproduced, the scenario000 for displaying the menu screen 91 is reproduced. The scenario file "scenario001.js" causes the play list "00001.rpls" to be reproduced.

Next, operations shown in FIG. 35 to FIG. 38 will be described. When the disc is loaded into the reproducing apparatus, the file "startup.js" is read from the disc. The file "scenario000.js" is called from the file "startup.js". When the scenario "scenario000" described in the file "scenario000.js"

is executed, a moving picture of the play list "00000.rpls" is displayed on the moving picture plane 10 in accordance with the description shown in FIG. 36.

The file "000.html" is called at timing corresponding to a mark described in the play list "00000.rpls". The menu screen 91 that displays a table of scenarios is expanded on the graphics plane 12 and displayed in accordance with the description of the file "000.html". The menu screen 91 is also composed of one scenario, which is the scenario "scenario000".

On the menu screen 91, the image file "100.png" of a character string for example "Menu" and the image file "200.png" of a character string for example "Scenario001" are placed. These image files are placed on the graphics plane 12 and these character strings are displayed. On the moving picture plane 10 displayed as a background of the graphics plane 12, a moving picture of the play list "00000.rpls" is displayed. The moving picture of the play list "00000.rpls" on the moving picture plane 10 and the menu screen 91 of the file "000.html" on the graphics plane 12 are superimposed and displayed on the same screen. As a result, the menu screen 91 is displayed with a background of the moving picture.

At this point, predetermined intransparency is designated to a screen (the menu screen 91) on the graphics plane 12. The menu screen 91 can be transparently displayed on the moving picture on the moving picture plane 10. In this example, marks are described at the beginning and the end of the play list "00000.rpls". When the play list "00000.rpls" is reproduced, the menu screen 91 is displayed. After the play list "00000.rpls" has been reproduced, the menu screen 91 is cleared.

On the menu screen 91, a cursor that can be moved by user's key operations of the remote controller is displayed. When the cursor is superimposed with the image file "200.png", the event Mouseover defined in the file "000.html" takes place. When the event Mouseover takes place, the event handler onMovehandler( ) corresponding to the event onMouseover is executed so as to represent the state that the image file "200.pn" is focused. When the event handler onMoverhandler( ) is executed, the image file "200.png" is replaced with the image file "201.png". The image file "201.png" is a button image or the like whose color is different from the image file "200.png".

When the cursor is placed on the image file "201.png", if the user performs a clocking operation by a predetermined key of the remote control commander, the event handler onMclickhandler( ) corresponding to the event onclick is executed. As a result, the image file "201.png" is replaced with the image file "202.png" that represents the state that the image file "201.png" has been selected. The image file "202.png" is a button image that virtually represents the state that a button was pressed.

When event handlers corresponding to events "focused" and "clicked" are described in the file "000.html", a menu screen that has an interactive function that responds to a user's input is accomplished.

When a button image of "Scenario0001" is clicked on the menu screen 91, a reproducing process for the scenario "Scenario001" is performed. When the file "scenario001.js" is executed, the scenario "Scenario001" is reproduced. As shown in FIG. 38, a method playPlayList ("0001.rpls") described in the file "scenario001.js" is called. As a result, the play list "00001.rpls" is reproduced.

After the play list "00001.rpls" has been reproduced, a play list reproduction end event PlayListEnded( ) takes place. The event handler playScenario ("scenario000.js") corresponding to the event causes the scenario "Scenari000.js" to be reproduced. In this example, after the scenario "Scenario001" has been reproduced, the menu screen 91 is displayed again.

While the scenario "Scenario001" is being reproduced, even if a key designated by "keyID" is operated, the scenario "Scenario000.js" is reproduced and the menu screen 91 is displayed.

The descriptions of the HTML and ECMA scripts shown in FIG. 35 to FIG. 38 are just examples. In other words, the present invention is not limited to such examples. The HTML and ECMA scripts have flexibility in their descriptions. Thus, even if the HTML and ECMA scripts are partly changed, similar operations can be accomplished.

2-7. Decoder Model

Figure 39B:
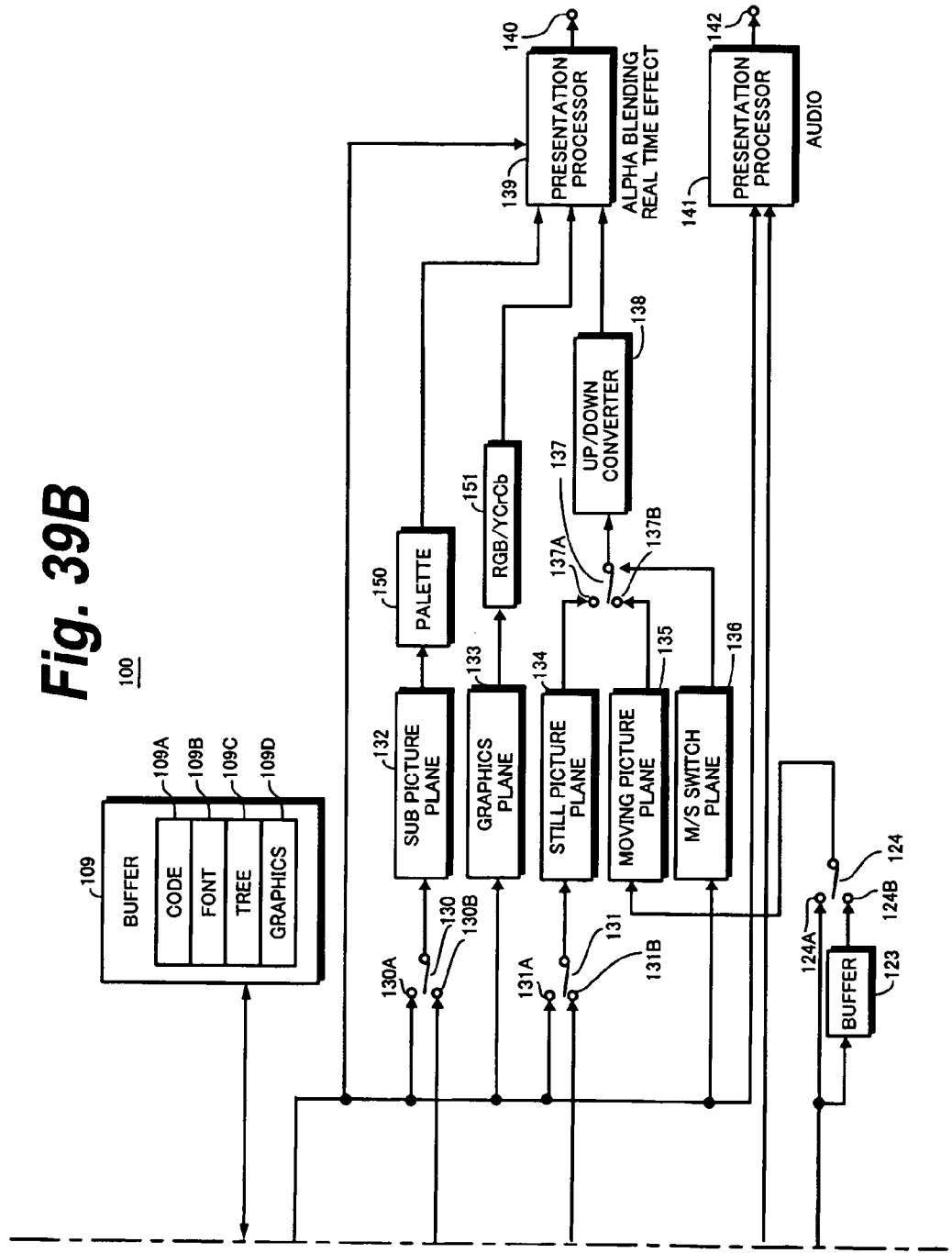
FIG. 39 is a functional block diagram showing an example of a structure of a player decoder.

FIG. 39 is a functional block diagram showing an example of a structure of a player decoder 100 according to an embodiment of the present invention. The player decoder 100 interprets data reproduced from a disc loaded into a drive device (not shown), outputs an AV stream, and allows the user to interactively operate the output AV stream.

All operations of the player decoder 100 are controlled by a CPU (Central Processing Unit) (not shown). Streams and data flows of individual portions of the player decoder 100 are monitored and controlled by the CPU.

When the disc is loaded into the drive device (not shown), as described above, a file "startup.js" is reproduced. In accordance with the description of the file "startup.js", a scenario file is read. In according with the description of the scenario file, an HTML file, moving picture data displayed on the moving picture plane 10, image data displayed on the subtitle plane 11 and the graphics plane 12, another scenario file that is called from the foregoing scenario file, and sound data are read from the disc.

In the following description, among those data that is read from the disc, streams such as moving picture data, sub pictures (subtitle data), and sound data that should be continuously processed are referred to as real time streams. In contrast, non-real time data such as a scenario file, an HTML file, an image data file, and a play list file that do not need to be continuously processed are referred to as store objects. The store objects are stored in a memory or the like and expanded thereon. When necessary, the store objects are processed.

The player decoder 100 has two systems of input channels that are channel (1) and channel (2). A store object is input to an input terminal 101 of the input channel (1). A real time stream is input to an input terminal 202 of the input channel (2). Alternatively, a store object may be input to the input terminal 202. According to the first mode of the present invention, a real time stream and a part of store objects that are input to the input terminal 202 are for example MPEG2 TSs.

A real time stream that is input to the input terminal 202 is not limited to an MPEG2 TS. As long as a real time stream can be transmitted in the unit of a packet and multiplexed with video data, audio data, still picture data, or the like, a stream that has another format can be input. At this point, a PID filter 110 that will be described later is used as a demultiplexer that demultiplexes video data, audio data, still picture data, or the like.

When the rotation speed of the disc in the drive device is increased for example twice and the read transfer speed of the disc is increased, the reading operations for two systems of the channels (1) and (2) drive device from the disc are performed in time division basis.

First of all, the system of the input channel (1) will be described. A store object that is input to the input terminal 101 is input to a switch circuit 102. When a program code of an ECMA script, an HTML file, or the like as a store object is input, the switch circuit 102 selects an output terminal 102A. The input program code is stored in a code buffer 104.

When image data as a store object is input, the switch circuit 102 selects an output terminal 102B. As a result, the input image data is input to a switch circuit 103. When a real time stream that is input to the input terminal 202 does not contain image data displayed on the subtitle plane 11 or the graphics plane 12, the switch circuit 103 selects an input terminal 103A. The image data that is input from the switch circuit 102 is stored in a contents buffer 105.

Likewise, when image data displayed on the subtitle plane 11 or the graphics plane 12 is contained in a real time stream that is input to the input terminal 202, the switch circuit 103 selects an input terminal 103B. As a result, the image data is stored in the contents buffer 105. Store objects stored in the code buffer 104 and the contents buffer 105 are read when necessary and supplied to a multimedia engine 106.

The image data of the store object stored in the contents buffer 105 is also supplied to a sub picture decoder 116 and a still picture decoder 117 through switch circuits 107 and 108, respectively.

The multimedia engine 106 comprises an XML parser 106A, a script interpreter 106B, and a graphic renderer 106C. The multimedia engine 106 may be composed of independent hardware. Alternatively, the multimedia engine 106 may be accomplished by a process of a predetermined program that a CPU (not shown) executes.

The XML parser 106A has a function for parsing an XML (Extensible Markup Language) document. In addition, the XML parser 106A can also parse an HTML document. An HTML document parsed by the XML parser 106A is converted into a format that can be executed by the player decoder 100. The script interpreter 106B analyzes an ECMA script and converts it into a format that can be executed by the player decoder 100. The graphic renderer 106C decodes image data and obtains a format that can be expanded on the subtitle plane 11 and the graphics plane 12.

The multimedia engine 106 performs processes for the XML parser 106A, the script interpreter 106B, and the graphic renderer 106C with a work memory of a buffer 109. For example, the XML parser 106A and the script interpreter 106B uses a code buffer 109a of the buffer 109. The graphic renderer 106C uses a graphics buffer 109D of the buffer 109. The buffer 109 further comprises a font buffer 109B that stores font data used to display a character string and a tree buffer 109C that stores the parsed result of the HTML document by the XML parser 106A in a hierarchical tree structure.

The multimedia engine 106 reads for example an ECMA script from the code buffer 104. When necessary, in accordance with the description of the ECMA script, the multimedia engine 106 reads another ECMA script and an HTML document from the code buffer 104 and reads image data from the contents buffer 105. Data that is stored in the code buffer 104 and the contents buffer 105 can be stored in the code buffer 104 and the contents buffer 105 until the data becomes unnecessary. Thus, data stored in the code buffer 104 and the contents buffer 105 can be repeatedly read when necessary.

In addition, the multimedia engine 106 performs a demultiplexing process for the plurality of types of input data, a JavaVM (Java (registered trademark) virtual machine) function, and so forth. Moreover, the multimedia engine 106 receives a user's input from a remote control commander, a pointing device, or the like and performs a process in accordance with the user's input. The user's input is supplied to the sub picture decoder 116, the still picture decoder 117, an audio decoder 118, an MPEG video decoder 120, and a system decoder 121 that will be described later.

Image data processed by the graphic renderer 106C is supplied to a sub picture plane 132 and a still picture plane 134 through switch circuits 130 and 131, respectively. In addition, the image data is supplied to the graphics plane 133 and the M/S switch plane 136. In this example, it is assumed that image data supplied to the sub picture plane 132 and the graphics plane 133 has the PNG format. Timing at which the image data is supplied to the planes 132, 133, 134, and 135 is controlled by the multimedia engine 106. The M/S switch plane 136 controls the switch circuit 137. The switch circuit 137 selects one of still picture data that is output from the still picture plane 134 (that will be described later) and moving picture data that is output from the moving picture plane 135 and supplies the selected data to the downstream stage.

The sub picture plane 132 and the graphics plane 133 correspond to the foregoing subtitle plane 11 and graphics plane 12, respectively. The still picture plane 134 and/or moving picture plane 135 corresponds to the foregoing moving picture plane 10. Each of the sub picture plane 132, the graphics plane 133, the still picture plane 134, and the moving picture plane 135 is composed of for example a frame memory.

The multimedia engine 106 also supplies a control signal that causes one of the still picture plane 134 or the moving picture plane 135, the sub picture plane 132, and the graphics plane 133 to be selected to a presentation processor 139 that will be described later. Likewise, the multimedia engine 106 supplies a control signal that controls an output of an audio stream to a presentation processor 141 that will be described later.

Next, the system of the input channel (2) will be described. A real time stream that is input as an MPEG2 TS to the input terminal 202 is supplied to the PID filter 110. The PID filter 110 extracts a PID (Packet Identification) from the MPEG2 TS transport stream and detects an attribute of a stream contained in a transport packet. The PID filter 110 separates the input real time stream into corresponding systems for each transport packet in accordance with the attribute of the stream.

When a transport packet is a packet in which image data of a store object is contained, the transport packet is temporarily stored in a buffer TBn 111A. The transport packet is read at predetermined timing and input to the switch circuit 103 through the input terminal 103B that has been selected. Thereafter, the transport packet is stored in the contents buffer 105 through the switch circuit 103.

When the PID filter 110 has determined that the transport packet contains sub picture data, namely subtitle data, in accordance with the PID, the transport packet is temporarily stored in a buffer TBn 111B and a buffer Bn 112B. The transport packet is read at predetermined timing and input to the switch circuit 107 through an input terminal 107B that has been selected. The transport packet is supplied to the sub picture decoder 116 through the switch circuit 107.

The sub picture decoder 116 removes header information from the supplied transport packet, decodes subtitle data contained in the transport packet, and obtains image data for subtitles. The image data is input to an input terminal 130B of the switch circuit 130 and expanded to the sub picture plane 132 through the switch circuit 130.

When the PID filter 110 has determined that a transport packet contains graphics data in accordance with the PID, the transport packet is temporarily stored in a buffer TBn 111C and a buffer Bn 112C. The transport packet is read at predetermined timing and input to the switch circuit 108 through an input terminal 108B that has been selected. The transport packet is supplied to the still picture decoder 117 through the switch circuit 108.

The still picture decoder 117 removes header information from the supplied transport packet, decodes still picture data contained in the transport packet, and obtains still picture data. The still picture data is input to an input terminal 131B of the switch circuit 131 at predetermined timing and expanded to the still picture plane 134 through the switch circuit 131.

When the PID filter 110 has determined that a transport packet contains audio data in accordance with the PID, the transport packet is temporarily stored in a buffer TBn 111D and a buffer Bn 112D. The transport packet is read at predetermined timing and supplied to the audio decoder 118. Audio data contained in the transport packet is compression-encoded in accordance with for example a system based on the MPEG.

The audio decoder 118 also has for example a linear PCM (Pulse Code Modulation) audio decoder 119. The audio decoder 118 removes header information from the input transport stream, decodes compression-encoded audio data contained in the transport packet, and obtains linear PCM audio data.

The linear PCM audio data that is output from the audio decoder 118 is input to the presentation processor 141 for audio. In the presentation processor 141, a sound effect is added to the linear PCM audio data under the control of the multimedia engine 106 and then obtained from an output terminal 142.

When the PID filter 110 has determined that a transport packet contains moving picture data in accordance with the PID, the transport packet is temporarily stored in a buffer TBn 111E, a buffer MBn 113, and a buffer EBn 114, read at predetermined timing, and supplied to the MPEG video decoder 120. The moving picture data contained in the transport packet has been compression-encoded in accordance with the MPEG2 system.

The MPEG video decoder 120 removes header information from the supplied transport packet, decodes moving picture data that has been compression-encoded in accordance with the MPEG2 system, and obtains base band moving picture data.

The moving picture data that is output from the MPEG video decoder 120 is input to an input terminal 124A of a switch circuit 124. In addition, the moving picture data is input to an input terminal 124B of a switch circuit 124 through a buffer 123. In the switch circuit 124, the input terminal 124A or 124B is selected at predetermined timing. Output moving picture data is expanded on the moving picture plane 135.

When the PID filter 110 has determined that the transport packet contains system information in accordance with the PID, the transport packet is supplied to the system decoder 121 through buffers TBn 111F and Bsys 115. The system decoder 121 removes header information from the supplied transport packet and extracts the system information therefrom. The system information is supplied to for example a CPU (not shown).

Image data on the sub picture plane 132 is supplied to a palette 150 that corresponds to the foregoing palette 22. The palette has 256 colors. The palette is referenced with an index. YCbCr data is output. In addition, intransparency data α1 is extracted. The YCbCr data and the intransparency data α1 are supplied to the presentation processor 139.

Image data on the graphics plane 133 is supplied to an RGB/YCbCr converting circuit 151 that corresponds to the RGB/YCbCr converting circuit 26. The RGB/YCbCr converting circuit 151 converts the color system from RGB (4:4:4) into YCbCr (4:4:4). YCbCr data that is output from the RGB/YCbCr converting circuit 151 is supplied to the presentation processor 139. In addition, intransparency data α2 is extracted from the image data on the graphics plane 133. The extracted intransparency data is supplied to the presentation processor 139.

The image data on the still picture plane 134 is input to an input terminal 137A. In addition, moving picture data on the moving picture plane 135 is input to an input terminal 137B of the switch circuit 137. The image data on the still picture plane 134 or the moving picture data on the moving picture plane 135 is selected by the switch circuit 137 on the M/S switch plane 136. In other words, the still picture plane 134 is treated like the moving picture plane 135. An output of the switch circuit 137 is supplied to the presentation processor 139 through an up/down converter 138.

The up/down converter 138 is a circuit that converts the resolution of the image. The up/down converter 138 converts for example a high definition (HD) image having a high resolution into a standard definition (SD) image having a standard resolution.

The presentation processor 139 performs an alpha-blending process using intransparency α of image data of the subtitle plane 11 (sub picture plane 132) and intransparency α2 of the graphics plane 12 (graphics plane 133) shown in FIG. 22.

In other words, the presentation processor 139 combines image data of the still picture plane 134 or the moving picture plane 135 that has been selected by the switch circuit 137 and image data of the sub picture plane 132 in accordance with the intransparency α1 that has been set to the image data of the sub picture plane 132. In addition, the presentation processor 139 combines the image data of which the still picture plane 134 or the moving picture plane 135 and the sub picture plane 132 have been combined and the image data of the graphics plane 133 in accordance with the intransparency α2 that has been set to the image data of the graphics plane 133. The image data of which the image data of the graphics plane 133, the image data (subtitle data) of the sub picture plane 132, and the image data of the still picture plane 134 or the moving picture plane 135 have been combined is obtained from an output terminal 140.

The presentation processor 139 can perform an effect process for image data on real time basis.

In the foregoing description, each portion of the player decoder 100 is composed of hardware. However, the present invention is not limited to such an example. For example, the player decoder 100 can be accomplished by a process of software. In this case, the player decoder 100 can be operated on a computer device. Alternatively, the player decoder 100 can be accomplished by a combination of hardware and software. For example, the audio decoder 118 and the MPEG video decoder 120 may be composed of hardware. The rest of the player decoder 100 may be composed of software.

A program that causes a computer device to execute the player decoder 100 that is composed of only software or a combination of hardware and software is recorded on a recording medium for example a compact disc read-only disc (CD-ROM) and supplied therewith. The CD-ROM is loaded into a CD-ROM drive of the computer device. The program recorded on the CD-ROM is installed to the computer device. As a result, the foregoing process can be executed on the computer device. Since the structure of the computer device is well known, the description thereof will be omitted.

2-8. User Interface

Figures 40, 41:
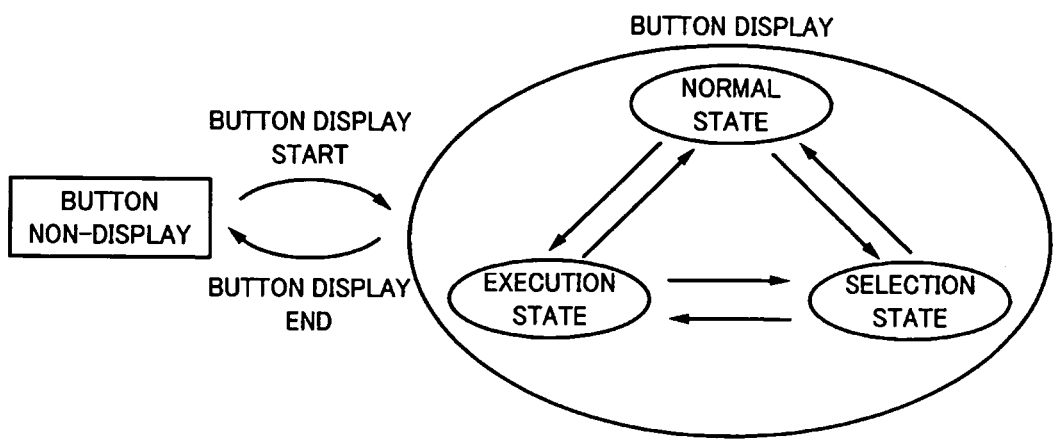
FIG. 40 is a schematic diagram showing an example of a state change of a button that is displayed.
FIG. 41 is a schematic diagram describing categories of types of objects.

Next, a user interface according to an embodiment of the present invention will be described. FIG. 40 is a schematic diagram showing an example of state change of a button displayed on the graphics plane 12. There are two button display states that are a button display state in which a button is displayed on the screen and a button non-display state in which a button is not displayed on the screen. The button non-display state is changed to the button display state. After the button is cleared, the button display state is changed to the button non-display state. The button display state has further three states that are a normal state, a selection state, and an execution state. The button display state can be changed among the three states. The button display state can be changed in one direction among the three states.

Next, with reference to FIG. 25, the state changes of the button display states will be described in detail. When a disc is loaded into the player or when the user presses the menu key of the remote controller, the menu screen 60 is displayed. When the menu screen 60 is displayed, the button display states of the buttons 62A, 62B, 62C, 63D, 64, and 65 are changed from the non-display states to the display states. Normally, one of the buttons 62A, 62B, 62C, 63D, 64, and 65 has been placed in the selection state. Now, it is assumed that the button 62A has been placed in the selection state and the other buttons have been placed in the normal state.

When the user operates for example an arrow key of the remote controller, one (for example, the button 62A) of the buttons is changed from the normal state to the selection state. In addition, the button 62A is changed from the selection state to the normal state. The cursor is moved in accordance with the user's operation. When the user operates the OK key of the remote controller, the button 62B is changed from the selection state to the execution state. As a result, a player operation assigned to the button 62B is executed.

As described above, player operations are described in a programming language or a script language such as an ECMA script. The program and script of the player operations are recorded on a disc. The program and script of the player operations may be recorded as independent files on a disc. Alternatively, as graphic objects that will be described later, the program and script of the player operations may be multiplexed with a clip AV stream file.

2-9. About Data Structure

Next, data structures of image data of buttons that compose such a menu screen and control information associated with the image data will be described. Now, subtitles and graphics (still pictures) that are displayed other than a moving picture that composes a content main part recorded on a disc will be considered. In the following description, elements such as subtitles and graphics displayed on the screen are considered as objects. The types of objects are categorized as three types that are subtitles, synchronous graphics, and asynchronous graphics as shown in FIG. 41.

Subtitles are displayed in synchronization with a moving picture like subtitles of a movie. Subtitles are image elements that do not relate to user's inputs through for example the remote controller. Graphics are image elements such as buttons on a menu screen that can accept user's inputs. In addition, graphics are categorized as two types of synchronous graphics and asynchronous graphics. Synchronous graphics are image elements in synchronization with a moving picture. Synchronous graphics are for example branch selection screens that are displayed at particular timing while a content main part is being reproduced. Asynchronous graphics are image elements that are displayed not in synchronization with a content main part that is being reproduced. Examples of asynchronous graphics are a menu screen that is initially displayed when a disc is loaded into the player and a screen that is displayed in accordance with a user's input. An image element that is displayed by a Java application that operates on JavaVM and an image element displayed in accordance with the description of an HTML file on browser software are asynchronous graphics.

In the relation of each image element and a main picture displayed on the moving picture plane 10, subtitles and synchronous graphics are displayed in synchronization with the main picture. Thus, both subtitles and synchronous graphics are synchronous type. On the other hand, since asynchronous graphics are displayed not in synchronization with a main picture, they are asynchronous type as the name implies.

Subtitles and graphics can be categorized in accordance with planes. Subtitles are displayed on the subtitle plane 11. Synchronous and asynchronous graphics are displayed on the graphics plane 12.

Since subtitles and synchronous graphics are displayed while a main moving picture is being displayed, it is preferred that they have a common data structure. Hereinafter, subtitles and synchronous graphics having a common data structure are referred to as graphics objects. Since graphics objects are always displayed in synchronization with a moving picture that is being reproduced, when they are multiplexed with a moving picture, they can be easily handled.

Figure 42A:
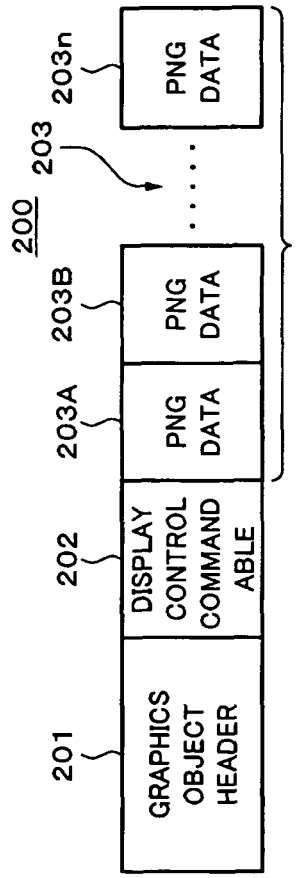
FIG. 42A, FIG. 42B, and FIG. 42C are schematic diagrams showing examples of data structures of graphics objects according to the embodiment of the present invention.
Figure 42B:
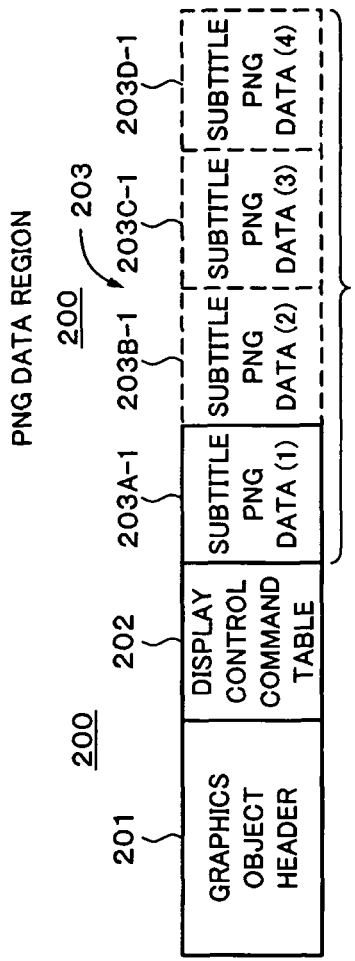
Figure 42C:
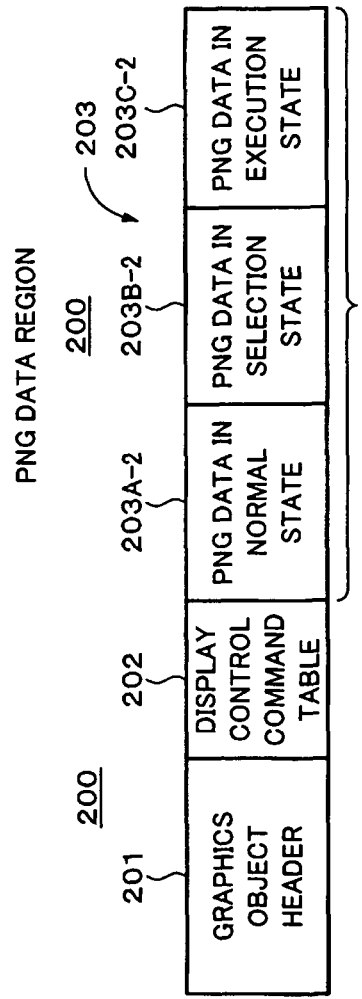

FIG. 42A, FIG. 42B, and FIG. 42C show an example of a data structure of a graphics object 200 according to the first mode of the present invention. As shown in FIG. 42A, the graphics object 200 is composed of three regions that are a graphics object header 201, a display control command table 202, and a PNG data region 203.

In the following example, it is assumed that image data treated as the graphics object 200 has a PNG format and that the image data is PNG image data. Alternatively, the graphics object 200 may be another format image data such as bit map data having the JPEG format, image data that is compressed in accordance with the run length compressing method, or bit map data that is not compression-encoded. For convenience, image data will be represented as PNG image, PNG image data, or the like.

In FIG. 42A, FIG. 42B, and FIG. 42C, the graphics object header 201 describes information that represents attributes of the graphics object 200. The attributes of the graphics object 200 are for example the data size of the graphics object 200, the number of PNG images that the graphics object 200 has, palette data used for PNG image data that the graphics object 200 uses in common, and identification information with which the graphics object 200 is identified. The identification information is for example a number uniquely assigned to each graphics object 200. The graphics object header 201 may describe further another information.

The display control command table 202 describes information necessary for controlling display of PNG images such as display positions of PNG images that the graphics object 200 has and display start times and display end times thereof.

The PNG data region 203 describes image data that has been compression-encoded in accordance with the PNG format (hereinafter, the image data is referred to as PNG data). The PNG data region 203 can have a plurality of PNG data 203A, 203B, . . . , and 203n. The number of PNG data described in the PNG data region 203 is described in the graphics object header 201.

It is assumed that a plurality of PNG data 203A, 203B, . . . , 203N described in the PNG data region 203 are images that are strongly correlated such as a set of a plurality of still pictures that composes an animation or images of three states of a button that is displayed. When these PNG data 203A, 203B, ..., and 203N are grouped as one graphics object, PNG images can be easily handled.

The graphics object 200 has time information that describes time at which the graphics object 200 can be displayed. In the example of which a real time stream is transmitted as an MPEG2 TS, pts (Presentation Time Stamp) defined in the MPEG2 (Moving Pictures Experts Group 2) is used as the time information. The pts is time management information of an output that is reproduced. The pts is measured by a clock of 90 kHz as a value having a length of 33 bits. When the STC (System Time Clock) of the reference decoder of the MPEG system accords with the pts, a corresponding access unit is reproduced and output. One graphics object 200 can be displayed after time represented by the pts. After the time represented by the pts, the display of the graphics object 200 is turned on and off with a display control command. Since the display of the graphics object 200 is managed with the display control command, after the display of the graphics object 200 is turned off, the same graphics object 200 can be displayed.

FIG. 42B shows an example of the graphics object 200 of subtitles. A PNG data region 203 describes an image of subtitles as PNG data (1) 203A-1. When the graphics object 200 is subtitles, the graphics object 200 requires only the PNT data (1) 203A-1. A special effect such as fade in/fade out that does not change the contents of an image can be added to for example subtitles by adding a display control command that causes intransparency of the PNG data (1) A-1 to be changed to the display control command table 202.

On the other hand, when an effect such as an animation of which images are varied is applied to subtitles, a plurality of PNG data (2) B-1, PNG data (3) C-1, PNG data (4) D-1, ... corresponding to individual motions of the animation may be described in one graphics object 200 as represented by dotted lines shown in FIG. 42B. In addition, PNG data of subtitles of different languages such as Japanese subtitles and English subtitles can be described as PNG data (1) A-1, PNG data (2) B-1, ... in one graphics object 200.

FIG. 42C shows an example of a graphics object 200 that composes a button. As described above, a button has three types of states that are a normal state, a selection state, and an execution state. A button can be displayed with different images corresponding to the three types of states. When a button is displayed with different images corresponding to the three types of states, it is necessary to prepare data of three button images. The data of three button images is treated as one graphics object 200. In other words, the PNG data region 203 of the graphics object 200 describes PNG data 203A-2, 203B-2, and 203C-3 with which a button is displayed in the normal state, the selection state, and the execution state, respectively.

When the graphics object 200 has only PNG data 203A-1 for subtitles as represented by solid lines shown in FIG. 42B, a display control command for the PNG data 203A-1 is described in the display control command table 202 of the graphics object 200. When the graphics object 200 has a plurality of PNG data 203A-2, 203B-2, and 203C-2 as shown in FIG. 42C, it is necessary to identify a display control command described in the display control command table 202 for the plurality of PNG data 203A-2, 203B-2, and 203C-2.

When the initial state of a button of a graphics object 200 shown in FIG. 42C has been designated as the selection state, a button image that is displayed first and placed at the beginning of the PNG data region 203 should not be the PNG data 203A-2 for the normal state, but the PNG data 203B-2 for the selection state. According to the first mode of the present invention, the display control is performed outside the graphics object 200.

The initial state of each button, display start and display stop, a program that is executed in the execution state of each button, and so forth would be designated by an external script program of a graphics object 200, for example, foregoing ECMA script or JavaScript. PNG data for a button that is displayed is changed when the user operates an arrow key of the remote controller and moves the cursor. In this case, the player changes PNG data of each button in accordance with a user's input.

According to the first mode of the present invention, a graphics object 200 is divided into packets that are prescribed in the MPEG2, multiplexed with a clip AV stream, and recorded as a clip AV stream file on a disc. As shown in FIG. 43, a graphics object 200 is divided and contained in PES (Packetized Elementary Stream) packets 210, 210, ... that are prescribed in the MPEG2. At this point, the graphics object header 201, the display control command table 202, and the beginning of individual PNG data 203A, 203B, ..., 203n are contained at the beginning of the payload of each of the PES packets 210, 210, ... As a result, when a graphics object 200 is reproduced, it can be easily searched for each data thereof.

A graphics object 200 divided and contained in the PES packets 210, 210, ... is further divided into TS packets having a fixed data size of 188 bytes (not shown) and multiplexed with a stream of moving picture data and sound data such as a clip AV stream.

2-10. About Decoder Model for Graphics Objects

Figure 44:
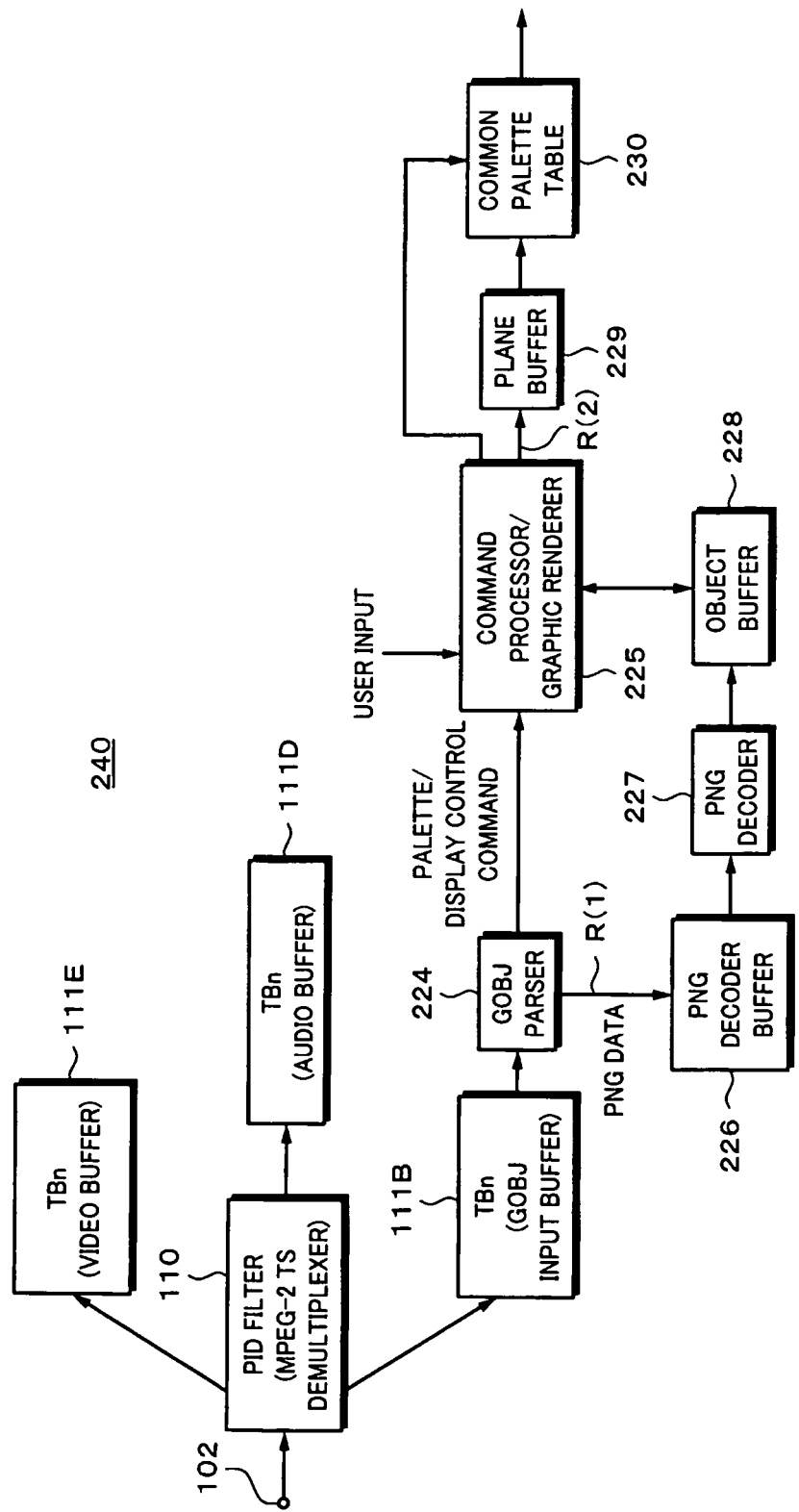
FIG. 44 is a functional block diagram showing an example of a structure of a graphics object decoder model that decodes a graphics object.

FIG. 44 is a functional block diagram showing an example of a structure of a graphics object decoder model 240 that decodes a graphics object 200. The graphics object decoder model 240 mainly comprises the multimedia engine 106 and the sub picture decoder 116 of the player decoder 100 described in FIG. 39. In FIG. 44, for simplicity, similar portions to those in FIG. 39 will be denoted by similar reference numerals and their description will be omitted. Since FIG. 44 more functionally shows the graphics object decoder model 240 than FIG. 39, when necessary, the graphics object decoder model 240 will be described in comparison with structures shown in those drawings.

A clip AV stream is supplied from the terminal 202 to the PID filter 110. The PID filter 110 functions as a demultiplexer for an MPEG TS (transport stream) and extracts moving picture data, audio data, and a graphics object 200 from the MPEG TS in accordance with the PID of the TS. The moving picture data is supplied to the buffer TBn 11E, which is a video buffer. Audio data is supplied to a buffer 111D that is an audio buffer. The graphics object 200 is supplied to the buffer TBn 111B, which is an input buffer of a graphics object (denoted by "GOBJ" in FIG. 44).

The graphics object 200 is read from the buffer TBn 111B and supplied to a GOBJ parser 224. The GOBJ parser 224 is for example one of functions of the sub picture decoder 116 shown in FIG. 39. The GOBJ parser 224 reads the graphics object header 201 from the supplied graphics object 200, extracts palette data from the graphics object header 201, and separates the display control command table 202 and the PNG data region 203 from the graphics object header 201. The palette data and the display control command table 202 are supplied to a command processor/graphic renderer 225. PNG data 203A, 203B, ... of the PNG data region 203 are temporarily stored in a PNG decoder buffer 226. The PNG decoder buffer 226 corresponds to the buffer Bn 112B shown in FIG. 39.

The PNG data 203 stored in the PNG decoder buffer 226 is decoded by a PNG decoder 227 that is one of functions of the sub picture decoder 116 and output as bit map data. The bit map data is stored in an object buffer 228. The object buffer 228 corresponds to the graphics buffer 109D shown in FIG. 39.

The command processor/graphic renderer 225 reads the bit map data stored in the object buffer 228 in accordance with a display control command described in the display control command table 202 and transfers the bit map data to a plane buffer 229 at designated time. The plane buffer 229 corresponds to for example the sub picture plane 132 and the graphics plane 133 shown in FIG. 39. Plane buffers 229A and 229B (not shown) may be disposed for subtitles and graphics objects other than subtitles. Alternatively, the sub picture plane 132 and the graphics plane 133 may be regions different from the plane buffer 229.

In addition, the command processor/graphic renderer 225 supplies palette data supplied from the GOBJ parser 224 to a common palette table 230 that corresponds to the palette 150 shown in FIG. 39. The command processor/graphic renderer 225 has a part of functions of the multimedia engine 106 and a part of functions of the sub picture decoder 116 shown in FIG. 39.

When a graphics object 200 composes a button, as described above, PNG data 203A, 203B, and 203C corresponding to three types of states of the button are contained in the graphics object 200. The PNG data 203A, 203B, and 203C are decoded by the PNG decoder 227 and stored in the object buffer 228.

On the other hand, an input from for example the user's remote controller is received by the command processor/graphic renderer 225. The command processor/graphic renderer 225 reads a bit map from the object buffer 228 in accordance with the user's input and transfers the bit map to the plane buffer 229. When the user's input causes the state of the button to be changed from the selection state to the execution state, bit map data that corresponds to the button image of the execution state is selectively read from the object buffer 228 and transferred to the plane buffer 229.

The command processor/graphic renderer 225 can perform a special effect process such as an extracting process for the bit map data that is read from the object buffer 228 in accordance with a display control command.

According to the first mode of the present invention, since the sampling depth of one pixel of PNG data is eight bits, data of eight bits per pixel is arranged in the plane buffer 229. Data of the plane buffer 229 is read at intervals of a scanning period of a displaying system that performs a displaying process for such as a display device. Bit map data that is read from the plane buffer 229 is supplied to the common palette table 230 that corresponds to for example the palette 150 shown in FIG. 39. The common palette table 230 converts the bit map data into color information of real RGB (4:4:4) in accordance with a palette index value and extracts intransparency data α1 and α2 from the bit map data. Color information of RGB (4:4:4) is converted into color information of YCbCr (4:4:4) of a converting circuit (not shown). The color information of YCbCr (4:4:4) is supplied to the presentation processor 139 shown in FIG. 39 along with the intransparency data α1 and α2.

A special effect that requires a process for changing a palette and intransparency such as fade in/fade out is accomplished by the command processor/graphic renderer 225 that varies data of the common palette table 230 in accordance with a display control command. Alternatively, common palette tables 230A and 230B (not shown) may be disposed for subtitles and a graphics object 200 other than subtitles.

FIG. 45A, FIG. 45B, FIG. 45C, and FIG. 45D show examples of changes of stored data amounts of the graphics object input buffers (buffer TBn 111B, hereinafter referred to as GOBJ input buffer), the PNG decoder 227, the object buffer 228, and the plane buffer 229. The PNG decoder 227 shows a stored data amount of a buffer that the PNG decoder 227 uses when it decodes the PNG data.

FIG. 45A, FIG. 45B, FIG. 45C, and FIG. 45D show changes of data amounts on time base of three graphics objects GOBJ#1, GOBJ#2, and GOBJ#3. The decode start time of a graphics object is represented with a dts (Decoding Time Stamp) of the MPEG2 system. The start time of the valid period of an object is represented with a pts. An object is ended at time presentation_end described in the graphics object header 201. A display control command designates the display start and end of an image in the valid period.

Figures 45A, 45B, 45C, 45D:
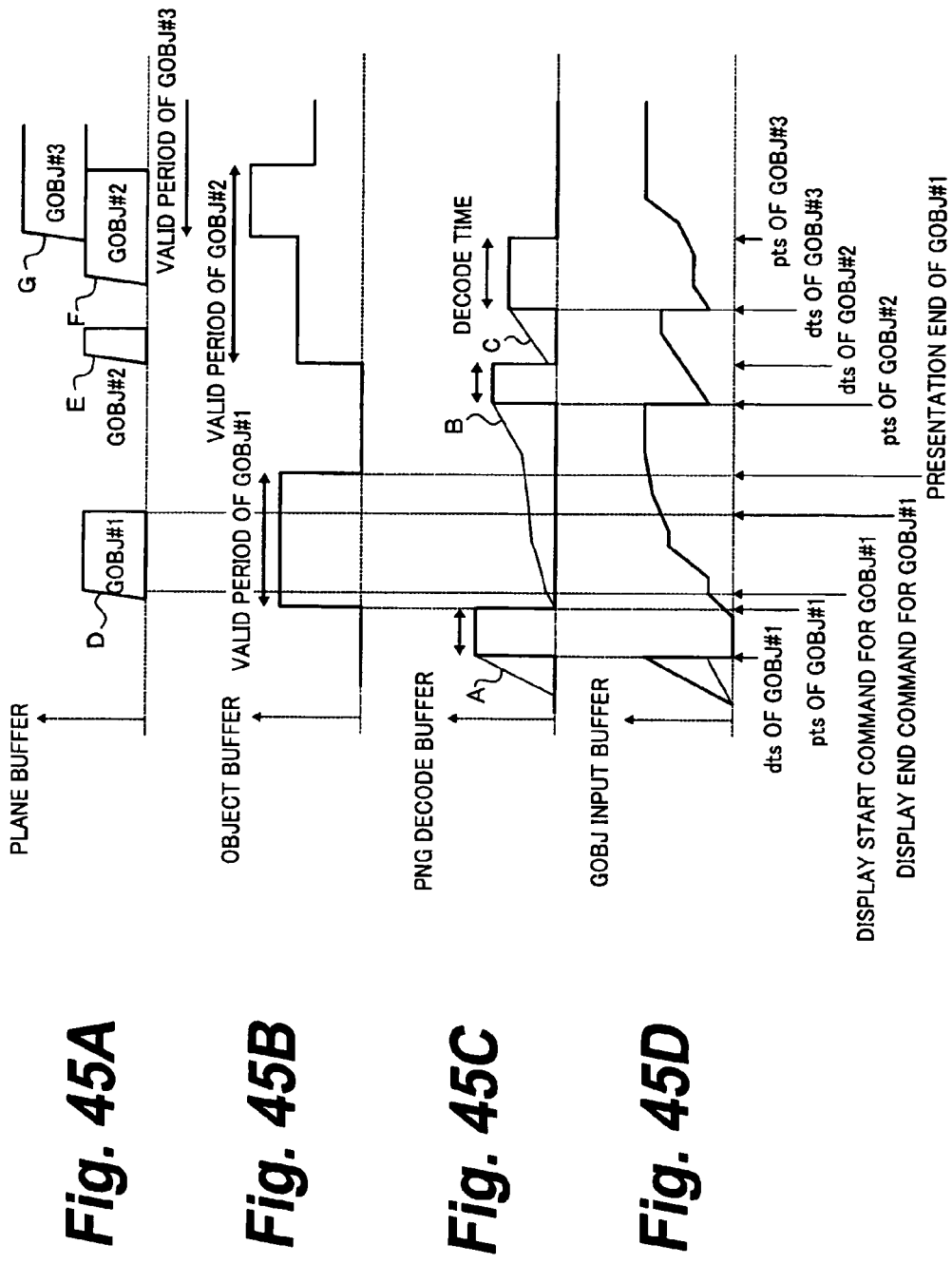
FIG. 45A, FIG. 45B, FIG. 45C, and FIG. 45D are schematic diagrams showing examples of stored data amounts that are changed in a graphics object input buffer, a PNG decoder, an object buffer, and a plane buffer.

In FIG. 45D, PNG data of the graphics object GOBJ#1 is input to the GOBJ input buffer. At time dts of GOBJ#1, decoding of the PNG data is started. In FIG. 45C, the PNG data is transferred from the GOBJ input buffer to the PNG decoder 227. The PNG data is decoded and bit map data is obtained. In reality, the PNG data is temporarily moved from the GOBJ input buffer to the PNG decoder buffer 226. The PNG decoder 227 performs a decoding process for data stored in the PNG decoder buffer 226.

Since the PNG decoder 227 has an upper limit of a decoding speed, data is supplied from the GOBJ input buffer to the PNG decoder buffer 226 so that the transfer speed of the data does not exceed the decoding speed of the PNG decoder 227. Thus, PNG data is input to the PNG decoder buffer 226 at a data transfer speed corresponding to a slope against a vertical line that represents that the process time of PNG data in the PNG decoder 227 is 0.

Even if PNG data has not been fully input to the PNG decoder 227, decoding of the PNG data can be started. In the example shown in FIG. 45A, FIG. 45B, FIG. 45C, and FIG. 45D, after the object GOBJ#1 stored in the GOBJ input buffer has been fully transferred to the PNG decoder 227, an input of PNG data of the next object GOBJ#2 to the GOBJ buffer is started.

Likewise, PNG data of the object GOBJ#2 and the object GOBJ#3 is input to the PNG decoder buffer 226 at respective transfer speeds corresponding to particular slopes B and C, respectively. In reality, the slope B varies in a plurality of regions.

When the valid period of the object GOBJ#1 starts at time pts of GOBJ#1, bit map data of the object GOBJ#1 that has been decoded and stored in the PNG decoder buffer is transferred to the object buffer 228 (FIG. 45B). The valid period of the object GOBJ#1 transferred to the object buffer 228 continues until time represented by presentation end of GOBJ#1.

In the valid period of the object GOBJ#1, when a command Display ON Cmd. of GOBJ#1 is issued, bit map data of the object GOBJ#1 stored in the object buffer 228 is transferred to the plane buffer 229 and displayed (FIG. 45A). As will be described later, the upper limit of the transfer speed of bit map data to the plane buffer 229 varies depending on an influence of a bus width and the like. Thus, bit map data is written to the plane buffer 229 at a transfer speed corresponding to for example a particular slope D.

Likewise, bit map data of the other objects GOBJ#2 and object GOBJ#3 is transferred at transfer speeds corresponding to slopes E, F, and G and written to the plane buffer 229.

The object GOBJ#1 is continuously displayed until a command Display OFF cmd. of GOBJ#1 that causes the object GOBJ#1 to be cleared is issued. When the command Display OFF cmd. of GOBJ#1 is issued, the bit map data of the object GOBJ#1 stored in the plane buffer 229 is discarded and the object GOBJ#1 is cleared on the screen.

The objects GOBJ#2 and GOBJ#3 are successively input to the GOBJ buffer. Like the object GOBJ#1, decoding of the objects GOBJ#2 and GOBJ## is started at time dts of GOBJ#2 and time dts of GOBJ#3. PNG data is supplied to the PNG decoder 227. The PNG decoder 227 decodes the PNG data with a PNG decoder buffer and outputs bit map data. The valid period of the object GOBJ#2 is designated time pts of GOBJ#2. A command Display ON cmd. of GOBJ#2 (not shown in FIG. 45A to FIG. 45D) causes the object GOBJ#2 to be displayed. The object buffer 228 transfers bit map data to the plane buffer 229. The object GOBJ#2 is displayed until the command Display OFF cmd. of GOBJ#2 is issued.

In the example shown in FIG. 45A to 45D, after the object GOBJ#2 is cleared with a command Display OFF cmd. of GOBL#2 (not shown), the object GOBJ#2 is displayed again with a command Display ON cmd. of GOBJ#2. Bit map data of the object GOBJ#2 is kept stored in the object buffer 228 until valid period end time presentation end of GOBJ#1 is designated to the object GOBJ#2. Thus, with the command Display ON cmd. of GOBJ#2, the object GOBJ#2 can be repeatedly displayed.

On the other hand, the valid period designated for the object GOBJ#3 overlaps with the valid period designated for the object GOBJ#2. In this case, the object buffer 228 stores a plurality of bit map data in different regions in accordance with a blank capacity thereof. For example, while bit map data of the object GOBJ#2 is transferred from the object buffer 228 to the plane buffer 229 and displayed, when bit map data of the object GOBJ#3 is transferred from a different region of the object buffer 228, data of two bit maps can be displayed at the same time.

2-11. About Transfer Speed of Graphics

Next, the case that the graphics object decoder model 240 (hereinafter referred to as decoder model 240) is built in the player will be considered. To allow data reproduced from the same disc to have compatibility with different players, it would be necessary to apply predetermined restriction to the decoder model 240. For example, the decoder model 240 has an upper limit of the capability of the graphics process. Thus, when graphics data that exceeds the upper limit of the capability is input, it becomes impossible to perfectly decode the graphics data. As a result, the graphics data cannot be normally displayed.

The minimum capability of the graphics process that the player side should have will be prescribed in a standard. On the other hand, graphics that can be processed in the minimum capability prescribed in the standard will be prepared on the contents producer side. By matching the capability of the graphics process that the player side has with the capability of the graphics process that the contents producer side prepares, the reproduction compatibility can be maintained.

According to the first mode of the present invention, in FIG. 44, a data transfer speed R(1) from the GOBJ parser 224 to the PNG decoder buffer 226 and a data transfer speed R(2) from the command processor 225 to the plane buffer 229 are prescribed.

The data transfer speed R(1) prescribes the data transfer amount pre unit time of data that is input to the PNG decoder buffer 226. In other words, the slopes A, B, and C shown in FIG. 45C correspond to the data transfer speed R(1). That prescribes the decode capability that represents the amount for which the PNG decoder 227 disposed downstream of the PNG decoder buffer 226 can decode compression-encoded graphics data in a unit time. Thus, by restricting the data transfer speed R(1), the input compression-encoded graphics data can be prevented from being imperfectly decoded and being improperly displayed.

The data transfer speed R(2) prescribes an update speed of an image. The plane buffer 229 corresponds to a screen actually displayed on the display device. Thus, the update speed of graphics that the user sees depends on the write speed of data to the plane buffer 229. The data transfer speed R(2) prescribes the minimum update interval of all a plane, namely all a screen in the unit of [bytes/second]. In other words, the slopes D, E, F, and G shown in FIG. 45A correspond to the data transfer speed R(2).

When a part of a plane is updated, since the amount of image data that is updated is small, it is updated at a shorter period than the minimum update interval prescribed as the data transfer speed R(2). However, the update interval is not always proportional to the data amount of the image data that is updated. The update interval is largely affected by the arrangement of image data on a plane.

Next, with reference to FIG. 46, the update speed of a plane will be described in detail. It is assumed that the object buffer 228 stores two graphics objects 460 and 461 and that these two graphics objects 460 and 461 are written to the plane buffer 229 and displayed.

The graphics objects 460 and 461 are read from the object buffer 228 and supplied to the command processor/graphic renderer 225. An output of the command processor/graphic renderer 225 is restricted at the foregoing data transfer speed R(2) so as to restrict the update speed (update interval) on the screen.

At this point, the update speeds of the graphics objects 460 and 461 depend on how they are placed on the plane rather than the total of their data amounts. This is because a regular graphics processor that performs a graphics process updates a plane in each rectangular region.

For example, a plane is updated with a square region 262 that contains all the graphics objects 460 and 461 placed on the plane. In other words, the command processor/graphic renderer 225 forms image data of the square region 262 in accordance with arrangement information of the graphics objects 460 and 461. The image data of the square region 262 of the square region 262 is supplied to the plane buffer 229 through a bus. The plane buffer 229 substitutes data of the region corresponding to the square region 262 with data of the square region 262 in accordance with a designated display position.

Since image data that is output from the command processor/graphic renderer 225 is bit map data, the image data has a data amount in accordance with the area of the image rather than the content of the image. In the example shown in FIG. 46, the data amount of the image of the square region 262 that contains the graphics objects 460 and 461 can be represented with for example (width×height) pixels, namely (width× height bytes).

Since the data transfer speed to the plane buffer 229 is defined as speed R(2) [bytes/second], it is clear that the graphics objects 460 and 461 can be updated in {speed R(2)/ (width×height)} seconds. After {speed R(2)/(width×height)} has elapsed, the next graphics object can be drawn. Thus, when the disc producer side creates a program that allows two graphics objects to be drawn at an interval of at least the foregoing time period, the same graphics can be displayed by any player. Thus, the reproduction compatibility can be maintained by any player.

When the data transfer speed R(2) is estimated, the animation speed of subtitles can be decided so that reproduction compatibility can be maintained as will be described later.

2-12. Details of Structure of Graphics Objects

Next, a structure of the graphics object 200 will be described in detail. FIG. 47 shows syntax that describes an example of a structure of the graphics object 200. The graphics object header 201, the display command control table 202, and the PNG data region 203 shown in FIG. 42A correspond to a block GraphicsObjectHeader( ), a block GOBJCommandTable( ), and a block PNGImageRegion( ), respectively.

The block GraphicsObjectHeader( ) starts with a field length. The field length has a data length of eight bits, an integer that is 0 or larger. The field length describes the length immediately after the field length until the end of the block GraphicsObjectHeader( ) in bytes. A field presentation_end_time_stamp has a data length of 33 bits, an integer that is 0 or larger. The field presentation_end_time describes valid period end time of the graphics object 200. The valid period of the graphic object is from a pts of a PES packet header until valid period end time described in this field presentation_end_time_stamp. A field Number_of_PNG_images has a data length of eight bits, an integer that is 0 or larger, and describes the number of PNG images described in the block PNGImageRegion( ). A field Number_of_DispCmds has a data length of eight bits, an integer that is 0 or larger, and describes the number of display control commands described in a block GOBJCommandTable( ).

A block GlobalPaletteTable( ) in the block GraphicsObjectHeader( ) describes information of a palette table commonly used in the graphics object 200. Information of a palette table described in the block GlobalPaletteTable( ) is described as the contents of the common palette table 230. A field start_address_of_PNG image(i) has a data length of 32 bits, an integer that is 0 or larger, and describes the position at which data PNG_image(i) of an i-th PNG image starts with the relative number of bytes from the beginning of the block GraphicsObject( ).

A field PNG_file_name(i) describes a file name of PNG data that starts with the field start_address_of_PNG_image (i). The contents of the field PNG_image(i) that is a field in the block PNGImageRegion( ) are the same as those of a single PNG file. A block PNGImageRegion( ) is created by connecting one or more PNG files. For example, in FIG. 42A, the PNG data 203A, 203B, . . . , and 203n are connected and the block PNGImageRegion( ) is created. At this point, a file name can be described in the field PNG_file_name(i) so that the file name is not lost. In contrast, when the PNGImageRegion( ) is decomposed and individual PNG files are obtained, the individual fields PNG_image(i) are independent files having file names described in the field PNG_file_name(i).

The block GOBJCommandTable( ) is composed of a command group DispCmds(i) that is a collection of display control commands that are executed at the same time. The command group DispCmds(i) describes display control commands starting with a command execution_time (time) that describes an execution time. In other words, a portion after the command execution_time (time) until the next command execution_time (time) composes one command group DispCmd(i).

As described above, the block PNGImageRegion( ) describes a field PNG_image(i) that is data of one image that has been compression-encoded in accordance with the PNG system.

Any number of padding_word can be described between the block GraphicsObjectHeader( ) and the block GOBJCommandTable( ). Likewise, any number of padding_word can be described between the block GOBJCommandTable( ) and the block PNGImageRegion( ).

FIG. 48 shows syntax that describes an example of a structure of the foregoing block GlobalPaletteTable( ). A field number_of_palette_entries describes the number of palette data preceded thereby. When an image is described with an index number having a data length of eight bits, the maximum number of the field number_of_palette_entries is 256. Thus, 256 colors can be used. When only some of 256 colors are used, only necessary palette data is required. The field number_of_palette_entries describes the number of indexes that are used.

A field palette_index_number describes an index number assigned to colors and intransparency of a field red_value, a field green_value, a field blue_value, and a field alpha that are preceded by the field palette_index_number. Image data references colors and intransparency with the index number.

In a loop of a for statement of the block GlobalPaletteTable( ), the field palette_index_number that has the same value should not be described more than twice. Each of the field red_value, the field green_value, and the field blue_value has a data length of eight bits, an integer that is 0 or larger. The field red_value, the field green_value, and the field blue_value designate red, green, and blue, respectively. The field alpha has a data length of eight bits. The field alpha represents intransparency $\alpha$. When the value of the field alpha is 0, it represents perfect transparent. When the value of the field alpha is 255, it represents perfect intrasparent.

Each PNG image can have a chunk of palette information PLTE. According to the first mode of the present invention, the palette information PLTE is not used, but palette information defined by the block GlobalPaletteTable( ). When a plurality of PNG images are displayed at the same time, if the PNG images use colors of different palettes, it will be difficult to display the PNG images in correct colors. In other words, a plurality of PNG images described in the field PNG_image (i) of GraphicsObject( ) reference the common block GlobalPaletteTable( ) and use the common palette table described in the block GlobalPaletteTable( ).

Next, the command group DispCmds(i) will be described. The command group DispCmds(i) describes display control commands that control the display of a graphics object 200. In the command group DispCmds(i), a command execution_time(start_time) causes a command described before the next command execution_time(start_time) to be executed at designated time start_time. The start point of the time start_time is the pts of the graphics object 200. The unit of the time start_time is the same as that of the pts.

One command group DispCmds(i) can describe a plurality of commands that are executed at the time start_time described in the command execution_time(start_time). Commands described in the command group DispCmds(i) are executed simultaneously at the time start_time described in the command execution_time(start_time). Before the commands described in the command group DispCmds(i) have been executed, if the time start_time described in the command execution_time(start_time) of the next command group DispCmds(i+1) has elapsed, the execution of the command group DispCmds(i) is cancelled. Instead, the next command group DispCmds(i+1) is executed.

Display control commands besides the command execution_time(start_time) described in the command group DispCmds(i) are thought to be as listed in FIG. 49A and FIG. 49B. These display control commands are assigned numbers as shown in FIG. 49A and FIG. 49B.

(1) command execution_time(start_time).
(2) command that causes a graphics object to be displayed
(3) command that causes a graphics object to be cleared.
(4) command that causes a color of a palette table that is used and intransparency to be changed.
(5) command that causes the position and size of a graphics object displayed on a plane to be set.
(6) command that causes a display range of a graphics object to be set.
(7) command that causes an effect sound to be reproduced.
(8) command that causes an effect sound to be assigned to image data (PNG data).

These seven types of commands are just examples. In other words, commands in the command group DispCmds(i) are not limited to those commands. Other display control commands can be defined and added to the command group DispCmds(i).

The display start command (2) and the display end command (3) of the graphics object 200 are so-called fade in/fade out commands that are described as a command fade_in(fade_in_time) and a command fade_out (fade_out_time), respectively.

The fade-in is designated by the command fade_in(fade_in_time). The command fade_in(fade_in_time) causes a graphics object 200 to be gradually displayed from the non-display state to the display state. By gradually increasing the value of the intransparency α of the alpha-blending corresponding to the time fade_in_time, the fade-in can be accomplished. When the command execution_time(start_time) is followed by the command fade_in(fade_in_time), the graphics object 200 that is transparent gradually becomes intransparent after the time start_time designated by the command execution_time (start_time). After the time designated by the argument time fade_in_time has elapsed, the value of the intransparency α of all the palette indexes is set to a value designated on the common palette table.

When the time fade_in_time of the command fade_in(fade_in_time) has been set to 0, the graphics object 200 is immediately displayed in colors and intransparency α designated on the palette table.

The fade-out is an inverse process of the fade-in. The fade-out is designated by the command fade_out (fade_out_time). The command fade_out (fade_out_time) causes a graphics object 200 that is displayed to be gradually cleared. By gradually decreasing the value of the intransparency α of the alpha-blending corresponding to the time fade_out_time, the fade-out can be accomplished. When the command execution_time(start_time) is followed by the command fade_out (fade_out_time), a graphics object 200 that is intransparent gradually becomes transparent immediately after the time start_time designated by the command execution_time(start_time). After the time designated by the argument time fade_out_time has elapsed, the value of the intransparency α of all the palette indexes becomes 0. As a result, the graphics object 200 fully becomes transparent and invisible.

When the time fade_out_time of the command fade_out (fade_out_time) is set to 0, the graphics object 200 is immediately cleared.

When the value of the intransparency α is gradually varied in the fade-in and fade-out as time elapses, more natural fade-in and fade-out effects can be preferably obtained. Alternatively, in the fade-in, after the time designated by the time fade_in_time has elapsed, the value of the intransparency α should match the value designated on the palette table. However, the resolution and gradation of the intransparency α are not designated by a command. In reality, the resolution and gradation of the intransparency α depend on the installed system.

In the foregoing example, the commands are represented as texts such as "fade-in( )" and "fade_out( )" for high recognizability. However, actually, the commands fade_in( ) and fade_out( ) are converted into predetermined binary values along with their arguments and described in DispCmds(i). That applies to other commands that will be described later.

The palette table color and intransparency α change command (4) causes palette information to be changed. This command is described in the format of change_palette (index, newR, newG, newB, newAlpha). A PNG image displayed simultaneously on the subtitle plane 11 and the graphics plane 12 references the common palette table that is shown in FIG. 24 and that is defined by the syntax shown in FIG. 48. Palette information defined as GlobalPaletteTable( ) is used as the common palette table. With the command change_palette (index, newR, newG, newB, and newAlpha), the common palette information can be changed.

In other words, the values index, newR, newG, and newAlpha described as arguments in the command change_palette (index, newR, newG, newB, newAlpha) cause values R, G, and B of three primary colors of color index values represented by the palette number index to be changed to the values newR, newG, and newB and the value of the intransparency α to be changed to the value newAlpha.

The command (5) that causes the display position and size of a graphics object to be set on a plane is used in the format of set_display_box(x1, y1, x2, y2). The command (5) causes a graphics object 200 to be placed in a square region (x1, y1) (x2, y2) defined with coordinates (x1, y1) and (x2, y2) on the plane. The command (6) that causes a display range of a graphics object to be set is used in the format of set_clipping_box(a1, b1, a2, b2). The command (6) causes a square region (a1, b1) (a2, b2) defined with coordinates (a1, b1) and (a2, b2) of a PNG image of a graphics object 200 to be displayed on the plane.

Next, with reference to FIG. 50A and FIG. 50B, the command set_display_box(x1, y1, x2, y2) and the command set_clipping_box(a1, b1, a2, b2) will be described in detail. As shown in FIG. 51, on the coordinates shown in FIG. 50A and FIG. 50B, the upper left corner of the display screen is defined as an origin, the horizontal right direction is denoted by x, the lower vertical direction is denoted by y, and coordinates are denoted by (x, y).

Figure 50A:
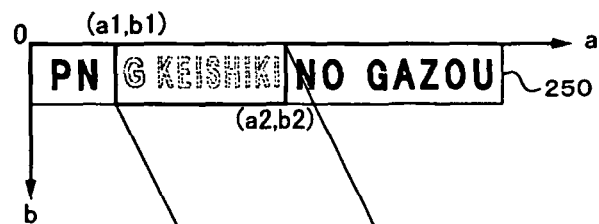
FIG. 50A and FIG. 50B are schematic diagrams describing a command set_display_box(x1, y1, x2, y2) and a command set_clipping_box(a1, b1, a2, b2)
Figure 50B:
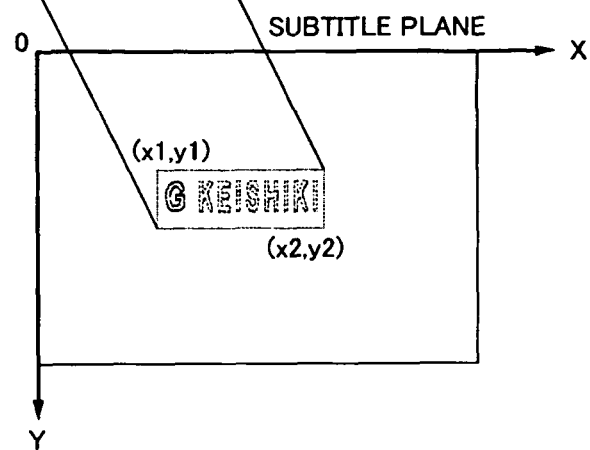
Figure 51:
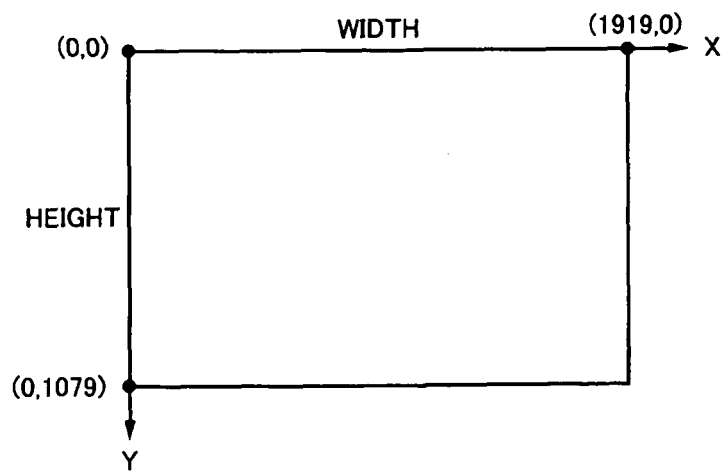
FIG. 51 is a schematic diagram describing a definition of coordinate axes.

As shown in FIG. 50A, the command set_clipping_box(a1, b1, a2, b2) causes a square region (a1, b1) (a2, b2) that is actually displayed to be set in a PNG image 250 of a graphics object 200. In the example shown in FIG. 50A, it is assumed that the square region (a1, b1) (a2, b2) to be set is smaller than the PNG image 250. The command set_display_box(x1, y1, x2, y2) causes a real display position of the square region (a1, b1) (a2, b2) to be set on a plane of a square region (x1, y1) (x2, y2) (see. FIG. 50B). In other words, only the square region (a1, b1) (a2, b2) of the PNG image 250 is displayed against the square region (x1, y1) (x2, y2) on the screen.

When the square region (a1, b1) (a2, b2) is larger than the square region (x1, y1) (x2, y2) that is actually displayed, only the PNG image of the square region (x1, y1) (x2, y2) in the square region (a1, b1) (a2, b2) is displayed. In contrast, when the square region (a1, b1) (a2, b2) is smaller than the square region (x1, y1) (x2, y2) that is actually displayed, the outside of the square region (a1, b1) (a2, b2) in the square region (x1, y1) (x2, y2) is treated as a transparent region.

When the foregoing display control commands are described along with a plurality of commands execution_ time(start_time), subtitles and synchronous graphics that vary as time elapses can be displayed. For example, in the graphics object 200 shown in FIG. 47, a plurality of command groups DispCmds(i) are described in the block GOBJCommandTable( ). Each of the command groups DispCmds(i) describes the display control commands execution_time (start_time) whose times start_time are different so as to execute the command groups DispCmds(i) at the start times designated by start_time.

Figure 52:
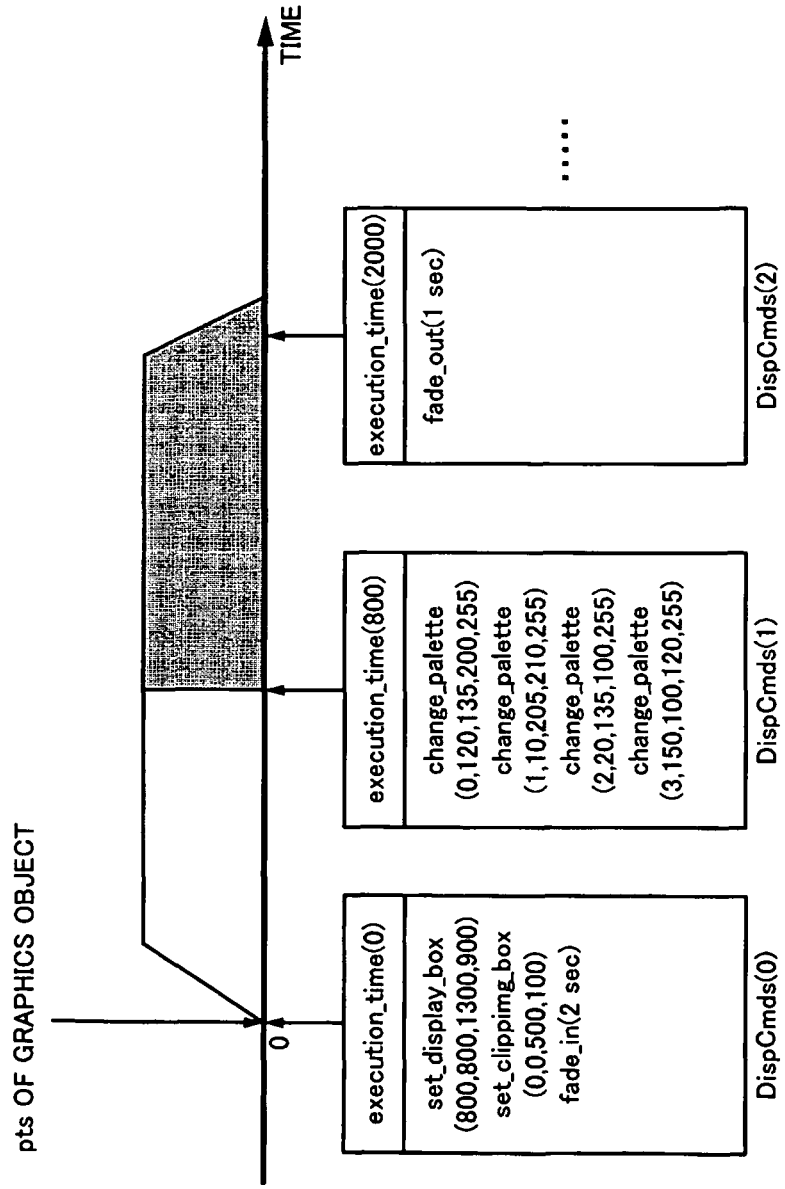
FIG. 52 is a schematic diagram describing the command group DispCmds(i) and an example of a change of a graphics object that is displayed.
Figure 53A:
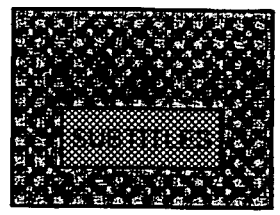
FIG. 53A, FIG. 53B, FIG. 53C, and FIG. 53D are schematic diagrams showing an example of fade-in of which subtitles are gradually displayed.
Figure 53B:
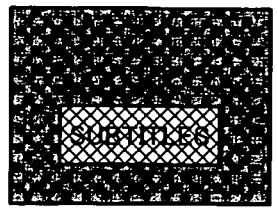
Figure 53C:
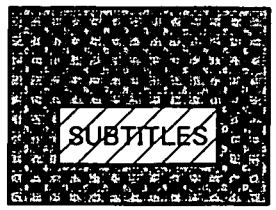
Figure 53D:
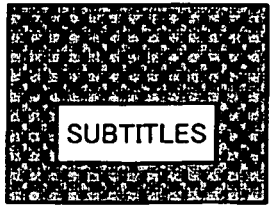

FIG. 52 shows an example of a description of a command group DispCmds(i) and a display change of a graphics object 200. In FIG. 52, the horizontal axis represents an elapse of time, whereas the vertical axis represents intransparency of a graphics object 200. In FIG. 52, the intransparency increases in the upper direction. The time denoted by pts is the origin.

In the first command group DispCmds(0), a command set_display_box(800, 800, 1300, 900) causes a display region on a plane to be set. A command set_clipping_box(0, 0, 500, 100) causes a display region of a PNG image of a graphics object 200 to be set. A command fade_in (2 sec) causes a fade-in process for two seconds to be started at time [0]. In the next command group DispCmds(1), a command change_palette(index, newR, newG, newB, Alpha) describes color index values [1], [2], [3], and [4]. The command group DispCmds (1) also causes colors and intransparency α referenced by the index values [1], [2], [3], and [4] to be changed at time [800]. The next command group DispCmds(2) causes a graphics object 200 that is displayed to be faded out for two seconds at time [2000].

As shown in FIG. 52, when the command groups DispCmds(0), DispCmds(1), and DispCmds(2) are successively described, for example subtitles that vary as time elapses can be accomplished. In other words, when the command groups DispCmds(0), DispCmds(1), and DispCmds(2) are properly used, subtitles and button images can be displayed as animations.

FIG. 53A, FIG. 53B, FIG. 53C, and FIG. 53D show an example of fade-in of which subtitles are gradually displayed. In FIG. 53A to FIG. 53D, the fade-in is controlled so that subtitles are gradually displayed. Such simple fade-in can be accomplished with a command similar to the command group DispCmds(0) shown in FIG. 52.

Figure 54A:
FIG. 54A and FIG. 54B are schematic diagrams showing an example of which a PNG image as subtitles is moved on a plane.
Figure 54B:
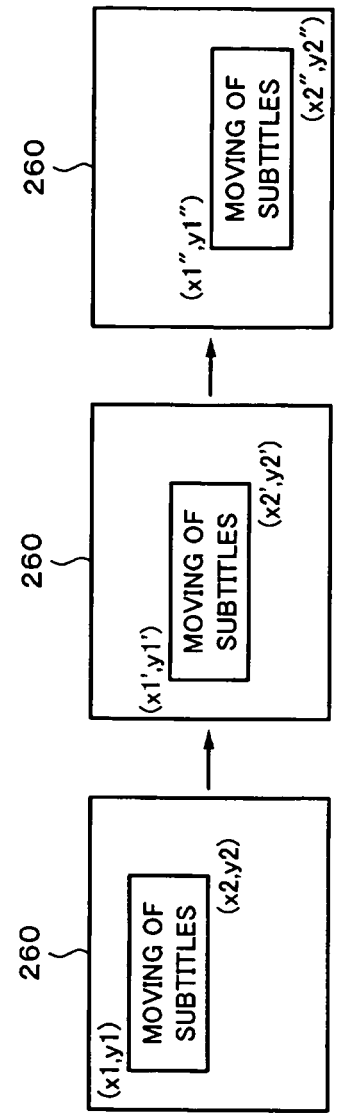

FIG. 54A and FIG. 54B show an example of which a PNG image 260 as subtitles is moved between planes. Such a PNG image 260 can be accomplished with a plurality of commands set_display_box(x1, y1, x2, y2). For example, in the first command group DispCmds(0), a command execution_time (start_time) causes the start time to be set. A command set_clipping_box(a1, b1, a2, b2) causes a display region of the PNG image 260 to be set as shown in FIG. 54A. A command set_display_box(x1, y1, x2, y2) causes an initial display region of the PNG image 260 to be set on the plane.

In the next command group DispCmds(1), a command execution_time(start_time) causes predetermined time that elapses after the execution of the command group DispCmds (1) to be set as start time. A command set_display_box(x1', y1', x2', y2') causes a display region to be moved on the plane to be set. Likewise, in the next command group DispCmds(2), a command execution_time(start_time) causes predetermined time that elapses after the execution of the command group DispCmds(1) to be set as start time. A command set_display_box(x1", y1", x2", y2") causes a display region to be moved on the plane to be set.

Thus, as shown in FIG. 54B, a PNG image 260 as subtitles can be moved to a square region (x1, y1) (x2, y2), a square region (x1', y1') (x2', y2'), and a square region (x1", y1") (x2", y2") on a plane.

FIG. 55A and FIG. 55B show an example of which a display region 262 of a PNG image 261 as subtitles is moved and scrolled. That can be accomplished with a plurality of the commands set_clipping_box(a1, b1, a2, b2). For example, in the first command group DispCmds(0), a command execution_time(start_time) causes start time to be set. A command set_clipping_box(a1, b1, a2, b2) causes a square region 262 that is initially displayed in a PNG image 260 to be set as shown in FIG. 55A. A command set_display_box(x1, y1, x2, y2) causes a square region of the PNG region 260 that is displayed on a plane to be set.

In the next command group DispCmds(1), a command execution_time(start_time) causes predetermined time that elapses after the execution of the command group DispCmd (1) to be set as start time. A command set_clipping_box(a1', b1', a2', b2') causes a display region to be moved in the PNG image 260 to be set. Likewise, in the next command group DispCmds(2), a command execution_time(start_time) causes predetermined time that elapses after the execution of the command group DispCmds(1) to be set as start time. A command set_clipping_box(a1", b1", a2", b2") causes a square region to be moved in the PNG image 260 to be set.

Thus, as shown in FIG. 55B, a square region as a part of a PNG image 261 as subtitles is moved from a square region (a1, b1) (a2, b2) to a square region (a1', b1') (a2', b2') to a square region (a1", b1") (a2", b2") in a square region (x1, y1) (x2, y2) on a plane. As a result, the subtitles can be scrolled.

FIG. 56A and FIG. 56B show an example of which a frame as a part of a PNG image 265 is set, the frame is moved in the PNG image 265, and the display position of the frame is moved on a plane. That can be accomplished by executing a plurality of commands set_display_box(x1, y1, x2, y2) and a plurality of commands set_clipping_box(a1, b1, a2, b2) at the same time. For example, in the first command group DispCmds(0), a command execution_time(start_time) causes start time to be set. A command set_display_box(x1, y1, x2, y2) and a command set_clipping_box(a1, b1, a2, b2) cause a frame 266A to be set (see FIG. 56A).

For example, the command set_display_box(x1, y1, x2, y2) causes a square region (x1, y1) (x2, y2) that is displayed on a plane to be set. The command set_clipping_box(a1, b1, a2, b2) causes a square region (a1, b1) (a2, b2) that is displayed in the PNG image 265 to be set. The square region (x1, y1) (x2, y2) and the square region (a1, b1) (a2, b2) form the frame 266A.

In the next command group DispCmds(1), a command execution_time(start_time) causes predetermined time elapses after the execution of the command group DispCmds (0) to be set as start time. A command set_display_box(x1', y1', x2', y2') causes a square region (x1', y1') (x2', y2') to be set on the plane. A command set_clipping_box(a1', b1', a2', b2') causes a square region (a1', b1') (a2', b2') to be set in the PNG picture 265. The square region (x1', y1') (x2', y2') and the square region (a1', b1') (a2', b2') form a frame 266B to which the frame 266A is moved. Likewise, in the next command group DispCmds(2), a command execution_time(start_time) causes predetermined time that elapses after the execution of the command group DispCmds(1) to be set as start time. A command set_display_box(x1", y1", x2", y2") causes a square region (x1", y1") (x2", y2") to be set on the plane. A command set_clipping_box(a1", b1", a2", b2") causes a square region (a1", b1") (a2", b2") to be set in the PNG image 265. The square region (x1", y1") (x2", y2") and the square region (a1", b1") (a2", b2") form a frame 266C to which the frame 266B is moved.

Thus, as shown in FIG. 56B, while a square region of a part of the PNG image 265 of subtitles is being moved, the square region can be moved from the region 265A to the region 265B to the region 265C on the plane.

Thus, according to the first mode of the present invention, since the display control of the graphics object 200 is performed by the command groups DispCmds(i) of which each display control command is grouped by the command execution_time(start_time), various displays can be easily accomplished on the subtitle plane 11 and the graphics plane 12.

2-13. About Effect Sounds

According to the first mode of the present invention, a sound output can be synchronized with a display control of a graphics object 200. A sound output is defined by the display control command (7), which causes an effect sound to be reproduced, and the display control command (8), which causes an effect sound to be assigned to image data in the display control commands (2) to (8), excluding the command execution_time(start_time), of the foregoing command group DispCmds(i). Sound data is assigned a unique identification sound_id.

An effect sound is a sound that is reproduced in synchronization with or in accordance with display control of subtitles or a button rather than a sound reproduced in synchronization with a moving picture or a still picture displayed on the moving picture plane (for example, in a movie, a sound recorded along with a movie picture in pairs).

As described in the related art section, the user operates keys (direction keys) assigned to up, down, left, and right directions with for example remote control commander (hereinafter referred to as remote controller) so as to select one button displayed on the menu screen. Thereafter, with an OK key, the user causes the operation assigned to the selected button to be executed. Each button has three states that are the normal state (non-selection state), the selection state, and the execution state. The three states of each button can be assigned different graphics objects. Thus, button images (shapes and colors) can be changed for the three states of each button. It is preferred that the user can easily distinguish the states of buttons with different images.

In addition, the three states of each button can be assigned different effect sounds. For example, an effect sound that is generated when the user selects a button is assigned to a button image of "selection state". In addition, an effect sound such as a click sound that is generated when a buttons is placed in the execution state is assigned to a button image of "execution state".

An effect sound assigned to the button image of "selection state" is referenced with an identifier sound_id of sound data that generates the effect sound. When the user selects the button, the sound data referenced with the identifier sound_id is read from the memory of the player and reproduced as an effect sound. Likewise, an effect sound assigned to the button image of "execution state" is referenced with an identifier sound_id of sound data that generates the effect sound. When the user selects the button and operates the OK key, the button becomes the execution state. At this point, the sound data referenced with the identifier sound_id of the effect sound assigned to the button image of "execution state", is read from the memory of the player and reproduced.

The display control command (7), which causes an effect sound to be reproduced, of the command group DispCmds(i) is described in the format of play_sound(sound_id). The command play_sound(sound_id) causes sound data identified by an identifier sound_id to be reproduced. When the command play_sound(sound_id) is described in a command group DispCmds(i), sound data identified by the identifier sound_id is reproduced at time start_time designated by the command execution_time(start_time).

Figure 57:
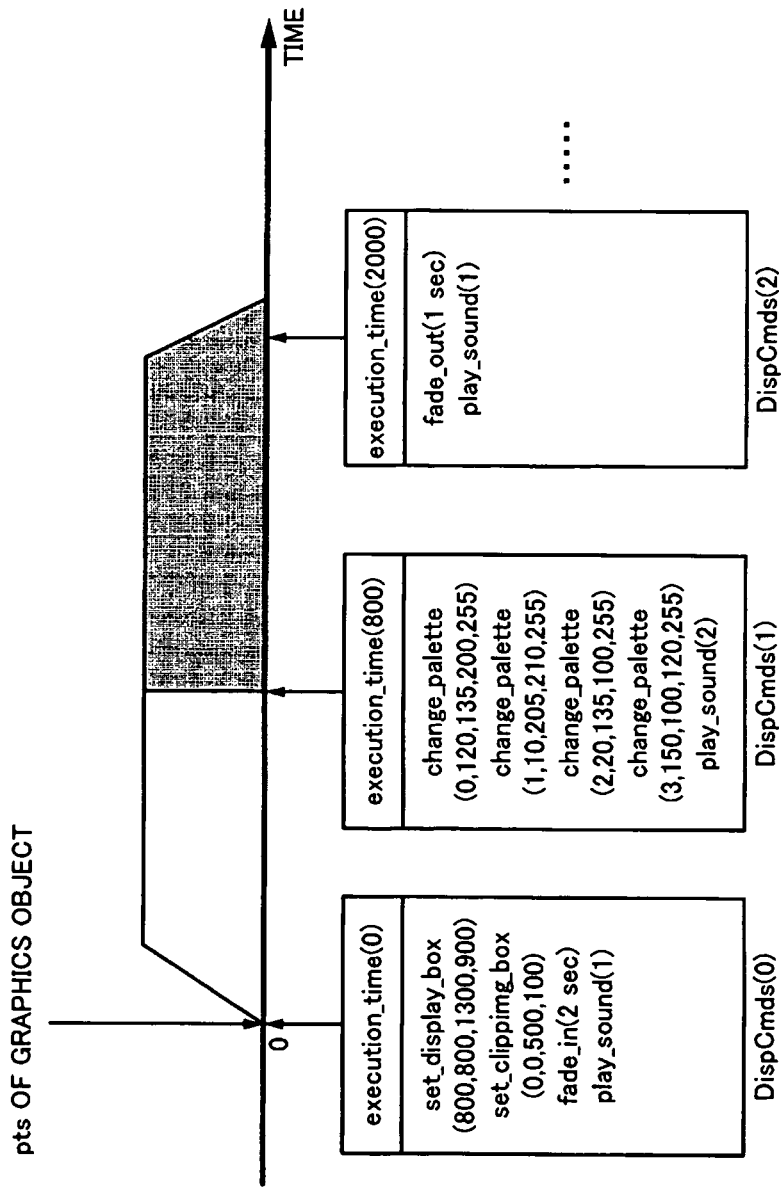
FIG. 57 is a schematic diagram that describes a command group DispCmds(i) to which a command play_sound(sound_id) has been added and that shows an example of a change of a graphics object that is displayed.

For example, when the command play_sound(sound_id) is used along with a command fade_in(fade_in_time) and a command fade_out(fade_out_time), sound data as an effect sound can be reproduced while subtitles are being displayed and/or cleared. FIG. 57 shows an example of which the command play_sound(sound_id) is used. In the example shown in FIG. 57, in the first command group DispCmds(0), a command fade_in(2 sec) causes a graphics object to be faded in for two seconds at start time [0]. A command play_sound(1) causes sound data identified by the identifier sound_id [1] to be reproduced. Thereafter, in the command group DispCmds (1), a command execution_time(800) causes a display color to be changed at time [800]. A command play_sound(2) causes sound data identified by the identifier sound_id [2] to be reproduced. In the command group DispCmds(2), a command execution_time(2000) and a command fade_out(1 sec) cause the graphics object to be faded out for one second at time [2000]. A command play_sound(1) causes sound data identified by the identifier sound_id to be reproduced.

The command (8), which causes an effect sound to be assigned to PNG data, is described in the format of set_sound (PNG_image_id, sound_id). The command set_sound (PNG_image_id, sound_id) causes sound data designated by the identifier sound_id to be reproduced for PNG data identified by the identifier PNG_image_id. This command set_sound(PNG_image_id, sound_id) causes the sound data identified by the identifier PNG_image id to be reproduced when PNG data identified by the identifier PNG_image_id is displayed. The identifier PNG_image_id of the PNG data is the same as the value of the loop counter i of PNG_image(i) of the block PNGImageRegion( ) shown in FIG. 47.

It is considered that the command set_sound (PNG_image_id, sound_id) is used for PNG data of buttons in the selection state and the execution state. As a result, when the normal state of a button is changed to the execution state or vice versa, sound data assigned to PNG data that represents each state can be generated as an effect sound. Beside this example, this command set_sound(PNG_image_id, sound_id) can be used for PNG data for other than buttons.

FIG. 58 shows an example of a data structure of a graphics object 200 of which sound data is assigned to a button image. PNG data 203A, 203B, and 203C of buttons in the normal state, the selection state, and the execution state are described in a PNG data region 203. In the example shown in FIG. 58, display control commands cause coordinates and sound data to be assigned to PNG data. Display start time of PNG data and initial display state of buttons are controlled by an external script program. Thus, the display control commands are described as those of execution time [0].

The graphics object 200 shown in FIG. 58 describes only the command group DispCmds(0) that is executed in the display control command table 202 at time [0] by the command execution_time (0). Since an identifier PNG_image_id starts with [0], the identifier PNG_image id [0] represents PNG data 203A in the normal state; the identifier PNG_image_id [1] represents PNG data 203B in the selection state; and the identifier PNG_image_id [2] represents PNG data 203C in the execution state.

When the PNG data 203B of the button in the selection state of which the identifier PNG image_id is [1] is displayed by the command set_sound(1, 10), sound data identified by the identifier sound_id [10] is reproduced as an effect sound. Likewise, when the PNG data 203C of the button in the execution state of which the identifier PNG_image_id is [2] is displayed by the command set_sound(2, 11), sound data identified by the identifier sound_id [11] is reproduced as an effect sound.

Although not shown in FIG. 39, one or a plurality of types of sound data may be pre-stored in an internal memory or the like of the player. For example, predetermined sound data may be pre-stored in an internal non-volatile memory or the like of the player before shipment.

Alternatively, sound data as an effect sound may be prerecorded on the disc of which a graphics object 200 and a content as moving data have been recorded. When the content is reproduced from the disc, the sound data may be read. As a method for recording sound data on the disc, a file for the sound data is prepared. When the content is reproduced from the disc, the file is pre-read and stored in the memory of the player.

Alternatively, like a graphics object 200, PES packets that contain sound data are created. The PES packets are divided into TS packets. The TS packets are multiplexed with a clip AV stream.

Alternatively, sound data may be placed in the graphics object header 201 of the graphics object 200. Alternatively, sound data corresponding to a PNG image contained in the graphics object 200 may be contained in a region immediately preceded by the PNG image data region 203 (not shown in FIG. 42A to FIG. 42C).

In any method, since sound data can be pre-read from the disc and pre-stored in the memory of the player, when the state of a button created with a PNG image is changed to the selection state or the execution state, an effect sound can be generated. Sound data is assigned a unique identifier sound_id, the sound data can be uniquely identified.

2-14. About Methods for Storing Sound Data to Disc

There are three methods for storing sound data to the disc. Next, these methods will be described.
(1) Multiplexing sound data with the graphics object 200.
(2) Creating files of sound data corresponding to identifiers sound_id, sound data being not multiplexed with a clip AV stream.
(3) Creating one data file for a plurality of pieces of sound data, sound data being not multiplexed with a clip AV stream.

2-14a. First Storing Method

Figure 59A:
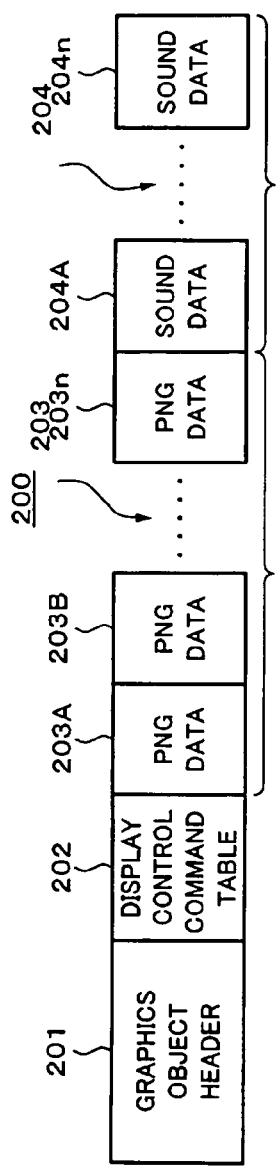
FIG. 59A, FIG. 59B, and FIG. 59C are schematic diagrams showing examples of methods for placing sound data in graphics objects.
Figure 59B:
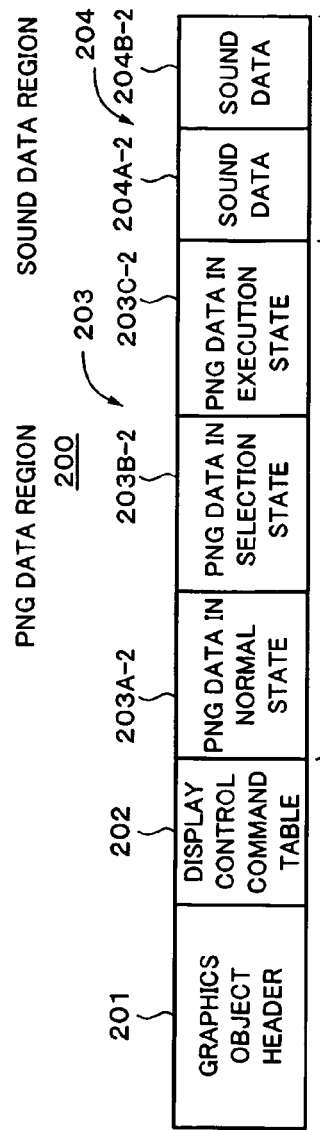

Next, with reference to FIG. 59A, FIG. 59B, and FIG. 59C, (1) the method for multiplexing sound data with the graphics object 200 (hereinafter referred to as first storing method) will be described in detail. FIG. 59A and FIG. 59B shows an example of which sound data is added to the graphics object 200 and then multiplexed with a clip AV stream.

FIG. 59A shows an example of which a sound data region 204 is disposed after a PNG data region 203 of a graphics object 200. The sound data region 204 can contain a plurality of sound data 204A, 204B, 204n. When the sound data 204A, 204B, . . . 204n correspond to PNG data 203A, 203B, . . . , 203n of the graphics object 200, respectively, PNG images and sound data can be easily correlated.

The sound data 204A, 204B, . . . 204n may be data that has not been compression-encoded for example AIFF (Audio Interchange File Format) file or WAVE file or data that has been compression-encoded for example MP3 (Moving Pictures Experts Group 1 Audio Layer 3) file, AAC (Advanced Audio Coding) file, or ATRAC (Adaptive Transform Acoustic Coding) file. When sound data that has been compression-encoded is contained, the player side should have an audio decoder in accordance with the compression-encoding system.

FIG. 59B shows an example of which sound data corresponding to a button state is contained in a graphics object 200 that composes a button. In the example, sound data 204A-2 that is reproduced when the button is placed in the selection state and sound data 204B-2 that is reproduced when the button is placed in the execution state are contained in the sound data region 203. On the other hand, the PNG data 203A-2, 203B-2, and 203C-2 for the button in the normal state, the selection state, and the execution state are contained in the PNG data region 203.

In this case, the PNG data region 203 for button images is followed by the sound data region 204. The sound data region 204 contains sound data 204A-2 that is reproduced when the button is placed in the selection state and sound data 204B-2 that is reproduced when the button is placed in the execution state. Thus, when PNG data of a button image is displayed, sound data corresponding to a button state is reproduced. It is considered that an effect sound reproduced by the player is mainly used as a button click sound. Thus, in such a structure, the major purpose of the present invention can be sufficiently accomplished.

FIG. 60 is a block diagram showing an example of a structure of a graphics object decoder model 240' of which a processing system for sound data is added to the graphics object decoder model 240 described in FIG. 44. For simplicity, in FIG. 60, similar portions to those in FIG. 44 are denoted by similar reference numerals and their description will be omitted.

A clip AV stream is input as an MPEG TS from a terminal 202 and supplied to a PID filter 110. The clip AV stream has a graphics object 200 that contains sound data. The PID filter 110 extracts moving picture data, sound data, and graphics object 200 from the clip AV stream. The extracted graphics object 200 is supplied to a GOBJ parser 224 through a buffer TBn 111B. The GOBJ parser 224 reads a graphics object header 201 from the graphics object 200. The GOBJ parser 224 extracts palette data from the graphics object 200 in accordance with the graphics object header 201 and separates the graphics object 200 into a display control command table 202, a PNG data region 203, and a sound data region 204 in accordance with the graphics object header 201.

The palette data and the display control command table 202 are supplied to a command processor/graphic renderer 225. In addition, sound data 204A, 204B, . . . , 204n of the sound data region 204 are supplied to the command processor/graphic renderer 225 and then stored in corresponding buffers (not shown).

The command processor/graphic renderer 225 reads sound data from the buffers in accordance with display control commands described in the display control command table 202 supplied from the GOBJ parser 224 and outputs the sound data. When the sound data 204A, 204B, . . . , and 204n contained in the graphics object 200 have been compression-encoded, the command processor/graphic renderer 225 decodes them and outputs the decoded sound data.

The sound data that is output from the command processor/graphic renderer 225 is supplied to an audio mixer 231 and output to a presentation processor 141. When another sound data has been input to the audio mixer 231, this sound data is mixed with those sound data at a predetermined ratio and then output.

FIG. 61 shows syntax that describes an example of a structure of the graphics object 200 in the case that it contains sound data as shown in FIG. 59A and FIG. 59B. In the structure shown in FIG. 47, a field number_of_PNG_images of a block GraphicsObjectHeader ( ) is followed by a field number_of_sound_data. The number of pieces of sound data stored in the block SoundDataRegion( ) is represented with eight bits of an integer that is 0 or larger. A field start_address_of_sound_data(i) has a data length of 32 bits, an integer that is 0 or larger, and describes the position at which the i-th sound data sound_data(i) starts with the relative number of bytes from the beginning of the block Graphics Object( ). The block PNGImageRegion( ) is followed by padding_word, followed by a block SoundDataRegion( ). Real sound data as sound data sound_data(i) is contained in the block SoundDataRegion( ).

2-14b. Second Storing Method

Figure 62:
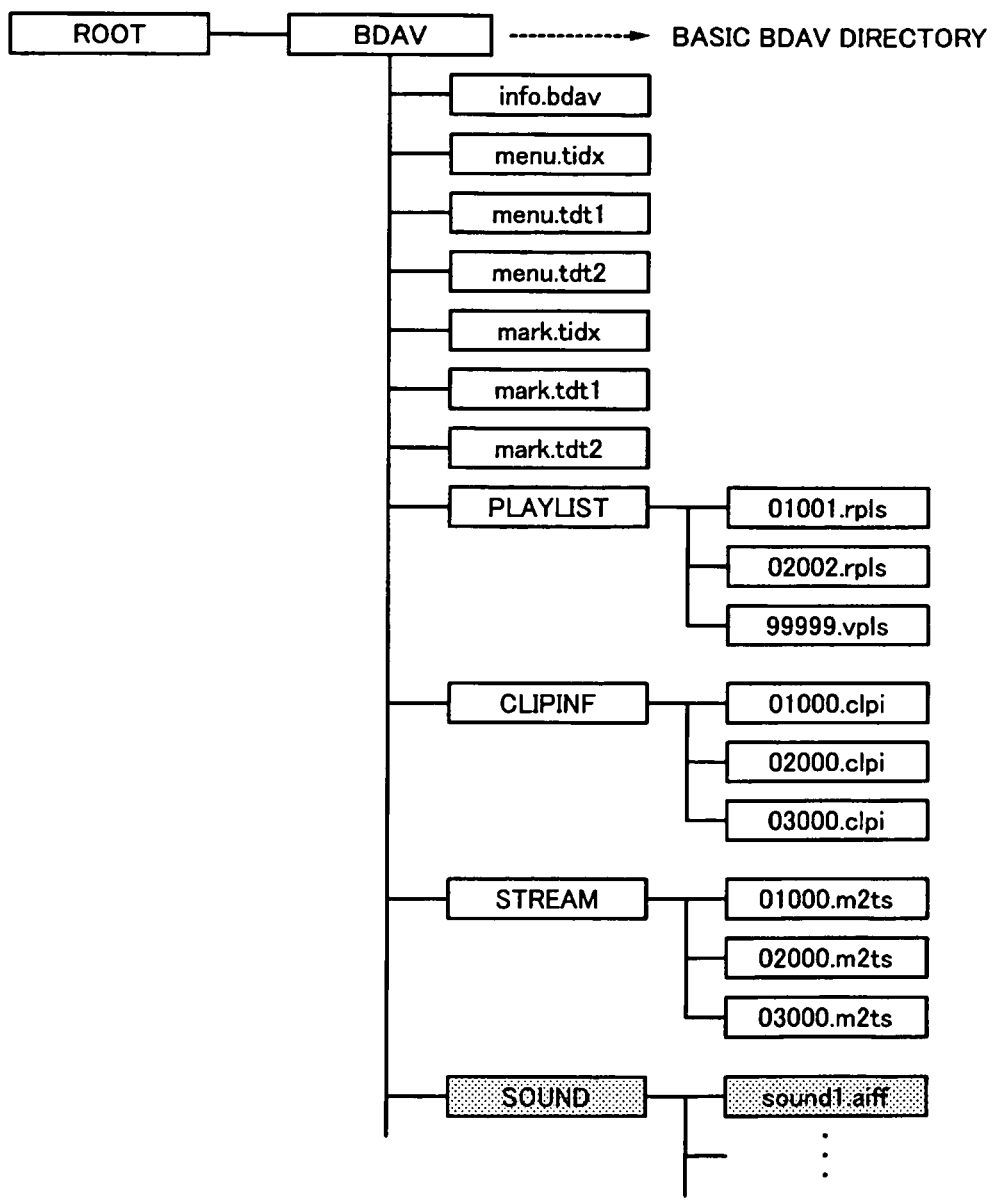
FIG. 62 is a schematic diagram showing an example of a data management structure in the case that sound data is not placed in a graphics object.

Next, (2) the method for creating sound data files corresponding identifiers sound_id, sound data being not multiplexed with a clip AV stream (hereinafter this method is referred to as second storing method). For example, as shown in FIG. 62, a directory SOUND that contains sound data is placed under a directory BDAV. The directory SOUND contains PCM waveform data as sound data. For example, a sound data file "sound1.aiff" having the AIFF format is placed in the directory SOUND. All sound data files placed in the directory SOUND are read when the disc is initially loaded into the player and then stored in an internal memory of the player.

Each piece of sound data is assigned a unique identifier sound_id. A script or the like calls desired sound data with an identifier sound_id from the memory.

Figure 59C:
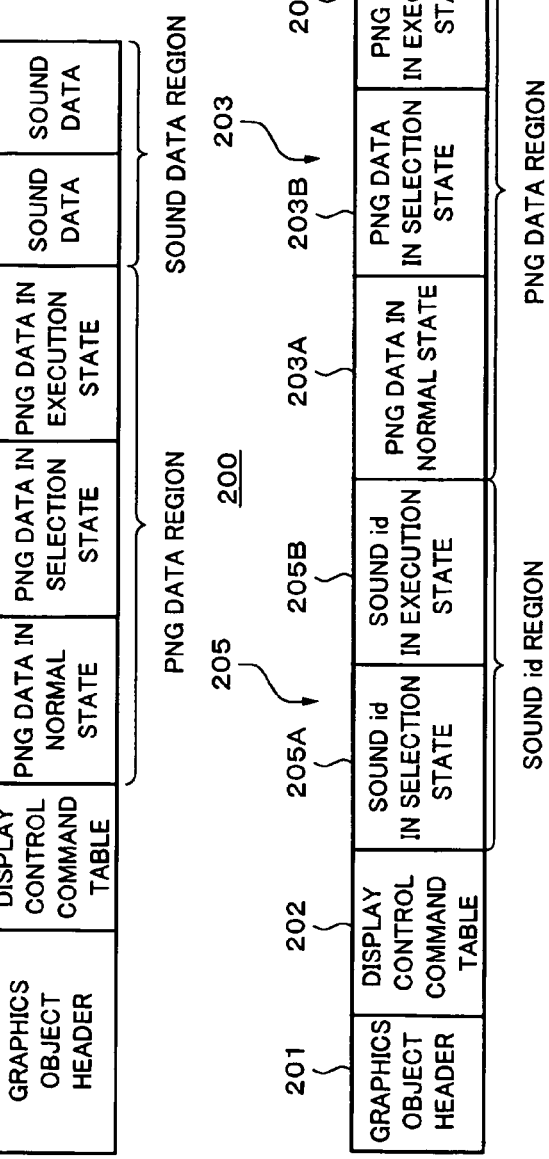

In this case, as shown in FIG. 59C, a sound id region 205 is disposed in a graphics object 200. Sound id data 205A and 205B are contained in the sound id region 205. In the example shown in FIG. 59C, PNG data 203A, 203B, and 203C corresponding to a normal state, a selection state, and an execution state of a button are contained in the PNG data region 203. The Sound id data 205A and 205B are identifiers sound_id corresponding to the PNG data 203B and 203C, respectively. When the PNG data 203B is displayed, sound data corresponding to the identifier sound_id represented by the sound id data 205A stored in the memory of the player is reproduced.

For example, as shown in FIG. 58, PNG data and sound data may be correlated in accordance with the display control command table 202.

Unlike a display control command shown in FIG. 49A and FIG. 49B, since sound data is identified with an identifier sound_id, an effect sound of sound data can be generated anytime not in synchronization with graphics that are displayed.

In this method, since sound data is read from the memory using an identifier sound_id, the number of types of effect sounds is restricted by the number of identifiers sound_id. In addition, the number of types of effect sounds that can be used is restricted by the capacity of the internal memory of the player.

Next, with referenced to FIG. 63, that method will be described in detail. When the disc 400 is loaded, a player initially accesses the disc. All sound data is read from a directory SOUND placed under a directory BDAV. The sound data (PCM data) that has been read is stored in an internal memory 410 of the player. At this point, a unique identifier sound_id is assigned to each piece of sound data. Alternatively, an identifier sound_id may be added to each piece of the sound data recorded on the disc 400.

In the example, 16 pieces of sound data are read from the disc 400. Identifiers sound_id=1 to 16 are assigned to those pieces of sound data. In addition, the data sizes of those pieces of the sound data are obtained. In the example shown in FIG. 63, it is assumed that in the example shown in FIG. 63 the pieces of the sound data assigned the identifiers sound_id=1 to 16 have data sizes of d1 bytes, d2 bytes, ..., and d16 bytes, respectively.

For example, on a menu screen 420 that displays buttons 420A, 420B, and 420C, when an operation is preformed for the button 420C, sound data corresponding to an identifier sound_id assigned to the button 420C is read from a memory 410. In the example shown in FIG. 63, sound data corresponding to an identifier sound_id=1 is assigned to the execution state of the button 420C. Sound data that is read from the memory 410 is processed in a predetermined manner and temporarily stored in a buffer 450B. Thereafter, the sound data is supplied to an audio mixer 231. The audio mixer 231 mixes the sound data with sound data associated with for example moving picture data as a content main part and outputs the mixed data as a sound.

A buffer 450A temporarily stores sound data associated with for example moving picture data as a content main part. When timing at which sound data stored in the buffers 450A and 450B is read therefrom is adjusted, an effect sound corresponding to the operation of the button 420C is output from the buffer 450B at proper timing of sound data stored in the buffer 450A. In this example, with identifier sound_id=0, no-sound data reproduction mode is designated.

In such a model, the total capacity of sound data that can be read from the disc 400 is restricted to the capacity of the memory 410. In addition, the capacity of each piece of sound data is restricted in accordance with the capacity of the buffer 450B. In other words, when the capacity of the memory 410 is denoted by capacity M (bytes) and the capacity of the buffer 450B is denoted by capacity Dmax (bytes), it is necessary to satisfy the following two conditions.

(1) The capacity d1 of each piece of sound data stored in the memory 410 should be smaller than the capacity Dmax of the buffer 450B.

(2) The total capacity (d1+d2+ ... +dn) of sound data stored in the memory 410 should be smaller than the capacity M of the memory 410.

In other words, when the conditions (1) and (2) are prescribed as rules on the player side and the disc producer side, reproduction compatibility of sound data such as effect sounds can be maintained.

As described above, in the case that sound data is not multiplexed with a clip AV stream (second storing method), when the disc is initially loaded into the player, all sound data is read therefrom. However, the preset invention is not limited to such an example. In other words, sound data can be read from the disc in a plurality of sessions. For example, all sound data used for one of sections of a scenario is read and stored in the memory. At this point, sound data stored in the memory for the preceding section of the scenario is erased. As a result, even if the data amount of sound data of one scenario exceeds the capacity of the memory, the sound data can be handled.

All sound data can be recorded in a predetermined region of the disc. Alternatively, sound data may be separately recorded in a plurality of regions of the disc. When sound data is separately recorded in a plurality of regions of the disc, sound data for sections of a scenario may be recorded at positions of the disc corresponding to the sections of the scenario. Alternatively, sound data may be downloaded from a server connected through a network.

In the method for multiplexing sound data with a clip AV stream (first storing method) shown in FIG. 59A and FIG. 59B, the number of types of sound data is not restricted. As a result, different type of sound data can be assigned to each image. When necessary, sound data is supplied with a clip AV stream. Thus, a different type of sound data can be used whenever a clip AV stream is supplied. Moreover, in the first storing method, since sound data is read from a clip AV stream along with image data, the reading model can be simply structured. In addition, the number of files of sound data and the sizes of files are not restricted except for the capacity of the disc.

However, in the first storing method, when the same sound data is used for different graphics objects, since their graphics objects each should have the same sound data, the sound data becomes redundant. In addition, since sound data should be extracted from a graphics object, after a clip AV stream is demultiplexed, sound data should be separated from the graphics object.

2-14c. Third Storing Method

Figure 64:
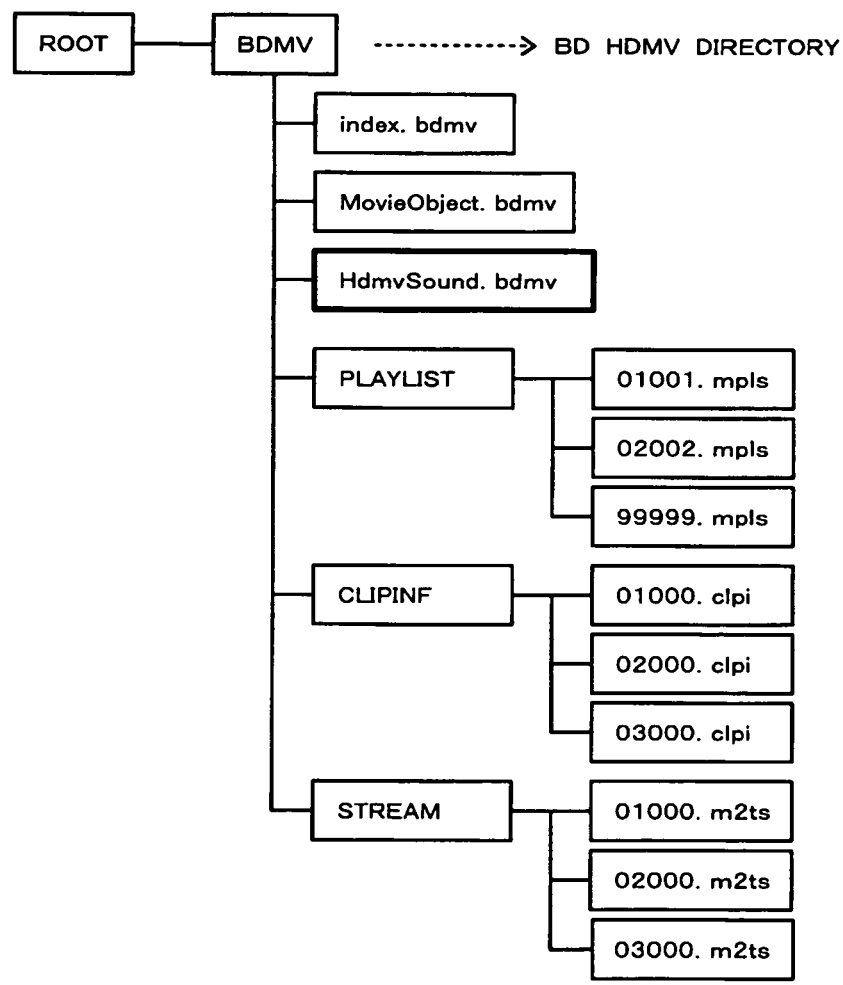
FIG. 64 is a schematic diagram describing a management structure of files recorded on a recording medium.

Next, (3) the method for creating one data file for a plurality of pieces of sound data, sound data being not multiplexed with a clip AV stream (hereinafter this method is referred to as third storing method) will be described. A plurality of pieces of sound data are contained in for example a file "HdmvSound.bdmv". As shown in FIG. 64, the file "HdmvSound.bdmv" is placed under a directory BDAV of a management structure of files recorded on the recording medium defined in the "Blu-ray Disc Rewritable Format Ver 1.0 part 3" shown in FIG. 9. When the disc is loaded into the player, the file "HdmvSound.bdmv" is initially accessed and read. Before a clip AV stream (for example, a movie) recorded as a main content on the disc is read, the file "HdmvSound.bdmv" is preloaded to the memory of the player.

In FIG. 64, placed in the directory STREAM are clip AV streams as main contents of the disc.

FIG. 65 shows syntax that describes an example of the file "HdmvSound.bdmv". A field length has a data length of 32 bits. The field length describes the length after the field length to the end of the file "HdmvSound.bdmv" in bytes. A field data_block_start_address has a data length of 32 bits. The data_block_start_address describes the start address of the start byte of a block data_block for sound data in the file "HdmvSound.bdmv". A field number_of_sound_entries has a data length of eight bits. The field number_of_sound_entries describes the number of pieces of sound data (namely, effect sound data) contained in the file "HdmvSound.bdmv".

An argument of a for loop automatically assigns an identifier sound_id with which one piece of sound data is referenced. The for loop describes information of sound data referenced with the identifier sound_id corresponding to the argument.

A block attributes( ) describes an attribute of the sound data. A field channel_assignment describes a channel assignment of the sound data. The field channel_assignment describes an attribute for example monaural or two-channel stereo. A field sampling_frequency describes a sampling frequency of the sound data, for example 48 kHz. A field bits_per_sample describes the number of quantizer bits of the sound data, for example 16 bits.

A field sound_data_start_address has a data length of 32 bits. The field sound_data_start_address describes the start address of the block data_block of the start byte of sound data referenced with the field sound_id in the for loop. A field sound_data_length has a data length of 32 bits. The field sound_data_length describes the byte length of the sound data. After the for loop, a block data_block is placed through padding words. The block data_block is a region in which sound data is really placed.

Figure 66:
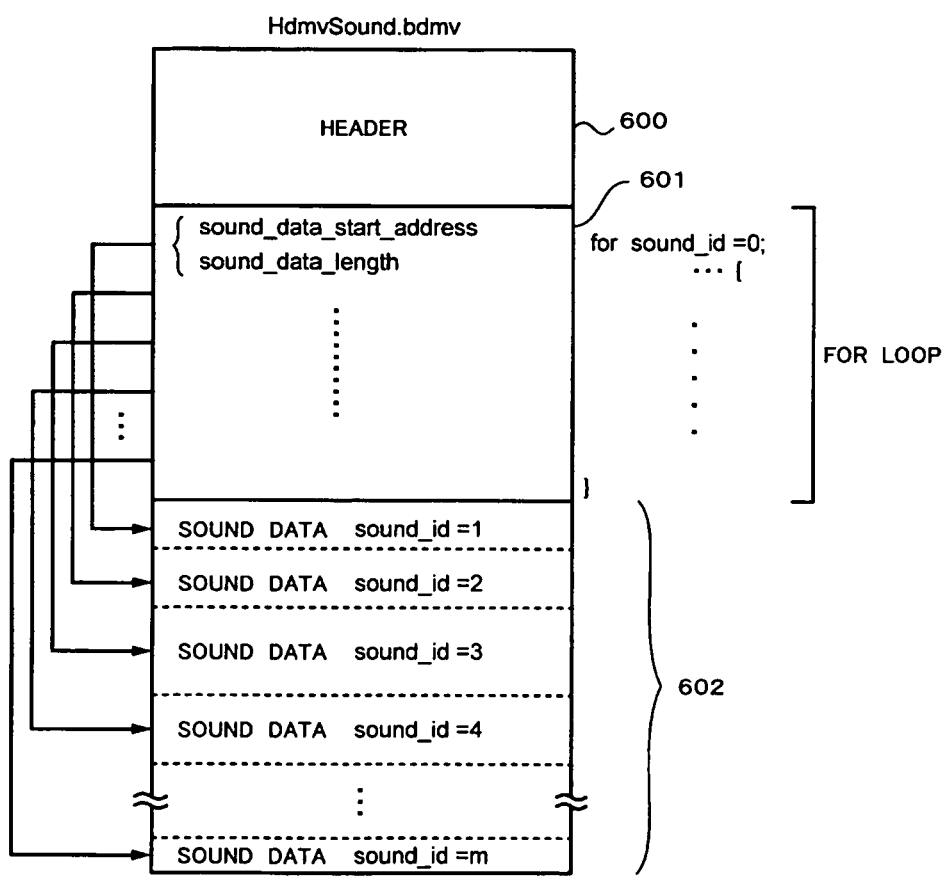
FIG. 66 is a schematic diagram showing a structure of the file "HdmvSound.bdmv"

FIG. 66 shows the structure of the file "HdmvSound.bdmv" in accordance with the foregoing syntax. A region from the beginning of the file to the field number_of_sound_entries is referred to as a header portion 600. The header portion 600 is followed by a for loop portion 601, followed by a sound data portion 602.

Placed in the sound data portion 602 is sound data referenced with identifier sound_id=1 to identifier sound_id=n. For example, the end of particular sound data and the beginning of the next sound data are connected at a byte boundary. Likewise, sound data referenced with identifier sound_id=1 to identifier sound_id=n is successively placed. In the sound data portion 602, the start address is designated with the field sound_data_start_address in the for loop portion 601 whose argument corresponds to the identifier sound_id. A region from the designated address for the length designated by the field sound_data_length of the loop is referenced as sound data of the identifier sound_id corresponding to the argument of the loop.

FIG. 67 shows an example of an application image of reproduction of an effect sound in accordance with the third storing method. For simplicity, in FIG. 67, similar portions to those in FIG. 63 are denoted by similar reference numerals and their description will be omitted. When a disc 400 is loaded into the player, the disc 400 is initially accessed and the file "HdmvSound.bdmv" placed under the directory BDAV is read (preloaded) from the disc 400. The file "HdmvSound.bdmv" that has been read is stored in an internal memory 410 of the player.

As shown in FIG. 66, each piece of sound data is designated in the loop portion 601 of the file "HdvmSound.bdmv" in accordance with address information and data length information. Each piece of the sound data is identified by the corresponding identifier sound_id. In the example shown in FIG. 67, the file "HdmvSound.bdmv" contains m pieces of sound data. The identifiers sound_id=1, 2, . . . , and m are assigned to the m pieces of sound data. The capacity of each piece of sound data can be obtained with the data length information and the number of quantizer bits bits_per_sample corresponding to the identifier sound_id.

In this example, it is assumed that sound data has been encoded in accordance with the PCM system. However, the present invention is not limited to such an example. Sound data may have been compression-encoded in accordance with a predetermined system such as the MPEG1 layer 3 (mp3) system, the Advanced Audio Coding (AAC) system, or the Adaptive Transform Acoustic Coding (ATRAC) system and stored in a sound data portion 602. In this case, each piece of sound data is placed in the sound data portion 602 in such a manner that the end of each piece of sound data is connected to the beginning of the next piece of sound data.

For example, it is assumed that a menu screen 420 displays buttons 420A, 420B, and 420C. On the menu screen 420, the button 420C is composed of a button image set 430 that has button images 420C-1, 420C-2, and 420C-3 that represent a normal state, a selection state, and an execution state. When button images are changed in accordance with the three button states, the user can easily distinguish these states from each other. In the example shown in FIG. 67, sound data of identifier sound_id=2 is assigned to the button image 420C-2 of the selection state. Sound data of identifier sound_id=1 is assigned to the button image 420C-3 of the execution state. When the value of the identifier sound_id is "0", although a button image is displayed, no sound is output.

When the user operates the button 420C to change the selection state to the execution state with the remote commander, the button image changes from the button image 420C-2 to the button image 420C-3. In addition, the sound data of identifier sound_id=1 assigned to the button image 420C-3 is read from the internal memory 410 and reproduced.

In other words, the button image 420C-3 is displayed. In addition, the memory 410 is accessed in accordance with address information and data length information for identifier sound_id=1 correlated with the button image 420C-3 and sound data of identifier sound_id=1 is read from the memory 410. The sound data that is read from the memory 410 is temporarily stored in a buffer 450B and then supplied to an audio mixer 231. The audio mixer 231 mixes the sound data that has been read from the memory 410 with sound data corresponding to moving picture data of the main part of the content that has been output from a buffer 450A and output the mixed sound.

Figure 63:
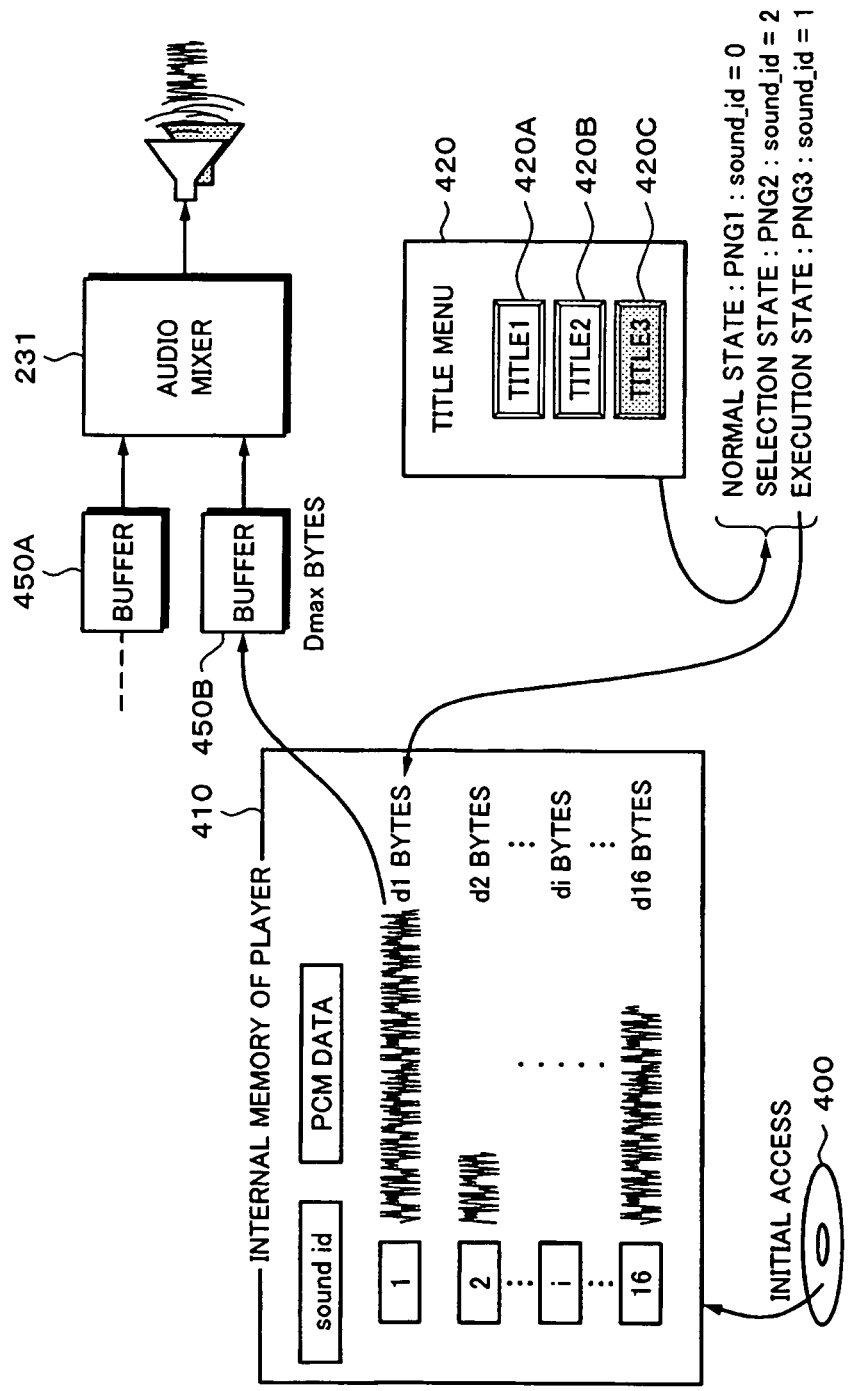
FIG. 63 is a schematic diagram more practically describing a reproduction of sound data in the case that the sound data is not placed in a graphics object.

Like the second storing method shown in FIG. 63, in the third storing method, the total capacity of sound data that can be read from the disc 400 and the capacity of each piece of sound data are restricted in accordance with the capacity of the memory 410 and the capacity of the buffer 450B.

Next, an example of the structure of a graphics object according to the third storing method will be described. In the third storing method, button images that compose a menu screen of the Graphical User Interface (GUI) using the graphics plane 12 are encoded as one stream. Hereinafter, a stream of which button images have been combined is referred to as an interactive graphics stream.

For example, on the menu screen 420 shown in FIG. 67, button images of the buttons 420A, 420B, and 420C are combined as an interactive graphics stream 700 (see FIG. 68) and encoded. When one button such as the button 420C is composed of a button image set 430 having a plurality of button image data 420C-1, 420C-2, and 420C-3, they are encoded as the interactive graphics stream 700 along with the button image data of the buttons 420A and 420B. The interactive graphics stream 700 is multiplexed with the transport stream and recorded on the disc.

Figures 68A, 68B:
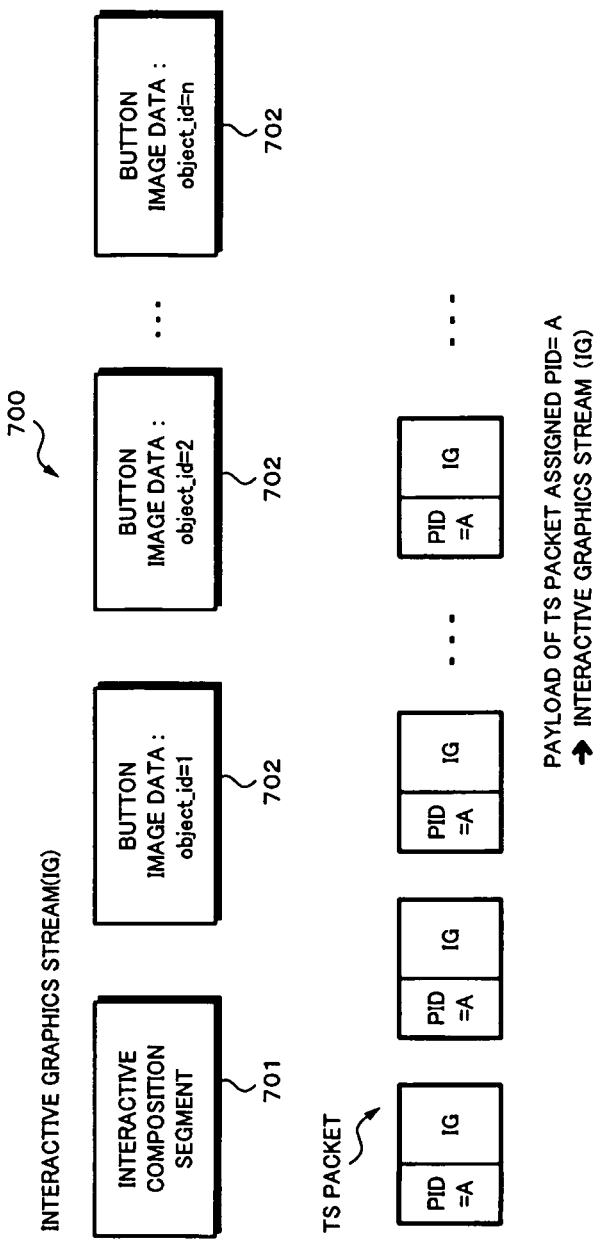
FIG. 68A and FIG. 68B are schematic diagrams showing an example of a structure of an interactive graphics stream.

FIG. 68A and FIG. 68B schematically show an example of a structure of an interactive graphics stream 700. As shown in FIG. 68A, the interactive graphics stream 700 has one interactive composition segment 701 and one or more pieces of button image data 702, 702, . . . and so forth. These pieces of the button image data 702, 702, . . . , and so forth are assigned different identifiers object_id. These pieces of the button image data 702 are referenced with the identifiers object_id. These pieces of the button image data 702, 702, . . . , and so forth are generated by encoding for example bit map image data in accordance with for example the run-length encoding method.

As shown in FIG. 68B, the interactive graphics stream 700 is placed in payloads of a plurality of transport packets assigned the same PID. The transport packets are multiplexed as a transport stream.

FIG. 69 shows an example of a structure of an interactive composition segment 701. The interactive composition segment 701 is composed of a segment description attribute, a display timing attribute, a button layout, and a command. The segment description attribute and the display timing attribute describe buttons' display attributes and attribute information of display timing defined in the interactive position segment 701.

Figure 70:
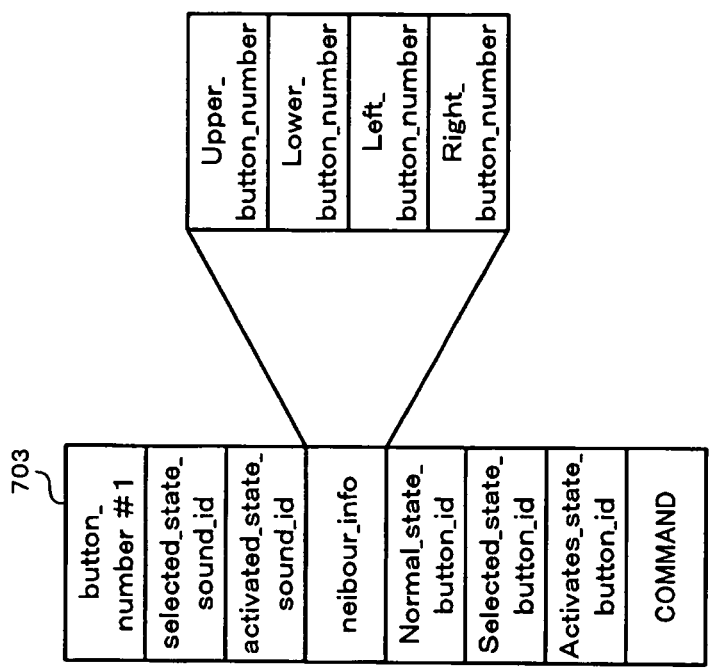
FIG. 70 is a schematic diagram describing a field neibour_info of the interactive composition segment.

The button layout and command describe one or more button information 703, 703, . . . , and so forth that compose a menu screen as a GUI. In the button information 703, a field button_number describes an identifier button_number that identifies each button. Each button is identified and referenced with the identifier button_number. A field selected_state_sound_id describes an identifier sound_id that referenes sound data correlated with a button image of "selection state". A field activated_state_sound_id describes an identifier sound_id that references sound data correlated with a button image of "execution state". As shown in FIG. 70, a field neibour_info describes button numbers Upper_button_number, Lower_button_number, Left_button_number, and Right_button_number adjacent to this button on the screen.

A field Normal_state_object_id describes an identifier object_id of a button image referenced when the button is in the "normal state (non selection state)". A field Selected_state_object_id describes an identifier object_id of a button image referenced when the button is in the "selection state". A field Activates_state_object_id describes an identifier object_id of a button image referenced when the button is in the "execution state". A field command describes operation information assigned to a button that is in the execution state.

2-15. Another Example of Plane

Figures 71, 72:
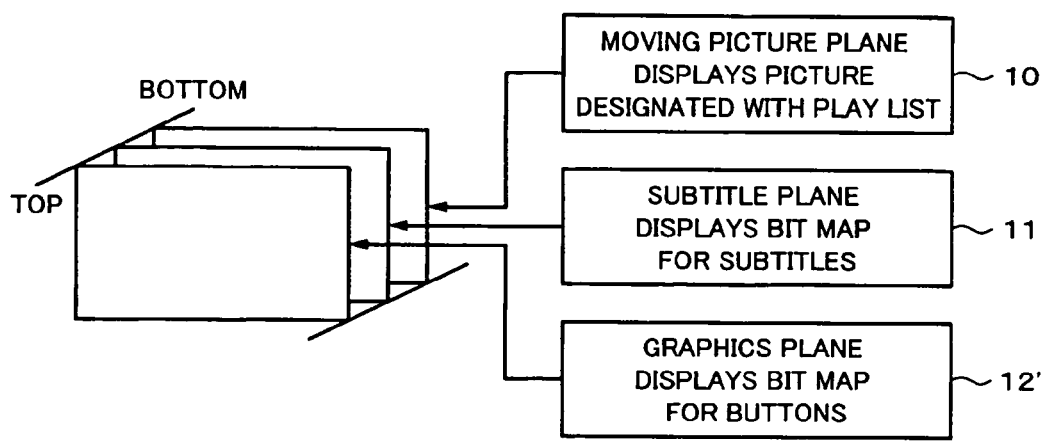
FIG. 71 is a schematic diagram showing another example of a plane structure used as a picture display system according to the embodiment of the present invention.
FIG. 72 is a schematic diagram showing another example of resolutions and displayable colors of the moving picture plane, the subtitle plane, and the graphics plane.

In the foregoing example, as shown in FIG. 20, FIG. 21, and FIG. 22, for the graphics plane 12, YCbCr (4:4:4) or RGB (4:4:4) can be selected as a color system. However, the present invention is not limited to such an example. In other words, as shown in FIG. 71, a graphics plane 12' may be defined mainly for bit map images for buttons. As shown in FIG. 72, like the subtitle plane 11, the graphics plane 12' may be composed of 1920 pixels×1080 lines, the sampling depth of each pixel being eight bits, the color system using a palette having 256 colors and eight-bit color map addresses.

Figure 73:
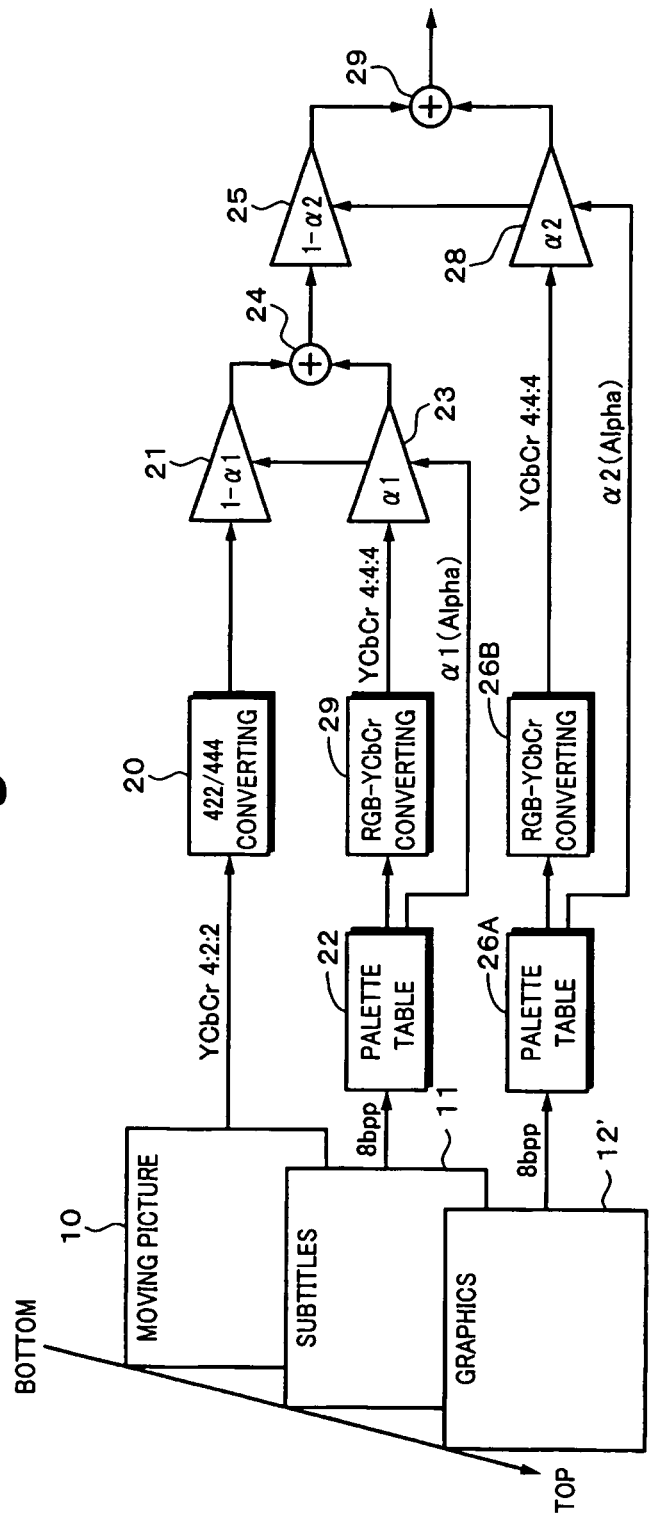
FIG. 73 is a block diagram showing a structure that combines the moving picture plane, the subtitle plane, and the graphics plane according to the other example.

In this case, the moving picture plane 10, the subtitle plane 11, and the graphics plane 12' are combined by a structure shown in FIG. 73. For simplicity, in FIG. 73, similar portions to those in FIG. 22 are denoted by similar reference numerals and their description will be omitted.

Image data of the graphics plane 12' is input to a palette table 26A and output as image data of RGB (4:4:4). When intransparency of the alpha-blending has been designated for the image data, designated intransparency $\alpha 2$ ($0 \leq \alpha 2 \leq 1$) is output from the palette table 26A. Input data and output data of the palette table 26A and palette data stored in the palette table 26A are the same as those shown in FIG. 23 and FIG. 24. Thus, their description will be omitted.

RGB data that is output from the palette table 26A is supplied to an RGB/YCbCr converting circuit 26B and converted into YCbCr data as unified data of moving picture data. The YCbCr data that is output from the RGB/YCbCr converting circuit 26B is input to a multiplying device 27.

When image data that is used in the graphics plane 12' is data in accordance with the PNG format, intransparency data $\alpha 2$ (where $0 \leq \alpha 2 \leq 1$) can be set to each pixel of the image data. The intransparency data $\alpha 2$ is supplied to a multiplying device 27. The multiplying device 27 multiplies a luminance signal Y and color difference signals Cb and Cr of the YCbCr data that are input from the RGB/YCbCr converting circuit 26B by the intransparency data $\alpha 2$. The multiplied result of the multiplying device 27 is input to one input terminal of an adding device 28. The complement of the intransparency data $\alpha 2$, namely $(1-\alpha 2)$, is supplied to a multiplying device 25.

2-16. About Another Example of Decoder Model

FIG. 74 is a block diagram showing an example of a structure of a player decoder 100' of which a sound data process for the graphics object 200 and a color system of the graphics plane 12' using eight-bit color map addresses with a 256-color palette are applied to the player decoder 100 shown in FIG. 39. For simplicity, in FIG. 74, similar portions to those in FIG. 39 are denoted by similar reference numerals and their description will be omitted.

Sound data that is not multiplexed with the clip AV stream is input as data of for example an input channel (1) to an input terminal 101. Thereafter, the sound data is supplied to a content buffer 105 through switch circuits 102 and 103. On the other hand, a clip AV stream of which sound data has been multiplexed with a graphics object 200 is input to an input terminal 202. A PID filter 110 separates the graphics object 200 from the clip AV stream and temporarily stores the graphics object 200 in a buffer TBn 11A. Thereafter, the graphics object 200 is supplied to a content buffer 105 through the switch circuit 103.

A graphics object 200 that does not contain sound data is multiplexed with an clip AV stream and supplied to the input terminal 202. The PID filter 110 separates a transport packet that composes the graphics object 200 from the clip AV stream. The transport packet is temporarily stored in a buffer TBn 111B or a buffer TBn 111C. The transport packet stored in the buffer TBn 111B is supplied to a buffer Bn 112B. The graphics object 200 is collected in accordance with the PID header. The graphics object 200 is supplied to a graphics decoder A 500 through a switch circuit 107. From the transport packet stored in the buffer Bn 112C, the graphics object 200 is collected through the buffer Bn 112C. The graphics object 200 is supplied to a graphics decoder B 501 through a switch circuit 108.

The graphics decoders A 500 and B 501 remove header information from the supplied transport packets, decode image data placed in the transport packets, and obtain image data for bit map data for subtitles or graphics.

On the other hand, image data placed in the graphics object 200 that contains sound data is read from the content buffer 105. The image data is supplied to the graphics decoders A 500 and B 501 through the switch circuits 107 and 108, respectively.

In the example shown in FIG. 74, the graphics decoder A 500 decodes PNG format image data. In contrast, the graphics decoder B 501 decodes JPEG format image data. The graphics decoders A 500 and B 501 may decode other format image data. Alternatively, the graphics decoders A 500 and B 501 may decode different format image data.

An output of the graphics decoder A 500 is supplied to an input terminal 130B of a switch circuit 130 and an input terminal 131B of a switch circuit 131 and then supplied to a sub picture plane 502 and a graphics plane 503 through the switch circuits 130 and 131, respectively.

A multimedia engine 106 has a sound player 106D along with the structure shown in FIG. 39. A buffer 109 has a sound buffer 109E along with the structure shown in FIG. 39. A sound player 106D decodes sound data that is read from the content buffer 105 through the sound buffer 109E, obtains the decoded sound data as for example linear PCM audio data, and outputs it. The sound data that is output from the sound player 106D is supplied to a presentation processor 141. The presentation processor 141 mixes the sound data that has been supplied from the sound player 106D with sound data that has been supplied from an audio decoder 118 and outputs the mixed sound data to an output terminal 142.

Sound data as an effect sound such as a click sound that is generated when for example a button image is clicked is reproduced by the sound player 106D. The sound data is stored in the sound buffer 109E and reproduced by the sound player 106D. The sound player 106D performs a reproducing process as for example software for the sound data.

The multimedia engine 106 reads an ECMA script stored in for example a code buffer 104, analyzes the ECMA script, reads another ECMA script and an HTML document from the code buffer 104, and reads image data and audio data from the content buffer 105. Sound data can be stored in the content buffer 105 like other data.

In addition, the multimedia engine 106 receives user's commands from the remote controller commander, the pointing device, and so forth and processes the commands. The multimedia engine 106 generates control signals corresponding to the process results for the user's commands and to each script. The control signals are supplied to the graphics decoders A 500 and B 501, the audio decoder 118, an MPEG video decoder 120, and a system decoder 121.

Image data that has been processed by a graphics renderer 106C is supplied to a sub picture plane 502 and a graphics plane 503 through the switch circuits 130 and 131, respectively. The sub picture plane 502 and the graphics plane 503 are composed of for example frame memories. The sub picture plane 502 and the graphics plane 503 correspond to the subtitle plane 11 and the graphics plane 12' shown in FIG. 71, respectively.

In this example, it is assumed that image data supplied from the graphics renderer 106C to the sub picture plane 502 and the graphics plane 503 is bit map data of which image data of for example the PNG format or JPEG format has been decoded by the graphics renderer 106C.

In addition, the multimedia engine 106 supplies to the presentation processor 139 a control signal that causes one of the sub picture plane 502, the graphics plane 503, and the moving picture plane 135 to be switched to another plane. The multimedia engine 106 supplies to the presentation processor 141 a control signal that controls an output of the audio stream.

Image data on the sub picture plane 502 is supplied to a palette 504 corresponding to the palette table 22 shown in FIG. 73. The 256-color palette is referenced with an index. As a result, RGB data and intransparency data α1 are output. The RGB data is supplied to an RGB/YCbCr converting circuit 506 corresponding to the RGB/YCbCr converting circuit 29 shown in FIG. 73. As a result, the color system of the image data is converted from RGB (4:4:4) into YCbCr (4:4:4). The YCbCr data that is output from the RGB/YCbCr converting circuit 506 is supplied to the presentation processor 139.

Image data on the graphics plane 503 is supplied to a palette 505 corresponding to the palette table 26A shown in FIG. 73. The 256-color palette is referenced with an index. As a result, RGB data and intransparency data α2 are output. The RGB data is supplied to an RGB/YCbCr converting circuit 507 corresponding to the RGB/YCbCr converting circuit 26B shown in FIG. 73. As a result, the color system of the image data is converted from RGB (4:4:4) into YCbCr (4:4:4). The YCbCr data that is output from the RGB/YCbCr converting circuit 507 is supplied to the presentation processor 139.

In addition, moving picture data on the moving picture plane 135 is supplied to the presentation processor 139 through an up/down converter 138.

As described above, the presentation processor 139 performs an alpha-blending process using the intransparency α1 of the image data on the subtitle plane 11 (sub picture plane 502) and the intransparency α2 of the image data on the graphics plane 12' (graphics plane 503). This process mixes image data on the moving picture plane 10, the image data on the subtitle plane 11, and the image data on the graphics plane 12'. The presentation processor 139 can perform an effect process for the image data in real time. The image data that has been mixed between planes and for which an effect process has been performed is supplied to an output terminal 140.

2-17. Further Example of Decoder Model

FIG. 75 shows an example of a structure of a player decoder 100'' according to the third storing method for sound data. For simplicity, in FIG. 75, similar portions to those in FIG. 39 and FIG. 74 are denoted by similar reference numerals and their description will be omitted. As described above, in the third storing method for sound data, a plurality of pieces of sound data with which effect sounds corresponding to button states are contained in one file "HdmvSound.bdmv" that is placed under the directory BDAV. The file "Hdmv- Sound.bdmv" is read and stored in the memory of the player when the disc is initially accessed.

As the internal memory of the player, a sound buffer 109E of a buffer 109 can be used. For example, sound data that is read when the disc is initially accessed is input from a terminal 101. The sound data is supplied to the sound buffer 109E through a switch circuit 102 and a content buffer 105. When a program code stored in a code buffer 104 is executed, necessary sound data is read from the sound buffer 109E and input from a terminal 710.

A real time stream that is input as an MPEG ES from a terminal 202 is supplied to a PID filter 110. When a PID of a transport packet represents that it contains an interactive graphics stream 700, the transport stream is temporarily stored in a buffer 111A. The transport stream is read at proper timing and input to a switch circuit 103 that has selected an input terminal 103B and stored in a content buffer 105 through the switch circuit 103.

An interactive composition segment 701 of the interactive graphics stream 700 is read from the content buffer 105 and supplied to a multimedia engine 106. In addition, button image data 702, 702, . . . are read from the content buffer 105 and supplied to a graphics decoder B 501 through a switch circuit 108.

Sound data that is input from the terminal 710 is temporarily stored in a buffer 711. A mixer 712 mixes the sound data supplied from the terminal 710 with sound data that has been supplied from an audio decoder 118 at a predetermined mixing ratio and supplies the mixed sound data to a presentation processor 141. The mixing ratio of the mixer 712 can be set on the player decoder 100" side under the control of a sound player 106D corresponding to user's data input.

In FIG. 75, for convenience, the buffer 711 is independent from the mixer 712. However, actually, the buffer 711 and the mixer 712 are built in the presentation processor 141. Thus, in consideration of the relation with the structure shown in FIG. 67, the buffer 711 corresponds to the buffer 450B, and the mixer 712 corresponds to the audio mixer 231. The buffer 450A shown in FIG. 67 is built in the presentation processor 141.

When sound data has been compression-encoded and recorded on the disc, sound data that is read from the disc is decoded as linear PCM audio data and stored in the buffer 711. For example, the sound player 106D decodes compression-encoded sound data that has been read from the disc and stores the decoded sound data to the sound buffer 109E. Sound data can be decoded by the audio decoder 118. Alternatively, the sound data may be decoded by software.

In the foregoing example, in the decoder model shown in FIG. 75, before a main content such as a movie recorded on the disc is reproduced, sound data as an effect sound is preloaded from the disc and stored in the internal memory of the player decoder. When the directory and file structures shown in FIG. 67 are used, only one file "HdmvSound.bdmv" for sound data as an effect sound can exist in the directory BDMV. When the player initially accesses the disc, the player preloads the sound data file for an effect sound to the internal memory of the player.

Figure 76:
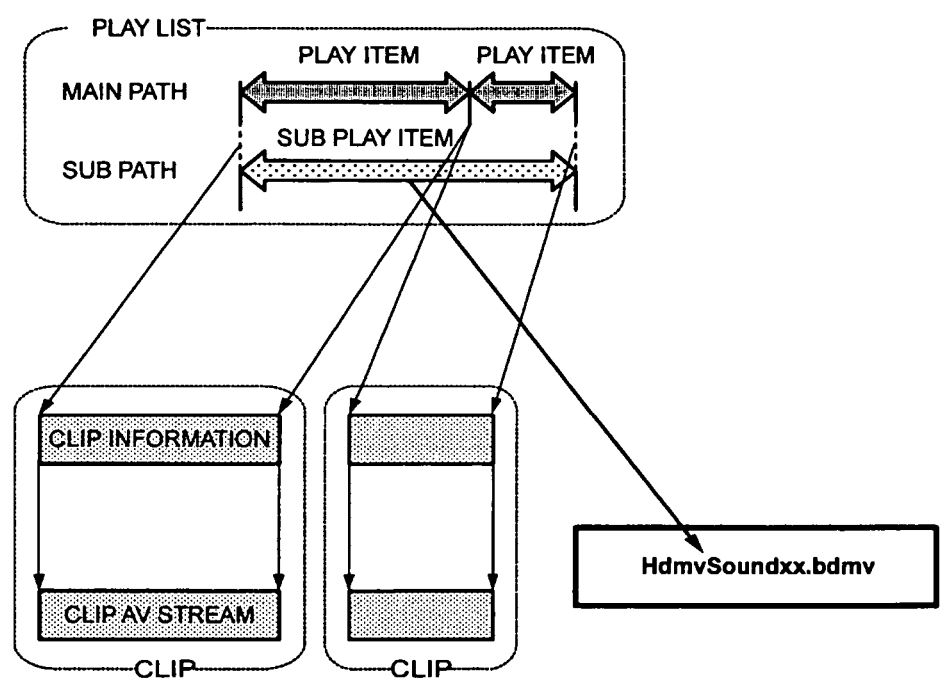
FIG. 76 is a schematic diagram describing that a sound data file is referenced with a sub play item.

Besides this example, as shown in FIG. 76, it can be thought that a play list is accompanied by data for reproducing an effect sound. In this case, with for example the sub play item shown in FIG. 15, sound data to be reproduced as an effect sound assigned to a button can be referenced. For example, a file name (file "HdmvSoundxx.bdmv") for sound data is described in a sub play item.

Alternatively, as a method for adding reference information for a file that contains sound data as an effect sound, the block UIAppInfoPlayList( ) shown in FIG. 14 may be used. In this case, a field for the file name "HdmvSoundx.bdmv" may be added to the syntax of the block UIAppInfoPlayList( ).

Before reproducing a play list, the player preloads sound data referenced with reference information (for example, a sub play item) to a file that contains sound data as an effect sound to the internal memory.

Figure 77:
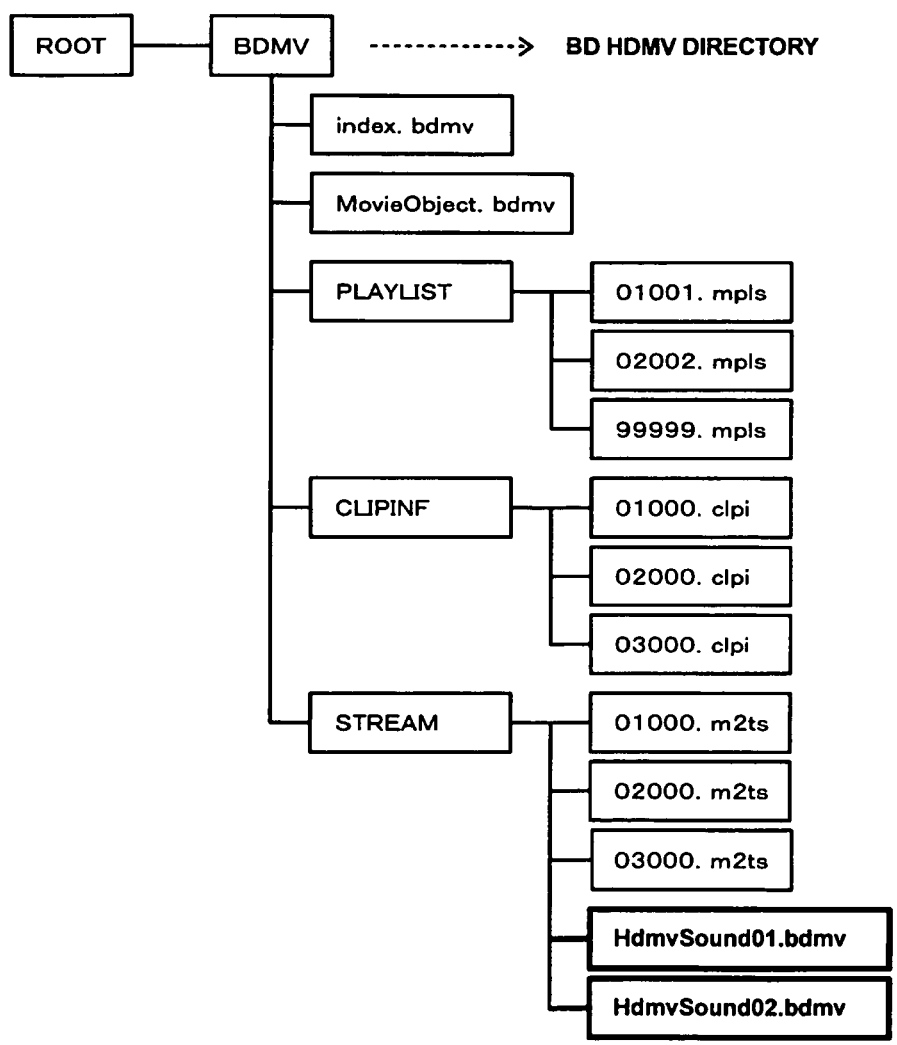
FIG. 77 is a schematic diagram describing a management structure for files recorded on a recording medium.

FIG. 77 shows an example of a management structure of files corresponding to the further decoder mode. In the example shown in FIG. 77, under the directory STEAM, files "HdmvSound01.bdmv", "HdmvSound02.bdmv", and so forth for sound data as effect sounds are placed. These files "HdmvSound01.bdmv", "HdmvSound02.bdmv", and so forth have the same structure as the file "HdmvSound.bdmv" shown in FIG. 65 and FIG. 66 except for sound data placed in the data portion 602. Thus, a plurality of files for sound data as effect sounds can be recorded on the disc. With reference information to a file for sound data as an effect sound (for example, a sub play item or the block UIAppInfoPlayList( ) as attribute information of a play list), a file for sound data is referenced. In this example, the type of sound data as an effect sound can be changed for each play list.

3. Second Mode of Present Invention

Next, a second mode of the present invention will be described. According to the first mode of the present invention, a reproduction program for controlling reproduction for data on the disc is described with an ECMA script and an HTML document. In contrast, according to the second mode, a reproduction program is described with an original data structure and a descriptive language rather than an ECMA script and an HTML document. A scenario descriptive language that is used in the second mode of the present invention defines a command group of original display control commands for subtitle images and button images on the basis of modified navigation commands for the DVD video. Thus, according to the second mode of the present invention, a menu screen for the blu-ray disc can be more suitably and flexibly displayed than that of the first mode.

3-1. About Scenarios

According to the second mode of the present invention, since the originally defined scenario descriptive language is used, it is not necessary to define event handlers unlike with the case that an ECMA script is used in the first mode. For example, since the originally defined scenario descriptive language can pre-define events necessary for executing a scenario, events for a scenario does not need to be defined in a program.

Figure 78:
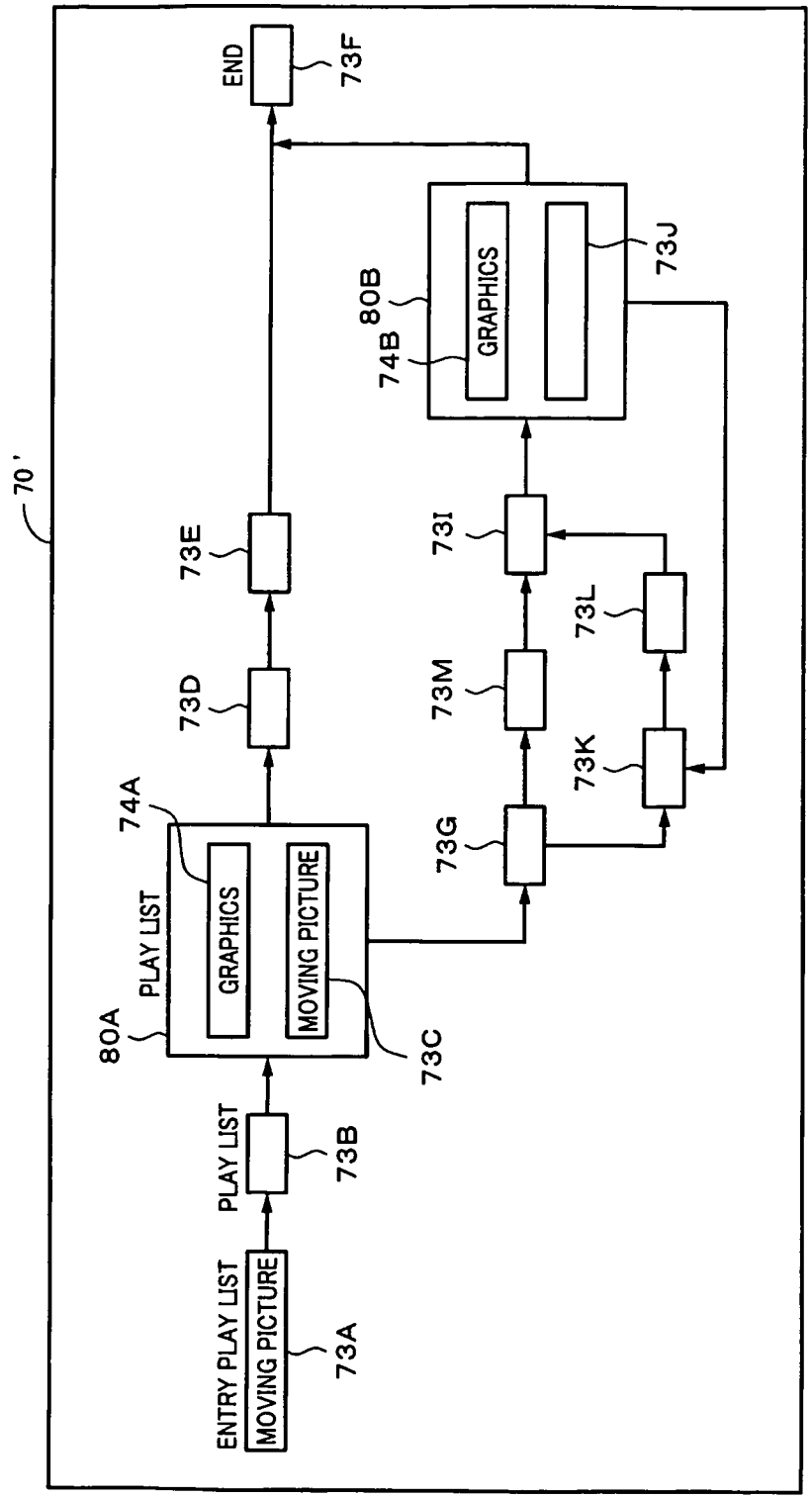
FIG. 78 is a schematic diagram showing an example of an internal structure of a scenario using a scenario descriptive language originally defined according to a second mode of the present invention.

Since the originally defined scenario descriptive language is used, the internal structure of the scenario shown in FIG. 26 does not need the global event handler definition 71 and the local event handler definition 72. FIG. 78 shows a scenario 70' described according to the second mode. A play list 73A described as an entry play list at the beginning of the scenario 70' is initially executed after the disc is loaded into the player. When a predetermined command is issued on the menu screen, a play list 73B is reproduced. After the play list 73B has been reproduced, a play list 73C is reproduced. In the example shown in FIG. 78, when the play list 73C is reproduced, graphics data 74A is read and a screen 80A for prompting the user to select a branch of the story is displayed.

Thereafter, as shown in FIG. 26 in the first mode, the scenario 70' is reproduced. When a mark has been set in a play list, a branch of a play list or a joint of play lists can be performed at the position of the mark.

Each play list has a sequence of commands (a program) for operations that are performed when a mark, user input, or a player's operation change is detected. The player executes the program to perform the operations.

Even if any one of play lists 73A to 73M of the scenario 70' is being reproduced, when the menu button on the remote control commander is pressed, a menu screen 60 for a list of scenarios is displayed (see FIG. 25). Next, a process for reproducing a play list for the menu screen 60 will be described. In this case, as an event handler corresponding to an event (menu button "on" event) that takes place when the menu button on the remote control commander is pressed, a command that causes a play list for the menu screen 60 to be displayed is described as one scenario.

3-2. Categories of Scenarios

Figure 79:
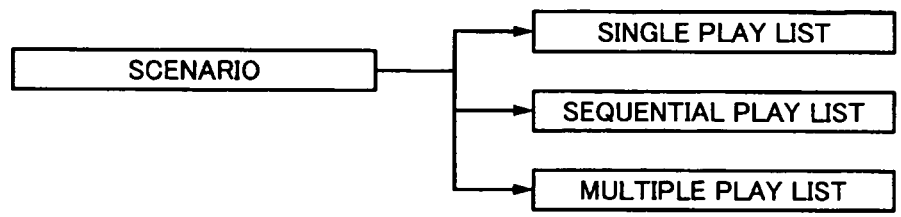
FIG. 79 is a schematic diagram describing categories of a structure of a scenario.

One scenario is defined in the BDVM directory. One scenario is composed of one or more play lists. Categories of scenarios will be described with reference to FIG. 79, FIG. 80A, FIG. 80B, and FIG. 80C. Based on connections of play lists, structures of scenarios can be largely categorized as three types that are (1) single play list, (2) sequential play list, and (3) multiple play list as shown in FIG. 79.

Figure 80A:
FIG. 80A, FIG. 80B, and FIG. 80C are schematic diagrams describing categories of structures of scenarios.

The single play list, categorized as (1), is a scenario composed of one play list as shown in FIG. 80A. For the single play list, a time line can be defined. There is no interrupt during reproduction of the scenario. When the content of the single play list is a movie, after the disc is loaded, only the main part of the movie is reproduced.

Figure 80B:
Figure 80C:
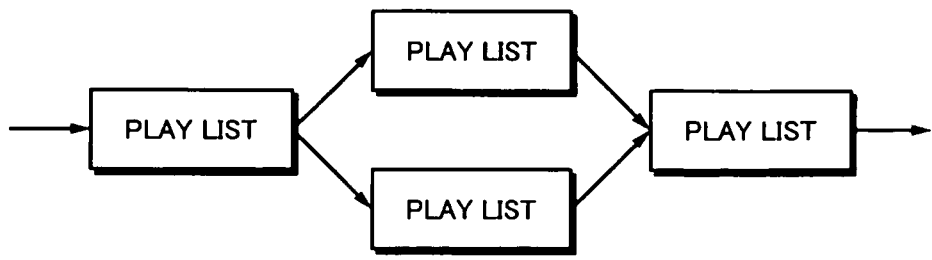

The sequential play list, categorized as (2), is a scenario composed of a plurality of play lists that are linearly arranged without a branch as shown in FIG. 80B. The play lists are arranged in such a manner that the end of one play list is connected to the beginning of the next play list. In the sequential play list, a time line can be defined for each play list. When the content of the sequential play list is a movie, the scenario is composed of a menu screen and a main part of a movie. After the disc is loaded, a play list that causes a menu screen to be displayed is executed. When the reproduction of the main part of the movie is designated on the menu screen, the next play list is executed and the main part of the movie is reproduced.

The multiple play list, categorized as (3), is a scenario that has a connection of a branch or a joint of play lists. In the multiple play list, a time line cannot be defined through all play lists. Instead, a time line is defined in each play list. With the multiple play list, an interactive function and a game function for varying reproduction contents in accordance with a user's input can be accomplished. When the content of the multiple play list is a movie, a multiple angle function that allows the user to select a desired angle from various angles photographed for the same scene can be accomplished.

As will be described later, one scenario is defined for the BDVM directory. However, it is necessary to allow the user to recognize the scenario in smaller units. Nevertheless, the unit of a play list does not always accord with a unit that the user can recognize. When one play list describes three movies, it is necessary to allow the user to see a search point of each movie. A search point (entry point) that is independent from the structure of a play list is hereinafter referred to as title and/or chapter.

Figure 81:
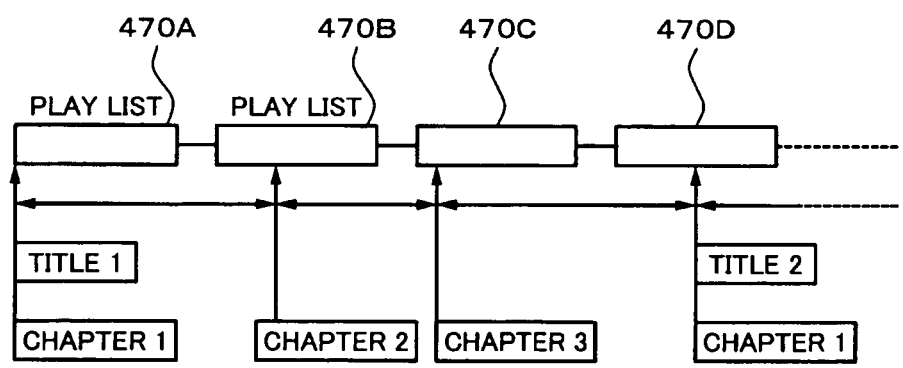
FIG. 81 is a schematic diagram describing titles and chapters.

Next, with reference to FIG. 81, titles and chapters will be described. A title represents any reproduction start point in a scenario. In the example shown in FIG. 81, a title 1 is placed at the beginning of a play list 470A. A title 2 is placed in the middle of a play list 470D. A region after the beginning of the play list 470A until the title 2 is the title 1. A chapter is a unit of which a title is sub-divided. The can also recognize a chapter as a reproduction start point. The title 1 is sub-divided into chapters. In the example shown in FIG. 81, the title 1 has chapters 1, 2, and 3. Thus, the title 1 is sub-divided into three portions. As shown in FIG. 81, each of a title and a chapter can be placed in the middle of a play list.

3-3. About Virtual Player Model

Figure 27:
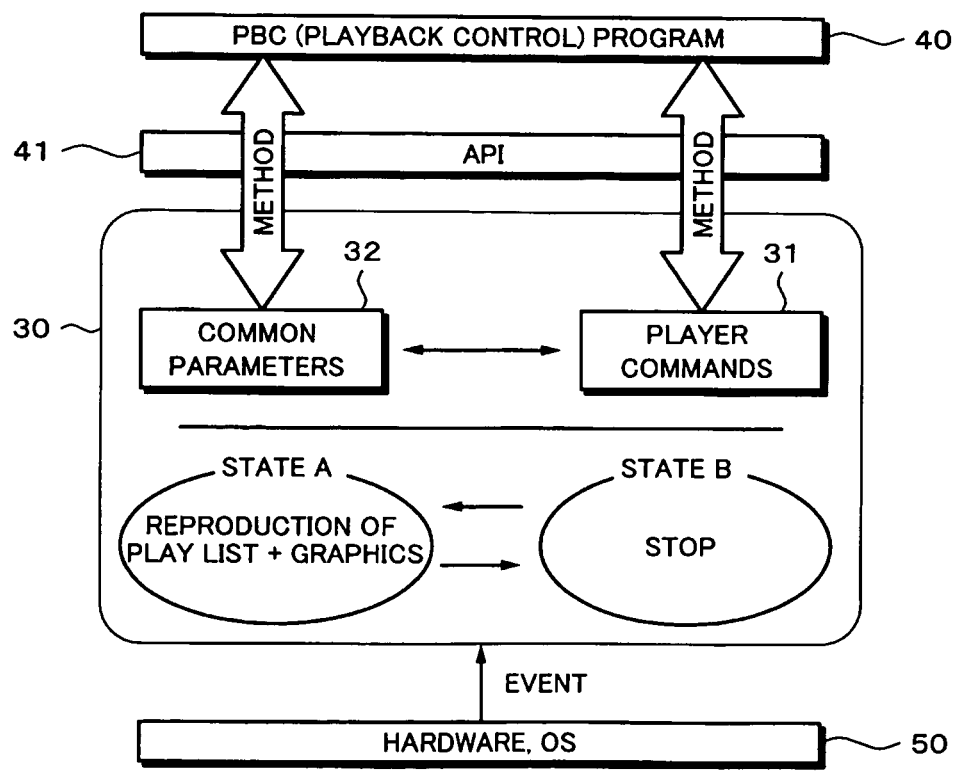
FIG. 27 is a schematic diagram describing a BD virtual player model.

A scenario described in the scenario descriptive language according to the second mode of the present invention can be reproduced by the BD virtual player model shown in FIG. 27 according to the first mode of the present invention. After the disc is loaded into a BD virtual player 30, it reads as a PBC program 40 a scenario described in the scenario descriptive language originally defined in the second mode of the present invention from the disc and operates in accordance with the description of the scenario. The BD virtual player 30 is controlled corresponding to an event that takes place while the BD virtual player 30 is operating.

A scenario has two regions for commands including a program having commands that cause the player to be operated. The two regions are referred to as global command region and local command region.

The global command region has global commands that are effective for the entire scenario. For example, the global program region describes a program that causes the player to initialize parameters when the disc is loaded into the player and to jump to a play list that composes a menu screen. The local command region describes programs for play lists. In the second mode of the present invention, local commands are categorized as four types of commands that are pre-commands, play item commands, post commands, and button commands.

Figures 82A, 82B:
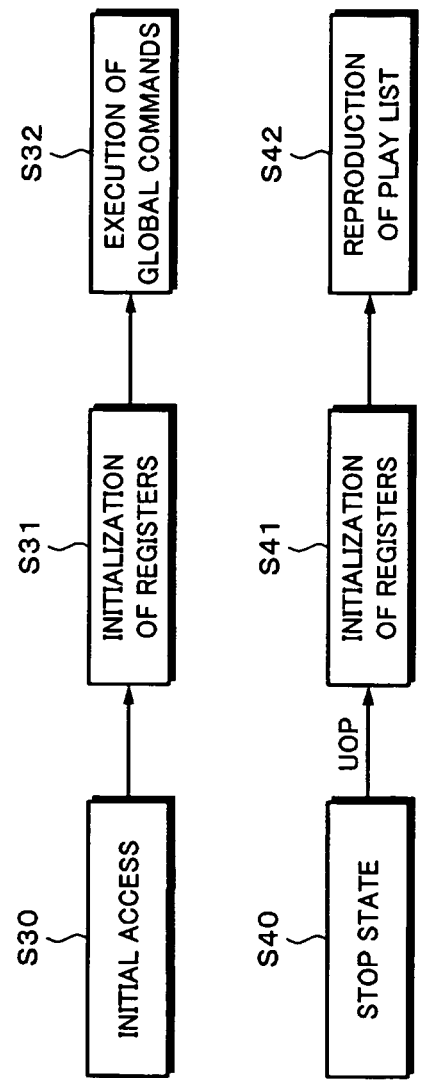
FIG. 82A and FIG. 82B are flow charts showing outlined operations of the BD virtual player corresponding to commands described in a scenario according to the second mode of the present invention.

FIG. 82A and FIG. 82B show operations of the BD virtual player 30 corresponding to commands described as scenarios according to the second mode of the present invention. FIG. 82A shows an example of a disc loading operation of the BD virtual player 30. As described above, one scenario is created for the BDMV directory. When the disc is loaded into the player and then an initial access is performed for the disc (at step S30), registers, namely, the common parameters 32 are initialized (at step S31). At the next step S32, a program is read from the disc and executed. The initial access represents an operation of which reproduction for a disc is performed first time for example when a disc is loaded into the player.

A command group (a program) that is initially read and executed when the disc is loaded into the player is referred to as global commands. The global commands describe for example an advertisement picture (trailer) and a jump command that jumps to a play list that composes a menu screen. The player reproduces the play list in accordance with the commands.

FIG. 82B shows an example of an operation of the player 30 when the user presses for example the play key while the player is in the stop state. This operation corresponds to the state change from the state B to the state A shown in FIG. 28. In the stop state (at step S40), the user causes the BD virtual player 30 to operate in the reproduction mode with for example the remote controller (UOP: User Operation). At a result, the registers (namely, the common parameters 32) are initialized (at step S41). At the next step S42, the BD virtual player 30 enters a play list reproduction phase.

Figure 83A:
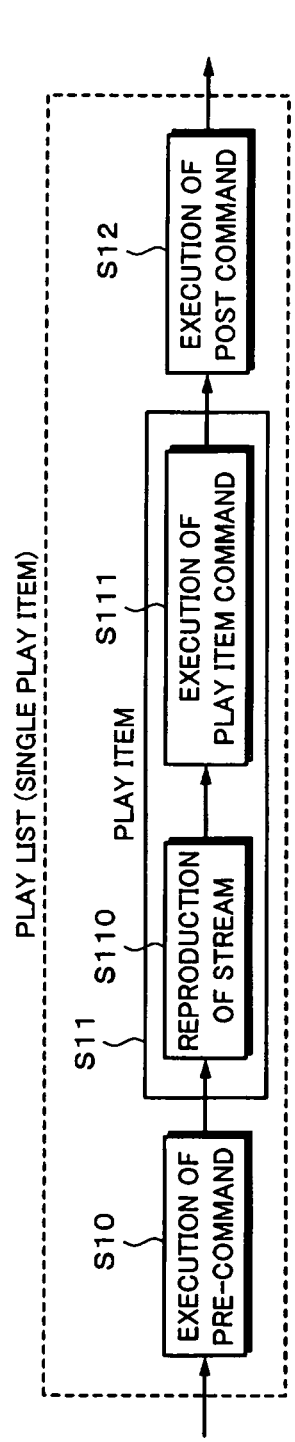
FIG. 83A and FIG. 83B are flow charts describing reproducing operations in accordance with play lists.

Next, with reference to FIG. 83A and FIG. 83B, reproduction of a play list in the play list reproduction phase will be described. FIG. 83A shows an example of which a play list is composed of a single play item. A play list has a pre-command region, a play item command region, and a post-command region that describes respective programs. In the play list reproduction phase, a pre-command of the pre-command region is executed (at step S10). After the pre-command has been executed, the player enters a play item reproduction phase for play items that compose the play list (at step S11). In the play item reproduction phase, a stream whose start point and end point are designated by a play item is reproduced (at step S110). When the stream has been reproduced up to the end point, the play item command is executed (at step S111). After the play item command has been executed, a post command of the post-command region is executed (at step S12). As a result, the play list has been reproduced.

The post command is normally a jump command that describes as a jump command a play list to be reproduced next or a play list that composes a menu screen. When there is no a jump command, the player enters the stop state (the state B shown in FIG. 28).

Figure 83B:
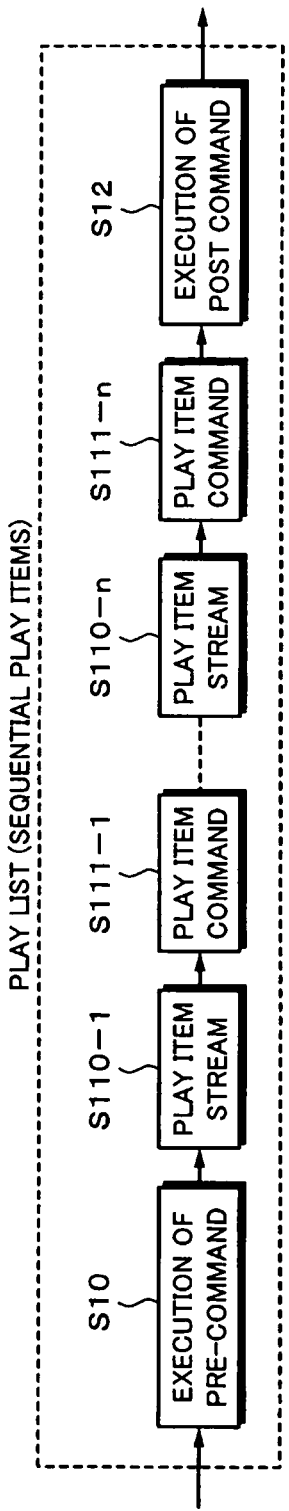

FIG. 83B shows an example of which a play list describes a plurality of play items. In this case, the play list has a pre-command region, a play item command region, and a post-command region that describe respective commands. When the play list describes a plurality of play items, the play item command region describes play item streams and play item commands of play items arranged in a time sequence.

When the play list describes a plurality of play items, in the play list reproduction phase, a pre-command is executed (at step S10). In the next play item reproduction phase, a stream is reproduced from the start point to the end point of each play item and a play item command is executed for each play item. In the example shown in FIG. 83B, a first play item stream is reproduced (at step S110-1). Thereafter, the corresponding play item command is executed (at step S111-1). Thereafter, a second play item stream (not shown) is reproduced (at step S110-2). The corresponding play item command is executed (at step S111-2). These operations are repeated for the number of the play items. After the last play item stream has been reproduced (at step S110-n) and the corresponding play item command has been executed (at step S111-n), the play item reproduction phase is completed. After the play item reproduction phase has been completed, a post command is executed (at step S12). As a result, the play list reproduction phase is completed.

Figure 84A:
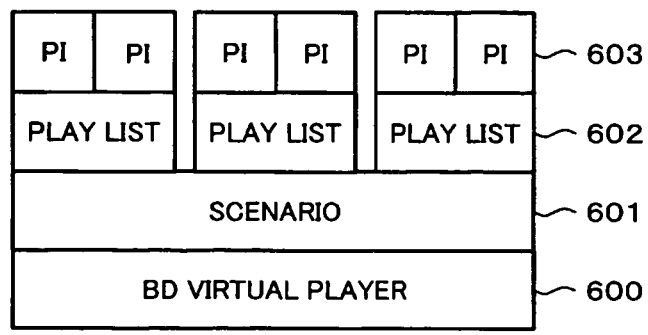
FIG. 84A and FIG. 84B are schematic diagrams showing examples of hierarchical structures of scenarios.

According to the second mode of the present invention, scenarios, play lists, and play items that are executed on the BD virtual player 30 can be hierarchically considered. In other words, as shown in FIG. 84A, one scenario layer 601 is placed above a BD virtual player layer 600. A play list layer 602 that has one or a plurality of play lists is placed above the scenario layer 601. A play item (PI) layer 603 is placed above the play list layer 602. Each play list may have one or a plurality of play items.

Figure 84B:
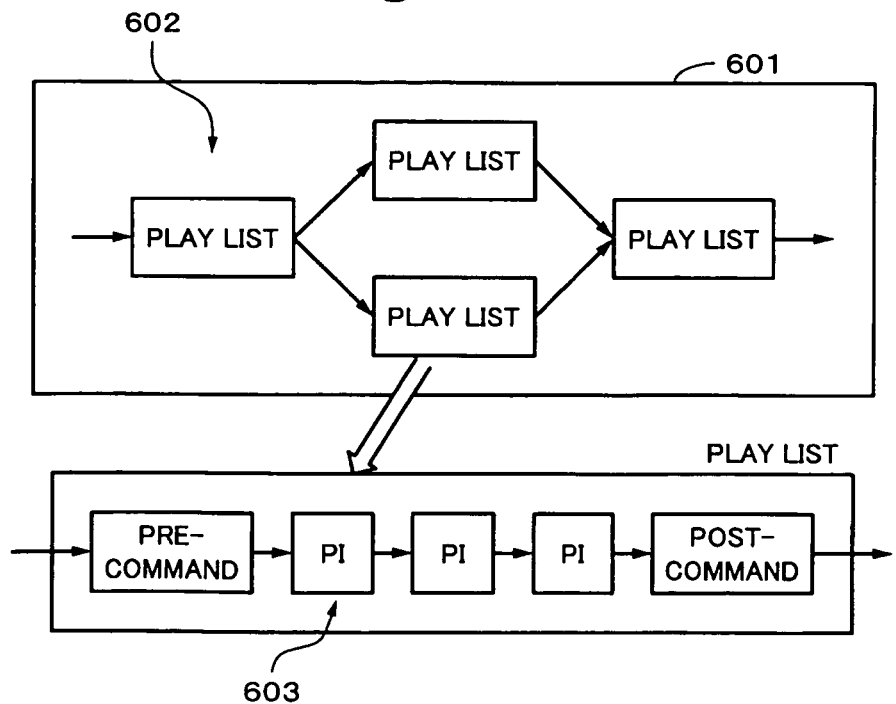
Figure 85:
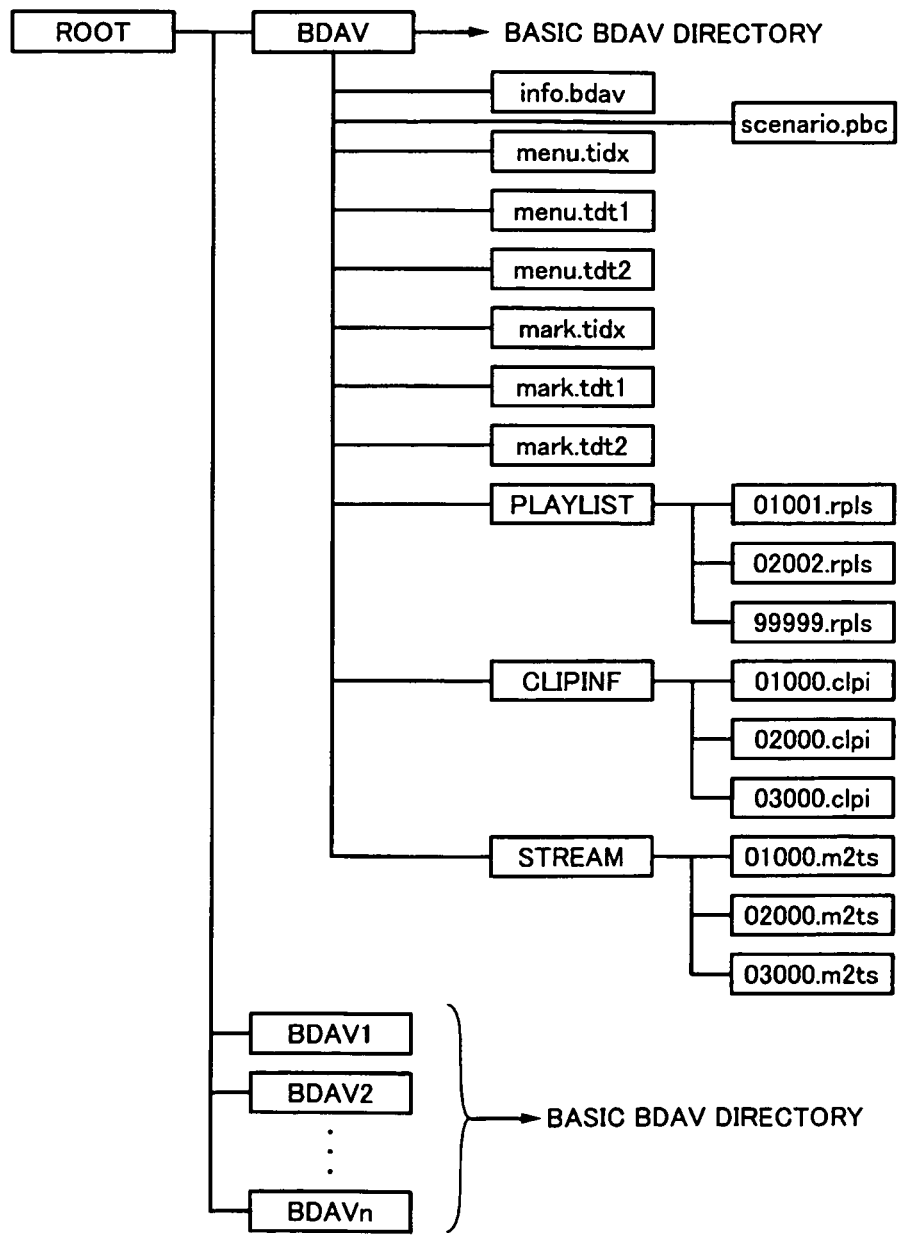
FIG. 85 is a schematic diagram describing a management structure of files recorded on a recording medium.

In such a hierarchical structure, play lists and play items are executed by the BD virtual player through the scenario layer 601. Thus, when control commands for play lists are described in a scenario, branches and so forth of the play lists can be easily accomplished. This applies to play items as shown in FIG. 84B.

3-4. About Syntax

Next, a method for storing commands and databases that describe a scenario to the disc according to the second mode of the present invention will be described. In the second mode of the present invention, it is assumed that data necessary for accomplishing an extended function of the BDAV format is described in a scenario file "scenario.pbc". The scenario file "scenario.pbc" is placed under the directory BDAV in the management structure for files recorded on the recording medium defined in the "Blu-ray Disc Rewritable Format Ver 1.0 part 3" shown in FIG. 9.

FIG. 86 shows syntax that describes an example of a structure of the scenario file (scenario.pbc). The file "scenario.pbc" contains a file identification symbol, a version number, and a block start address in succession. The file "scenario.pbc" also contains blocks corresponding to functions. A field type_indicator has a data length of 32 bits and describes a predetermined character string that represents that the file contains a scenario. A field version_number has a data length of 32 bits and describes a version number. A field TitleEntry_start_address has a data length of 32 bits of an unsigned integer and describes a value that represents the position at the beginning of a block TitleEntry( ) with the relative number of bytes from the beginning of the file "scenario.pbc". Likewise, a field Scenario_start_address has a data length of 23 bits of an unsigned integer and describes the position at the beginning of a block Scenario( ) with a value that represents the relative number of bytes from the beginning of the file "scenario.pbc".

A block GlobalCommand( ) starts from a fixed position, the 41-st byte from the beginning of the file. The block GlobalCommand( ) describes a program that is executed when the player initially accesses the disc (namely, when the player initially reproduces data from the disc after it is loaded into the player). The global command is placed in the block GlobalCommand( ). The block GlobalCommand( ) is followed by any number of padding_word so that blocks are spaced apart from each other.

The block TitleEntry( ) describes a list of search points in a scenario. One scenario is created for the BDAV directory. A scenario defines the reproduction order of a plurality of play lists placed under the BDAV directory. The user can see a scenario as if it were composed of a plurality of "titles" rather than one image/sound unit.

When one disc contains three movies, although the disc has only one scenario that defines the reproduction order of the movies, the user will see the disc as if it contained three titles. Alternatively, the user will see that disc as if it were divided into four titles including a title menu screen with which the user can select one of the three titles. Since the user considers a menu screen as one image/sound unit, according to the second mode of the present invention, the menu screen is considered as a kind of a title.

Thus, since the unit of a scenario that defines connections of play lists is different from the unit that the user considers as a block of image/sound, search points need to defined in a scenario. A search point in a scenario is referred to as a title entry.

The block Scenario( ) describes a "scenario". The block Scenario( ) describes information about the reproduction order of play lists, a local command area of each play list, and so forth.

FIG. 87 shows syntax that describes an example of a structure of the block GlbalCommand( ). A field length has a data length of 32 bits, an unsigned integer, and describes the length from the end of the field length to the end of the block GlobalCommand( ) in bytes. A field number_of_commands describes the number of fields command that follow. The field command has a data length of 32 bits and describes a set of parameters for the player, a reproduction start command for a designated play list, a calculating command, and so forth.

FIG. 88 shows syntax that describes an example of a data structure of the block TitleEntry( ). A field length has a data length of 32 bits, an unsigned integer, and describes the length from the end of the field length to the end of the block TitleEntry( ) in bytes. A field number_of_Titles describes the number of search points of titles described in a for loop that follows this field. A field Entry_PlayList_file_name describes a file name of a play list that contains a search point of a title. A field Title_name_character_set describes a character set that represents the next field Title_name. A field Title_name describes a character string of a name assigned to a search point.

A field number_of_Chapters describes the number of chapters described in a for loop that follows. As described above, chapters are divided portions of a title. The user can see chapters like titles. Chapters are used as search points of a scenario. A field Title_number has a data length of 16 bits, an unsigned integer, and describes a title number to which a chapter corresponding to the current loop counter value of the for loop (hereinafter, the chapter is referred to as this chapter). A field chapter_entry_Playlist_file_name describes a file name of a play list file of a play list that this chapter represents. A field chapter_ref_to_PlayItem_id describes a play item number that this chapter represents. A field chapter_time_stamp describes the time of a play item that this chapter represents.

A block Title_Menu_Call_PL( ) describes play lists that compose a menu displayed when the user causes the player to display titles of the disc. The user designates a title by pressing for example a title menu key on a remote commander that remotely operates the player. Each scenario has one title menu. The title menu is a menu with which the user can see search points of titles. When the user selects his or her desired title on the title menu with for example the remote commander, the player obtains a play list from a title entry list corresponding to information described in the for loop after the field number_of_Titles and starts reproducing the play list.

In the block Title_Menu_Call_PL( ), a field flags describes attribute information about a title menu. A field TitleMenu_entry_PlayList_name describes a play list that composes a title menu or a play list that is an entry point of a play list group. A field TitleMenu_ref_to_PlayItem_id describes a play item number of a play item with which a play list starts. When a play list is reproduced from the beginning, the value of the field TitleMenu_ref_to_PlayItem_id is [0].

A field TitleMenu_chapter_time_stamp describes the time of a play item. When a play item is reproduced from the beginning, the field TitleMenu_chapter_time_stamp describes the time of the beginning of the play item. A field UOP_mask_table( ) describes information about a user's operation that is restricted. When the user performs an operation described in the field UOP_mask_table( ), the player does not respond to the user's operation. When the user is prohibited from performing a fast forward operation, a user's operation that is prohibited is described in the field UOP_mask_table( ).

FIG. 89 shows syntax that describes an example of a structure of a block scenario( ). The block scenario( ) describes information about a scenario, namely links of play lists. A field length describes the length from the end of this field to the end of the block scenario( ) in bytes. A field number_of_PlayList describes the number of play lists that compose a scenario. The field number_of_PlayLists is followed by a for loop. In the for loop, information about a play list corresponding to a loop counter of the for loop (the play list is referred to as this play list) is described.

The for loop is followed by data of this play list. A field flags describes attribute information of a play list. Since data described in the field flags do not directly relate to the second mode of the present invention, the description will be omitted. A field PL_UOP_mask_table( ) describes information about a user's operation that is restricted for each play list. While this play list is being reproduced, only a user's operation permitted in both a command UOP_mask_table( ) (that will be described later) and the field PL_UOP_mask_table( ) can be performed. However, eventually, it is determined whether or not a user's operation can be performed in accordance with data described in a block PI_UOP_mask_table( ), that will be described later, along with the foregoing command and field.

A field Parental_level describes information necessary for restricting audience who watch this play list. The information describes ages and age groups of audience who can watch this play list.

A field number_of_Pre_Commands describes the number of commands (pre-commands) that compose a program executed before this play list is reproduced. The programs are described in a field PL_Command(i). A field number_of_Post_Commands describes the number of commands that compose a program executed after this play list is reproduced (post-commands). A program is described in a field Pl_Command(i). A field Pre_Commands_start_id describes the start number of a program that is executed in the command table before the play list is reproduced. The number corresponds to a parameter i of the field PL_Command(i). A field Post_Commands_start_id describes the start number of a program that is executed in the command table after the play list is reproduced. The number corresponds to the parameter i of the field PL_Command(i).

A field number_of_PlayItems describes the number of play items that compose this play list. A field PI_UOP_mask_table( ) describes information about a user's operation that is restricted for each play item. Only a user's operation permitted in the three types of tables, which are the command UOP_mask_table( ) (that will be described later), the command PL_UOP_mask_table( ), and the field PI-UOP-mask-table can be performed while the play item is being reproduced.

A field PI_Commands_Start_id describes the start number of a command that is executed in the command table after the play item is reproduced. The number represents the parameter i of the field PL_Command(i). A field number_of_PL_Commands describes the number of commands in the command table represented by a for loop that follows. A command contained in the field PL_Command(i) is successively assigned the number i. A field PL_Command(i) describes one command. The number i is referenced from the field Pre_Commands_start_id, the field Post_Commands_start_id, the field PI_Commands_start_id, and so forth.

3-5. About Commands

FIG. 90 shows examples of commands used in a scenario according to the second mode of the present invention. These commands are methods that the BD virtual player 30 has. However, it should be noted that commands shown in FIG. 90 are part of those used in a scenario according to the second mode of the present invention. In reality, more commands are defined so that a variety of functions of the user interface according to the first mode can be accomplished. For example, commands for reproducing sound data and commands for displaying buttons are further defined.

Next, methods for designating the reproduction start position will be described. A method LinkPlayList(playListNumber) starts the reproduction of a play list designated by "playListNumber". A method LinkPlayItem (playListNumber, playItemNumber) starts the reproduction of a designated play item in a designated play list. "playItemNumber" is "PlayItem_id" whose value starts from "0". When the value of "playItemNumber" is designated "0", the play list to which the play item belongs is reproduced from the beginning.

A method Link(position)(object) jumps in a scenario from the current position to the preceding or following play list, play item, or chapter. A parameter "position" describes one of "prev", "next", "top", "parent", and "tail". A parameter "object" describes a jumping method for an object (play list, play item, or chapter).

A method Exit stops the reproduction of a scenario. In this case, the value of the standard register is not held. A method RSM causes resume information stored in the memory of the player to be called, the resume information to be set to the register, and a scenario to be reproduced.

Next, methods for getting the states of the player will be described. A method getMenuDescriptionLanguage( )gets the language in which the menu is displayed. A method getScenarioNumber( ), a method getPlayListNumber( ), and a method getChapterNumber( ) gets a scenario number, a play list number, and a chapter number that are being reproduced, respectively. A method getPlayerSupport( ) gets version information of the player.

Next, methods for video streams will be described. A method getVideoStreamAvailability( ) gets information that represents whether or not a designated video stream is contained. A method setVideoStreamNumber( ) gets a video stream to be decoded. A method getVideoStreamNumber( ) gets a video stream number that has been selected. A method getVideoStreamAttr( ) gets attributes of a video stream that has been selected. The attributes are for example encoding system of the video stream, resolution, aspect ratio, display mode in the case that the aspect ratio is 4:3, and presence/absence of closed caption. A method setAngleNumber( ) describes an angle number. A method getAngleNumber( ) gets an angle number that has been selected. A method getMaxVideoStream( ) gets the maximum number of video streams.

To reproduce contents data from the disc in accordance with the scenario file "scenario.pbc", an engine that analyzes a scenario descriptive language according to the second mode is added to the multimedia engine 106 of the player decoders 100, 100', and 100" shown in FIG. 39, FIG. 74, and FIG. 75 according to the first mode.

When the disc is loaded into a drive device (not shown) of the player decoder 100' shown in FIG. 74, first of all, the scenario file "scenario.pbc" is reproduced. The reproduced scenario file "scenario.pbc" is input as a store object from the input terminal 101 to the player decoder 101'. The scenario file "scenario.pbc" is supplied to the code buffer 104 through the switch circuit 102. The scenario file "scenario.pbc" is analyzed by the scenario file analyzing engine of the multimedia engine 106. Scenario data is read corresponding to the analyzed result. Moving picture data displayed on the moving picture plane 10, image data displayed on the subtitle plane 11 and the graphics plane 12 (or graphics plane 12'), and another scenario file, sound data, and so forth that are read from a play list file and a scenario file are read from the disc.

4. Others

In the foregoing example, the first, second, and third storing methods for sound data are applied to the first mode of the present invention. However, the first, second, and third storing method for sound data can be applied to the second mode of the present invention.

In the foregoing example, the present invention is applied to the blu-ray disc. However, the present invention can be applied to large capacity disc-shaped recording mediums of other systems.

Although the present invention has been shown and described with respect to a best mode thereof, it should be understood by those skilled in the art that the foregoing and various other changes, omissions, and additions in the form and detail thereof may be made therein without departing from the spirit and scope of the present invention.

What is claimed is:

1. A reproducing apparatus for reproducing contents data recorded on a recording medium, the apparatus comprising:
   a processor to execute code and process data;
   an input unit configured to input a non-real time data and a real time data reproduced from the recording medium, the non-real time data containing a file storing as a set of at least an executable program code to perform a controlling operation of data reproduced from the recording medium when executed by the processor, image data composing an operation screen prompting a user to perform an operation, and a plurality of pieces of sound data with which sound effects are reproduced, and the real time data containing at least moving picture data and subtitle data;
   a storage unit configured to store the program code that has been input by the input unit;
   an image data storing unit configured to store the image data that has been input by the input unit;
   a first combining unit configured to combine decoded moving picture data of which the moving picture data that had been input by the input unit has been decoded and decoded subtitle data of which the subtitle data that had been input by the input unit has been decoded; and
   a second combining unit configured to combine the decoded image data that has been stored in the image data storing unit and the combined data of the decoded moving picture and the decoded subtitle data combined by the first combining unit, in accordance with the program code stored in the storage unit by reproducing the decoded image data, the decoded moving picture data, and the decoded subtitle data as independent display planes which are combined for display, wherein
   a sound effect is reproduced, based on the controlling operation, in synchronization with a displayed graphics object of the decoded image data display plane, while reproducing the combined independent display planes, by assigning an effect sound to image data for the displayed graphics object through an assignment command, which identifies the image data by an image id, and which identifies the effect sound by a sound id, and by executing, after the assigning, a play command to reproduce the effect sound, by referencing the sound id, when the image data corresponding to the image id is displayed.

2. The reproducing apparatus as set forth in claim 1, wherein position information of each of the plurality of pieces of sound data stored in the file is correlated with identification information of the sound data.

3. The reproducing apparatus as set forth in claim 2, wherein the sound data is correlated with the image data in accordance with the identification information, and wherein when the image data is displayed, the sound data correlated with the image data is read from the file in accordance with the identification information.

4. The reproducing apparatus as set forth in claim 1, wherein the file is input from the input unit before the program code is executed.

5. The reproducing apparatus as set forth in claim 1, wherein a plurality of files are input from the input unit.

6. The reproducing apparatus as set forth in claim 5, wherein each of the files is referenced from the program code in reproduction units of the program code and input from the input unit whenever referenced.

7. The reproducing apparatus as set forth in claim 1, wherein the first combining unit determines a first transparency factor for the decoded subtitle data from a color palette of the decoded subtitle data, multiplies the decoded subtitle data by the first transparency factor, multiplies the decoded moving picture data by a complement of the first transparency factor, and adds the multiplied decoded subtitle data to the multiplied decoded moving picture to generate a first display plane; and the second combining unit determines a second transparency factor for the decoded image data, multiplies the decoded image data by the second transparency factor to generate a second display plane, multiplies the first display plane by a complement of the second transparency factor, and adds the first display plane to the second display plane to generate the display output.

8. The reproducing apparatus as set forth in claim 1, wherein the sound effect for the displayed graphics object is reproduced irrespective of a sound reproduced in synchronization with the moving picture data.

9. The reproducing apparatus as set forth in claim 1, wherein:
the plurality of pieces of sound data with which the sound effects are reproduced are pre-loaded to a memory of the reproducing apparatus, and
the sound effect is reproduced by mixing, by an audio mixer, sound data corresponding to the sound effect, which is retrieved from the memory, with sound data corresponding to the real time data reproduced from the recording medium.

10. The reproducing apparatus as set forth in claim 1, wherein:
the displayed graphics object is a subtitle of the decoded subtitle data, such that the sound effect is reproduced in synchronization with a subtitle of the subtitle data of the real time data reproduced from the recording medium.

11. The reproducing apparatus as set forth in claim 10, wherein:
the effect sound that is reproduced is reproduced from the single file by referring to a sound id address correlation portion of the single file, and reproducing a sound data portion corresponding to address information indexed in the sound id address correlation portion.

12. The reproducing apparatus as set forth in claim 1, wherein:
the executing, after the assigning, the play command to reproduce the effect sound, by referencing the sound id, when the image data corresponding to the image id is displayed includes accessing a single file that is preloaded into memory and includes a plurality of other effect sounds as well as the effect sound.

13. The reproducing apparatus as set forth in claim 1, wherein:
the effect sound is buffered, prior to output, in a first buffer that is separate from a second buffer that buffers the real time data.

14. The reproducing apparatus as set forth in claim 1, further comprising:
a mixer to mix an output of the first buffer with an output of the second buffer.

15. A reproducing method for reproducing contents data recorded on a recording medium, the method comprising:
inputting a non-real time data and a real time data reproduced from the recording medium, the non-real time data containing a file storing as a set of at least an executable program code to perform a controlling operation of data reproduced from the recording medium when executed by a reproducing apparatus, image data composing an operation screen prompting a user to perform an operation, and a plurality of pieces of sound data with which sound effects are reproduced, and the real time data containing at least moving picture data and subtitle data;

a first storing step of storing the program code that has been input at the inputting step;

a second storing step of storing the image data that has been input at the inputting step;

a first combining step of combining decoded moving picture data of which the moving picture data that had been input at the inputting step has been decoded and decoded subtitle data of which the subtitle data that had been input at the inputting step has been decoded;

a second combining step of combining the decoded image data that has been stored at the second storing step and the combined data of the decoded moving picture and the decoded subtitle data combined at the first combining step in accordance with the program code stored at the first storing step by reproducing the decoded image data, the decoded moving picture data, and the decoded subtitle data as independent display planes which are combined for display; and reproducing a sound effect, based on the controlling operation, in synchronization with a displayed graphics object of the decoded image data display plane, while reproducing the combined independent display planes as a display output, by assigning an effect sound to image data for the displayed graphics object through an assignment command, which identifies the image data by an image id, and which identifies the effect sound by a sound id, and by executing, after the assigning, a play command to reproduce the effect sound, by referencing the sound id, when the image data corresponding to the image id is displayed.

16. A non-transitory recording medium from which a computer device can read a reproducing program that causes the computer device to execute a reproducing method for reproducing contents data recorded on a recording medium, the method comprising:
inputting a non-real time data and a real time data reproduced from the recording medium, the non-real time data containing a file storing as a set of at least an executable program code to perform a controlling operation of data reproduced from the recording medium when executed by the computer device, image data composing an operation screen prompting a user to perform an operation, and a plurality of pieces of sound data with which sound effects are reproduced, and the real time data containing at least moving picture data and subtitle data;

a first storing step of storing in memory the program code that has been input at the inputting step;

a second storing step of storing the image data that has been input at the inputting step;

a first combining step of combining with a processor decoded moving picture data of which the moving picture data that had been input at the inputting step has been decoded and decoded subtitle data of which the subtitle data that had been input at the inputting step has been decoded;

a second combining step of combining the decoded image data that has been stored at the second storing step and the combined data of the decoded moving picture and the decoded subtitle data combined at the first combining step in accordance with the program code stored at the first storing step by reproducing the decoded image data, the decoded moving picture data, and the decoded subtitle data as independent display planes which are combined for display; and reproducing a sound effect, based on the controlling operation, in synchronization with a displayed graphics object of the decoded image data display plane, while reproducing the combined independent display planes as a display output, by assigning an effect sound to image data for the displayed graphics object through an assignment command, which identifies the image data by an image id, and which identifies the effect sound by a sound id, and by executing, after the assigning, a play command to reproduce the effect sound, by referencing the sound id, when the image data corresponding to the image id is displayed.

17. A non-transitory recording medium on which contents data is recorded, a non-real time data that contains at least an executable program code to perform a controlling operation of data reproduced from the recording medium when executed and image data that composes an operation screen that prompts a user to perform an operation, a real time data that contains at least moving picture data and subtitle data, and a file that stores as a set of a plurality of pieces of sound data with which sound effects are recorded, decoded image data that has been stored and combined data of decoded moving picture and decoded subtitle data that have been combined being combined in accordance with the program code, wherein an image data reproducing apparatus reproduces the image data in accordance with the program code by reproducing the decoded image data, the decoded moving picture data, and the decoded subtitle data as independent display planes which are combined to generate a display output, and a sound effect is reproduced, based on the controlling operation, in synchronization with a displayed graphics object of the decoded image data display plane, while the combined independent display planes are reproduced as a display output, by assigning an effect sound to image data for the displayed graphics object through an assignment command, which identifies the image data by an image id, and which identifies the effect sound by a sound id, and by executing, after the assigning, a play command to reproduce the effect sound, by referencing the sound id, when the image data corresponding to the image id is displayed.

18. The recording medium as set forth in claim 17, wherein position information of each of the plurality of pieces of sound data stored in the file is correlated with identification information of the sound data.

19. The recording medium as set forth in claim 18, wherein the sound data is correlated with the image data in accordance with the identification information, and wherein when the image data is displayed, the sound data correlated with the image data is read from the file in accordance with the identification information.

20. The recording medium as set forth in claim 17, wherein the file is pre-read before the program code is executed.

21. The recording medium as set forth in claim 20, wherein each of the files is referenced from the program code in reproduction units of the program code and read whenever referenced.

22. The recording medium as set forth in claim 17, wherein a plurality of files are recorded.

23. A recording apparatus for recording contents data on a recording medium, the apparatus comprising:

a recording unit having a processor configured to record a non-real time data and a real time data, the non-real time data containing a file storing as a set of at least an executable program code to perform a controlling operation of data reproduced form the recording medium when executed, image data composing an operation screen prompting a user to perform an operation, and a plurality of pieces of sound data with sound effects, the real time data containing at least moving picture data and subtitle data, wherein the program code is to execute a combining decoded image data obtained by decoding the image data which is recorded by the recording unit and combined data which is comprising of decoded moving picture data of the real-time data and decoded subtitle data of which the subtitle data of the real-time data by reproducing the decoded image data, the decoded moving picture data, and the decoded subtitle data as independent display planes which are combined to generate a display output, and reproduce a sound effect, based on the controlling operation, in synchronization with a displayed graphics object of the decoded image data display plane, while the combined independent display planes are reproduced as a display output, by assigning an effect sound to image data for the displayed graphics object through an assignment command, which identifies the image data by an image id, and which identifies the effect sound by a sound id, and by executing, after the assigning, a play command to reproduce the effect sound, by referencing the sound id, when the image data corresponding to the image id is displayed.

* * * * *